(12) United States Patent
Kisly et al.

(10) Patent No.: US 11,485,489 B2
(45) Date of Patent: Nov. 1, 2022

(54) SYSTEMS AND METHODS FOR FUNCTIONALITY AND CONTROLS FOR A VTOL FLYING CAR

(71) Applicant: Armada Aeronautics Inc., Santa Clara, CA (US)

(72) Inventors: Konstantin Kisly, Palo Alto, CA (US); Oleg Petrov, Sunnyvale, CA (US); Pavel Markin, San Jose, CA (US); Yevgeniy Dukhovny, Mountain View, CA (US)

(73) Assignee: Alef Aeronautics Inc., Santa Clara, CA (US)

( * ) Notice: Subject to any disclaimer, the term of this patent is extended or adjusted under 35 U.S.C. 154(b) by 321 days.

(21) Appl. No.: 16/832,596

(22) Filed: Mar. 27, 2020

(65) Prior Publication Data

US 2021/0300546 A1 Sep. 30, 2021

(51) Int. Cl.
*B64C 29/02* (2006.01)
*B64C 37/00* (2006.01)
(Continued)

(52) U.S. Cl.
CPC ............... *B64C 29/02* (2013.01); *B60F 5/02* (2013.01); *B64C 3/14* (2013.01); *B64C 3/18* (2013.01);
(Continued)

(58) Field of Classification Search
CPC ......... B64C 29/02; B64C 37/00; B64C 39/06; B64C 39/062; B64C 39/066; B64C 39/068; B60F 5/02
See application file for complete search history.

(56) References Cited

U.S. PATENT DOCUMENTS

| 2,952,422 A | * | 9/1960 | Fletcher | B64C 29/02 D12/325 |
| 3,350,035 A | * | 10/1967 | Schlieben | B64C 29/02 244/7 R |

(Continued)

FOREIGN PATENT DOCUMENTS

DE  4405975 A1 * 8/1995 ............. B64C 29/02

OTHER PUBLICATIONS

Zhenchang Liu, Jie Guo, Mengting Li, Shengjing Tng and Xiao Wang. "VTOL UAV Transition Maneuver Using Incremental Nonlinear Dynamic Inversion." International Journal of Aerospace Engineering, 2018. https://doi.org/10.1155/2018/6315856.

(Continued)

*Primary Examiner* — Joseph W Sanderson
(74) *Attorney, Agent, or Firm* — Dergosits & Noah LLP

(57) ABSTRACT

A vertical take-off and landing (VTOL) aircraft has a first drivable configuration in which the pilot seat is positioned between the wings and facing the direction of forward travel. The VTOL may be driven in the first configuration as a normal automobile. In the first configuration the wings are aligned with the direction of forward travel and their surfaces are vertically oriented. In the first configuration, the VTOL may also attain altitude and be maneuvered using thrust from propulsion sources. In a second configuration, the pilot seat is rotated 90 degrees from the direction of forward travel to a direction of forward flight. Forward flight is achieved using thrust to rotate the wings from the vertical orientation to a lift-providing orientation. In concert with the rotation of the wings, the pi lot seat is counter-rotated to maintain the seat facing the direction of forward flight.

14 Claims, 31 Drawing Sheets

(51) Int. Cl.
  *B64D 11/06* (2006.01)
  *B60F 5/02* (2006.01)
  *B64C 39/06* (2006.01)
  *B64C 3/26* (2006.01)
  *B64C 3/18* (2006.01)
  *B64C 3/14* (2006.01)
  *B64D 27/24* (2006.01)

(52) U.S. Cl.
  CPC ............... *B64C 3/26* (2013.01); *B64C 37/00* (2013.01); *B64C 39/062* (2013.01); *B64D 11/0689* (2013.01); *B64D 27/24* (2013.01); *B64C 2003/142* (2013.01)

(56) References Cited

U.S. PATENT DOCUMENTS

| | | | | |
|---|---|---|---|---|
| 3,834,654 | A * | 9/1974 | Miranda | B64C 39/068 |
| | | | | 244/45 R |
| 6,705,905 | B1 * | 3/2004 | Tanaka | B64C 39/062 |
| | | | | 244/50 |
| 9,254,916 | B2 * | 2/2016 | Yang | B64C 29/0033 |
| 9,963,228 | B2 * | 5/2018 | McCullough | G08G 5/025 |
| 10,011,351 | B2 * | 7/2018 | McCullough | B64C 25/04 |
| 10,183,746 | B2 * | 1/2019 | McCullough | B64D 25/12 |
| 10,220,944 | B2 * | 3/2019 | McCullough | G05D 1/0011 |
| 10,227,133 | B2 * | 3/2019 | McCullough | B64D 17/80 |
| 10,232,950 | B2 * | 3/2019 | McCullough | B64D 31/10 |
| 10,413,763 | B2 * | 9/2019 | Won | B64D 1/02 |
| 10,981,649 | B2 * | 4/2021 | LeGrand | B64C 27/26 |
| 11,014,669 | B2 * | 5/2021 | LeGrand | B64C 11/46 |
| 11,136,119 | B2 * | 10/2021 | LeGrand | B64C 11/46 |
| 11,192,633 | B1 * | 12/2021 | Moro-Ludena | B64C 29/02 |
| 2014/0124613 | A1 * | 5/2014 | Yang | B64C 29/0033 |
| | | | | 244/12.4 |
| 2017/0371352 | A1 * | 12/2017 | Mari Mari | B64C 29/02 |
| 2018/0002011 | A1 * | 1/2018 | McCullough | B64C 27/28 |
| 2018/0002012 | A1 * | 1/2018 | McCullough | B64C 29/0033 |
| 2018/0002013 | A1 * | 1/2018 | McCullough | B64C 39/024 |
| 2018/0002015 | A1 * | 1/2018 | McCullough | B64D 1/08 |
| 2018/0002016 | A1 * | 1/2018 | McCullough | B64C 25/04 |
| 2018/0002027 | A1 * | 1/2018 | McCullough | B64C 29/02 |
| 2018/0147429 | A1 * | 5/2018 | Won | B64C 25/405 |
| 2020/0086984 | A1 * | 3/2020 | LeGrand | B64C 29/02 |
| 2020/0086985 | A1 * | 3/2020 | LeGrand | B64C 29/02 |
| 2020/0086986 | A1 * | 3/2020 | LeGrand | B64C 39/062 |
| 2020/0239150 | A1 * | 7/2020 | Kimchi | B64C 39/062 |
| 2020/0317332 | A1 * | 10/2020 | Didey | B64C 39/08 |
| 2021/0245876 | A1 * | 8/2021 | Bianco Mengotti | B64C 27/54 |
| 2021/0300535 | A1 * | 9/2021 | Petrov | B64C 39/062 |
| 2022/0063800 | A1 * | 3/2022 | Suzuki | B64C 29/02 |
| 2022/0177124 | A1 * | 6/2022 | Marshall | B64D 29/02 |

OTHER PUBLICATIONS

Sebastian Verling, Michael Burri, Kostas Alexis, Roland Siegwart, M. Boosfeld, B. Weibel."Full Attitude Control of a VTOL tailsitter UAV." 2016 IEEE international Conference on Robotics and Automation (ICRA). Conference Paper, May 2016.

* cited by examiner

|  | Solid Material | Core Thickness $t$ | Core Thickness $3t$ |
|---|---|---|---|
| Stiffness | 1.0 | 7.0 | 37.0 |
| Flexural Strength | 1.0 | 3.5 | 9.2 |
| Weight | 1.0 | 1.03 | 1.06 |

FIG. 13

3002 — Attain altitude, by an apparatus including a first propulsion source, at least one wing elongate along a first axis, and a seat configured to support a pilot, the altitude attained using only lift provided by thrust from the first propulsion source. When attaining altitude, every at least one wing is oriented vertically, and the seat is facing a first direction. Also, the apparatus further includes: a frame connected to the first propulsion source and the at least one wing and rotatably connected to the seat such that the seat, while facing the first direction, may rotate with respect to the first axis, the frame, and the at least one wing; and a control system. In the apparatus, each at least one wing does not generate vertical lift when oriented vertically; and the first propulsion source is configured such that, with every at least one wing oriented vertically, the first propulsion source is operable to maintain apparatus altitude and stability.

3004 — Control thrust from the first propulsion source to rotate the at least one wing and frame about the first axis so that the at least one wing acquires a horizontal velocity in the first direction and generates vertical lift sufficient for the apparatus to transition, from maintaining altitude using only lift from the first propulsion source, to maintaining altitude using only lift generated by the at least one wing.

3006 — Counter-rotate the seat with respect to the first axis and the frame to counter the rotation of the at least one wing and frame and maintain the seat facing the first direction.

FIG. 30

SYSTEMS AND METHODS FOR FUNCTIONALITY AND CONTROLS FOR A VTOL FLYING CAR

CROSS-REFERENCE TO RELATED CASES

This application is related to a U.S. Patent Applications entitled "SYSTEM AND METHODS FOR PROVIDING VERTICAL TAKE OFF AND LANDING AND FORWARD FLIGHT INA SMALL PERSONAL AIRCRAFT," filed by the same inventors on the same day as this application.

BACKGROUND

Traffic congestion is prevalent in many countries throughout the world. In fact, a recent study by INRIX concluded that, in 2016, drivers in the United States spend an average of forty-one hours per year in traffic, costing drivers nearly $305 billion.

Vertical Take-off and Landing (VTOL) aircrafts have been considered as a solution. A VTOL aircraft is an aircraft that can take off, hover, transition to forward flight, and land vertically. Thus far, no VTOL designs have been successful. While there have been a lot of successful VTOLs, such as helicopters, it would be really helpful to have a VTOL with driving capabilities, e.g., a flying car.

Accordingly, there is a need for a small personal VTOL aircraft, possibly with driving capabilities that can cooperate on the current road and parking infrastructure, which may solve the problem of a short to mid-range commute and may reduce excessive traffic congestion.

SUMMARY

In some embodiments, the present invention provides a vertical take-off and landing (VTOL) aircraft, comprising a rectangular wing including an upper wing section having a right upper wing side and a left upper wing side; a lower wing section having a right lower wing side and left lower wing side, a right vertical wing section coupled to the right upper wing side and to the right lower wing side, and a left vertical wing section coupled to the left upper wing side and to the left lower wing side, the upper wing section having an upper wing cross section with a first asymmetrical airfoil shape configured to cause lift when in forward flight, the lower wing section having a lower wing cross section with a second asymmetrical airfoil shape for causing lift when in forward flight, each of the right vertical wing section and the left vertical wing section having a vertical wing cross section with a symmetrical shape to cause yaw directional stability when in forward flight; two elevons on at least one of the upper wing section and the lower wing section; at least one rudder on each of the right vertical wing section and the left vertical wing section; a support frame coupled to the rectangular wing; and a propulsion system coupled to the support frame to provide propulsion for the VTOL The asymmetrical airfoil shape may have a camber line that curves back up near the trailing edge to add a positive pitching moment and to create positive longitudinal stability, when in the forward flight. The lower wing section may have a lower angle of attack than the upper wing section. The lower wing section may be arranged to shift the center of pressure of the VTOL aircraft to the upper wing section. A propulsion and cabin may be arranged so that the center of gravity of the VTOL aircraft is located between the leading edge of the wing section and the aerodynamic center of the VTOL aircraft to provide longitudinal stability to the VTOL aircraft. The upper wing section and the lower wing section may be reflexed-type airfoils to provide stabilization of the pitch moment along with the implementation of a twisted airfoil and swapped wings configuration. The upper wing section may comprise a plurality of independent sections along the lateral axis sharing a plurality of longerons. The lower wing section may comprise a plurality of independent sections along the lateral axis sharing a plurality of longerons. The propulsion system may comprise a plurality of electric propellers arranged between the upper and lower wing sections. The right vertical wing section and the left vertical wing section may be symmetrical airfoils to provide stabilization of the yaw moment. The upper wing section and the lower wing section may be connectable to a vertical wing section by a corner section, each corner section being arranged to transition between the lift forces of the upper or lower wing section and the lateral stabilizing force of the vertical wing section. The portion of a corner section may transition from the airfoil shape of the upper wing section and lower wing section connectable thereto to a tapered wing tip, the corner section thereafter transitioning from a tapered wing tip to the symmetrical cross section of a connectable vertical wing section. The transition of the corner section to a tapered wing tip may start at approximately 50% of the corner section perimeter edge that is parallel to the connectable upper wing section and lower wing section. The corner section may be arranged to shift the local aerodynamic center of a connected upper wing section and the lower wing section to the aft of the VTOL aircraft to achieve lateral stability. Each of the upper wing section, the lower wing section, the right vertical wing section and the left vertical wing section may comprise internal skeleton frames comprising ribs. The upper wing section and the lower wing section may comprise at least two longerons, the longerons having a substantially round cross section instead of rectangle cross section because of the absence of the cantilever problem. The ribs may be glued to the longerons. The longerons and ribs may be made from carbon fiber tubes. The exterior surfaces of the upper wing section and the lower wing section may comprise carbon fiber panels. The carbon fiber panels may be glued to the ribs. Each elevon may have a frame, the frame comprising a plurality of longerons and ribs, and the outer surface of each elevon comprising one or more carbon fiber panels. The carbon fiber panels may be glued to the ribs. The support frame may form a rigid chassis. The support frame may comprise cross members which extend substantially from each corner of the rectangular wing to the diagonally opposed corner of the rectangular wing, thereby forming an "X" shape. The support frame may comprise cross members which extend substantially from each end of the upper wing section to the diagonally opposed end of the lower wing section, thereby forming an "X" shape. Stabilizing members may extend vertically between the cross support frame members, crossing support frame where engines are located in order to distribute forces and discharge vibration. Stabilizing members and the support frame may be comprised of one or more of aluminum and carbon-fiber reinforced polymer (CHU) tubing with aerodynamic profiles. The propellers may be mounted to one or more of the support frame and the stabilizing members. The VTOL aircraft may have wheels with steering capability coupled to the rectangular wing.

BRIEF DESCRIPTION OF THE DRAWINGS

Objects, features, and advantages of the present invention will become apparent upon consideration of the following detailed description and the accompanying figures, in which like reference designations represent like features throughout the figures:

FIG. 13 is a chart illustrating the relative stiffness and weight of sandwich panels compared to solid panels, in accordance with some embodiments;

FIG. 2.1 is a perspective view of the aircraft according to the embodiment of FIG. 18 in a second configuration;

FIG. 30 illustrates an embodiment of a method of using an aircraft;

DETAILED DESCRIPTION

Figure 1:
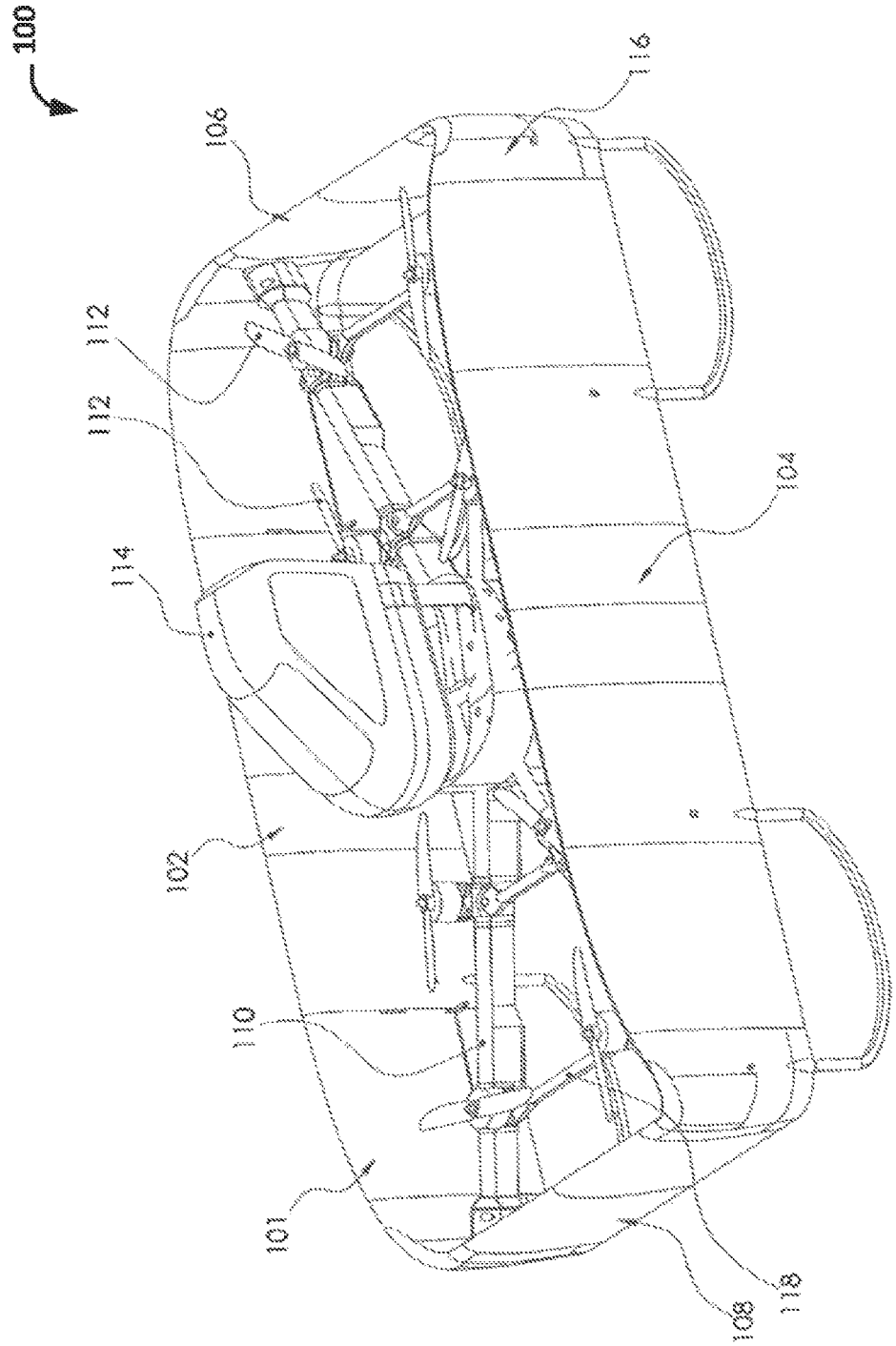
FIG. 1 is a perspective front side view of a small personal aircraft with vertical take-off and landing (a VTOL aircraft), in accordance with some embodiments.

FIG. 1 is a perspective front side view of a small personal vertical take-off and landing (VTOL) aircraft 100, in accordance with some embodiments. The VTOL, aircraft 100 includes a "rectangular" wing 101. The rectangular wing 101 includes an upper wing section 102 having a right upper wing side and a left upper wing side, a lower wing section 104 having a right lower wing side and a left lower wing side, a right vertical wing section 108 (as a stabilizer) coupled to the right upper wing side and to the right lower wing side, and a left vertical wing section 106 (as a stabilizer) coupled to the left upper wing side and to the left lower wing side. Each of the wing sections is coupled together by a corner section 116. The corner sections 116 may be separate parts or parts integral to the upper wing section 102, lower wing section 104, right vertical wing section 108, or left vertical wing sections 106.

The VTOL aircraft 100 may be the size of a standard automobile. For example, the dimensions of an embodiment of the VTOL aircraft 100 may be approximately 5.5 m×2.2 m×2.0 m. An exemplary wing area may be 9.5 m2.

Figure 5:
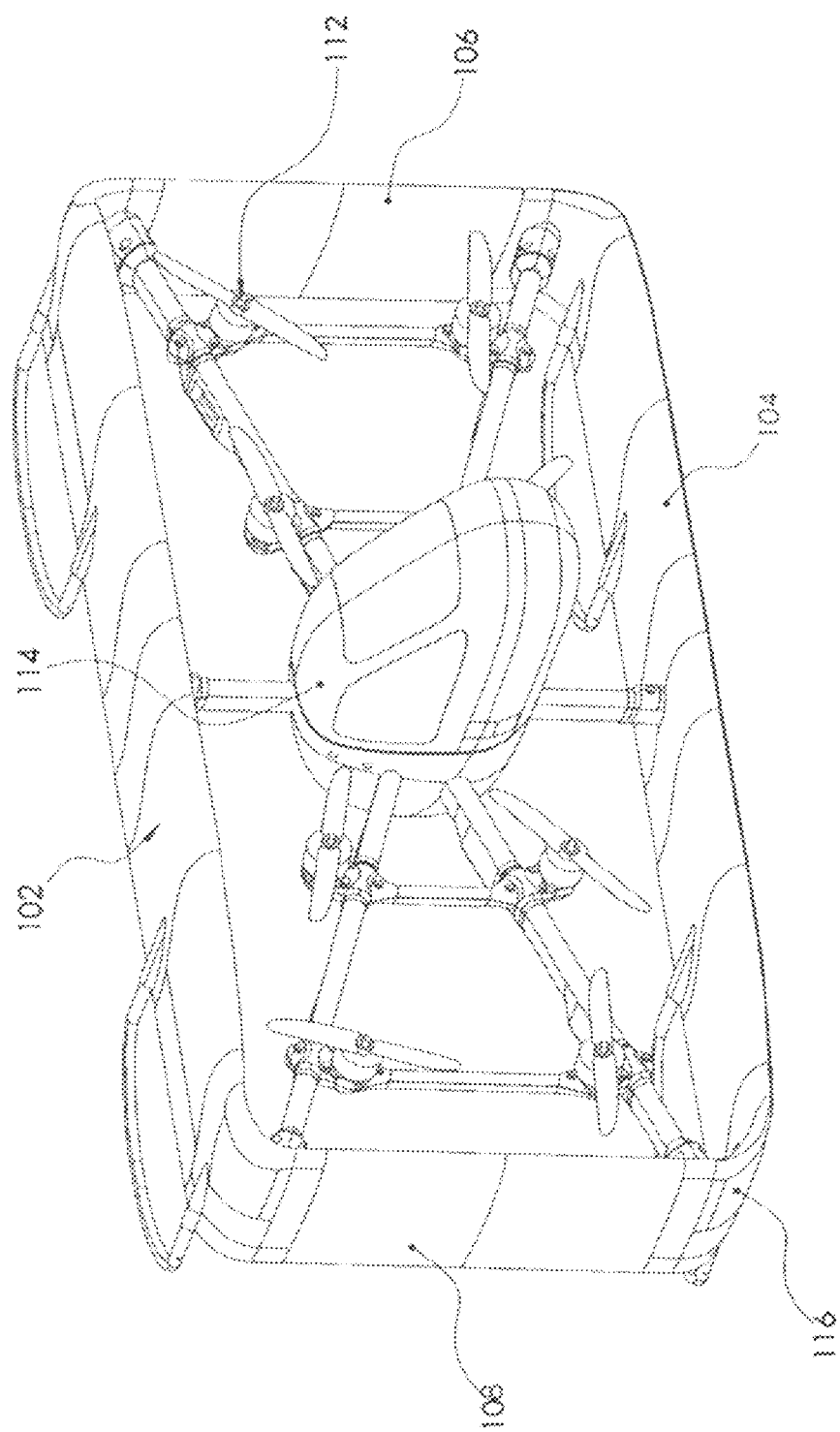
FIG. 5 is a perspective front view of a VTOL aircraft in a forward flight mode, in accordance with some embodiments.

The VTOL aircraft 100 is configured to initially take off in a vertical direction, and possibly tilted in any direction. The VTOL orientation of the VTOL aircraft 100 at rest is substantially as shown in FIG. 1. After take-off and during flight, the VTOL aircraft 100 is configured to transition to a forward orientation, as shown in FIG. 5. The upper wing section 102 is referred to as "upper," because it will become the upper wing when in the forward orientation as shown in FIG. 5. The lower wing section 104 is referred to as "lower," because it will become the lower wing when in the forward orientation. The right and left vertical wing sections 106 and 108 are referred to as "vertical," because they will be vertical when in the forward orientation. The right vertical wing section 108 is referred to as "right" because it is on the right when facing the front of the VTOL aircraft 100 in forward orientation. The left vertical wing section 106 is referred to as "left" because it is on the left when facing the front of the VTOL aircraft 100 in forward orientation.

Figure 10:
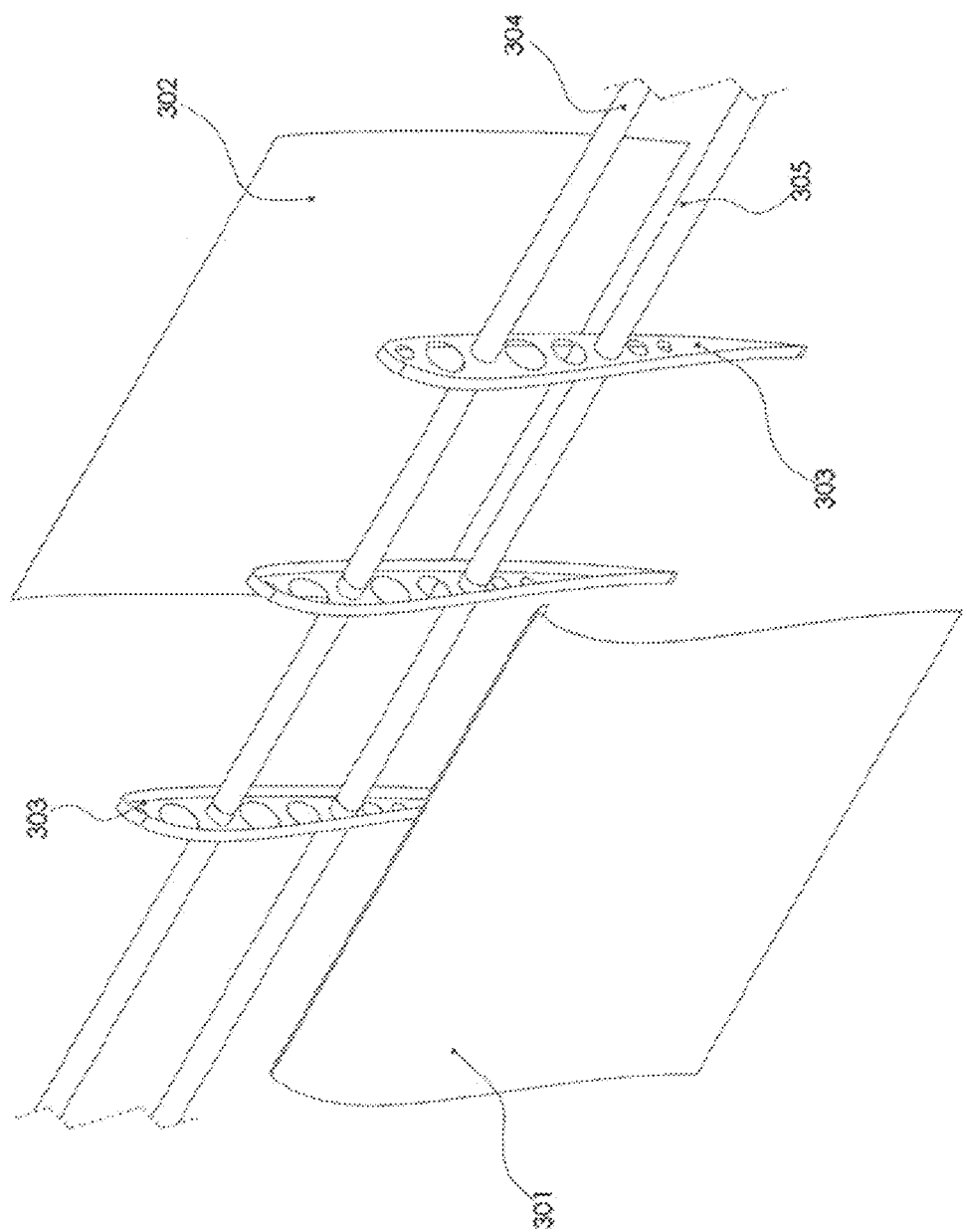
FIG. 10 is an exemplary exploded view of a wing section and/or an elevon, in accordance with some embodiments.
Figure 11:
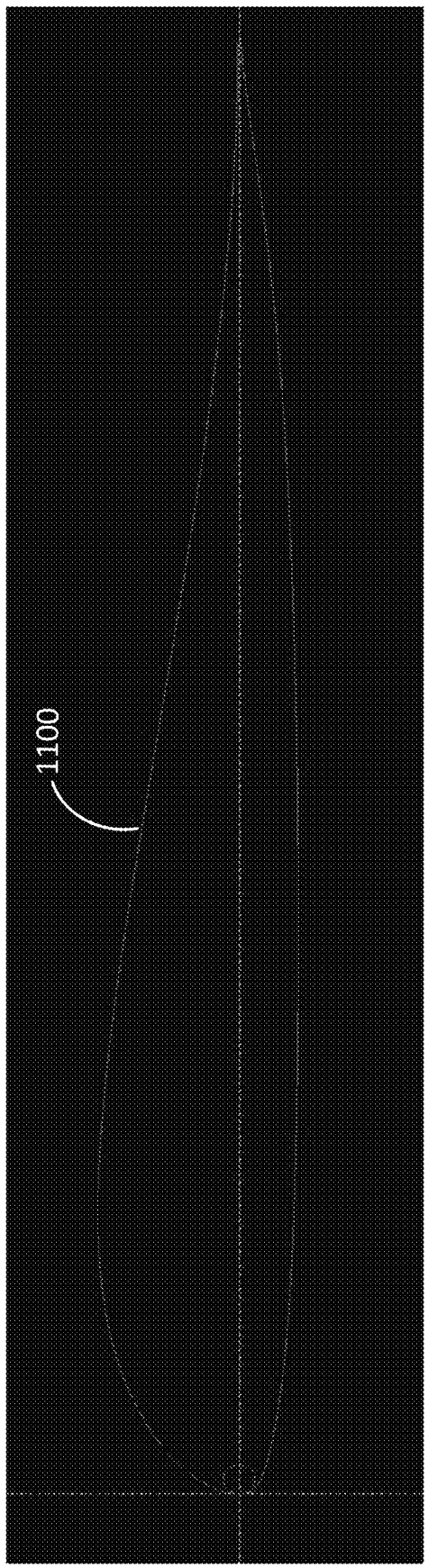
FIG. 11 is a cross-sectional view of a wing section, in accordance with some embodiments.
Figure 12:
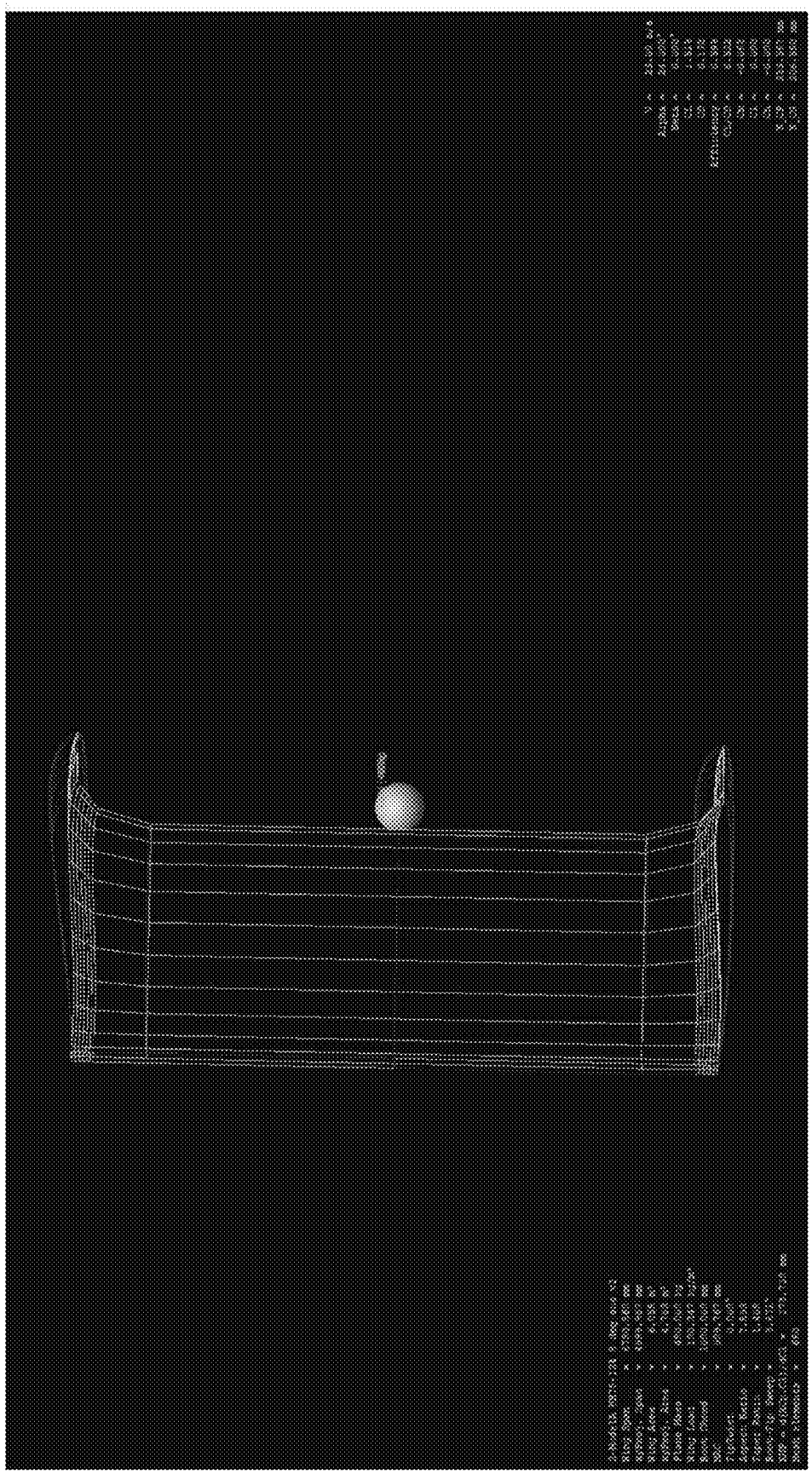
FIG. 12 is a computer model illustrating the rectangular wing shape and the center of gravity of a VTOL aircraft, in accordance with some embodiments.

The upper wing section 102 and lower wing section 104 may form the aerodynamic lifting surfaces of the VTOL aircraft 100. In some embodiments, the upper wing section 102 and the lower wing section 104 each have a cross section in the shape of an airfoil to create lift when in forward flight. The airfoil dimensions of the upper wing section 102 and the lower wing section 104 may be the same or similar, as described below. An example airfoil shape 1100 for the upper wing section 102 and the lower wing section 104 is shown in FIGS. 10-12. As shown in FIGS. 10-12, the upper wing section 102 and the lower wing section 104 use substantially the same airfoil design, in which the camber line curves back up near the trailing edge of the airfoil to add a positive pitching moment. The upper wing section and the lower wing section may be reflexed-type airfoils to provide stabilization of the pitch moment along with the implementation of a twisted airfoil and swapped wings configuration. The lower wing section 104 may have a slightly lower angle of attack than the upper wing section 102 to aid in stall recovery. It is also used to achieve roll stability as it shifts center of pressure up to the upper wing. In other words, the point from where resulting force vector (lift and drag) originate is shifted to the upper wing by decreasing the angle of attack of the lower wing. This reduces the lift and drag forces of the lower wing in comparison to the upper wing. At low speeds, the lower wing section 104 will stall first, moving the center of lift up and causing the angle of attack to fall, increasing air speed and thus exiting a stall. As shown in the tables below, the configuration allows for the center of gravity of the VTOL aircraft 100 to be located in front of the aerodynamic center (which is at about 27% of the root chord from the leading edge) to the point of about 20.7% of the root chord from the leading edge. This configuration also creates positive longitudinal static stability for the VTOL aircraft 100.

The right vertical wing section 108 and the left vertical wing section 106 may comprise two wing portions shorter than the upper wing section 102 and the lower wing section 104. The right vertical wing section 108 and the left vertical wing section 106 may be configured as symmetrical airfoils to provide stabilization of the roll moment. The cross-sectional shape of the right vertical wing section 108 and the left vertical wing section 106 may be substantially identical and may provide lateral stability when in forward flight.

The corner sections 116 are configured to smoothly transition between the upper wing section 102 and the right vertical wing section 108, the upper wing section 102 and the left vertical wing section 106, the lower wing section 104 and the right vertical wing section 108, and the lower wing sections 104 and the left vertical wing section 106. The corner sections 116 may, be configured to transition between the lift forces created by the upper wing section 102 and the lower wing section 104 and the vertical stabilizing forces associated with the airfoil designs of the right vertical wing section 108 and the left vertical wing section 106.

As shown, the corner sections 116 are connected to the upper wing section 102 or he lower wing section 104 on one end of the corner section 116. The portion of the corner sections 116 adjacent to the upper wing section 102 or the lower wing section 104 transition from the airfoil shape to a tapered wing tip. The transition starts at approximately 50% of the corner section 116 perimeter edge that is parallel to the upper wing section 102 and the lower wing section 104 to create additional wing span and add additional lift and reduce wing tip vortices. This portion of the corner section 116 decreases the wing chord length and transitions the wing tip to the connected right vertical wing section 108 or left vertical wing section 106. The tapering of the end of the corner sections 116 adjacent to the upper wing section 102 and the lower wing section 104 shifts the local aerodynamic center of the wing configuration to the aft of the VTOL aircraft 100 to achieve lateral stability.

Similarly, the portion of the corner sections 116 adjacent to the right vertical wing section 108 and the left vertical wing section 106 preferably transition from an asymmetrical shape of the upper wing section 102 and the lower wing section 104 to a symmetrical airfoil design for the right vertical wing section 108 and the left vertical wing section 106 in accordance with some embodiments.

Generally, each of the upper wing section 102 and the lower wing section 104, the right vertical wing section 108 and the left vertical wing section 106 and the corner sections 116 include internal skeleton frames comprising ribs. The upper wing section 102 and the lower wing section 104 include at least two longerons of round shape with ribs attached by means of gluing. Longerons and ribs are made from carbon fiber tubes and customs profiles.

Figure 17:
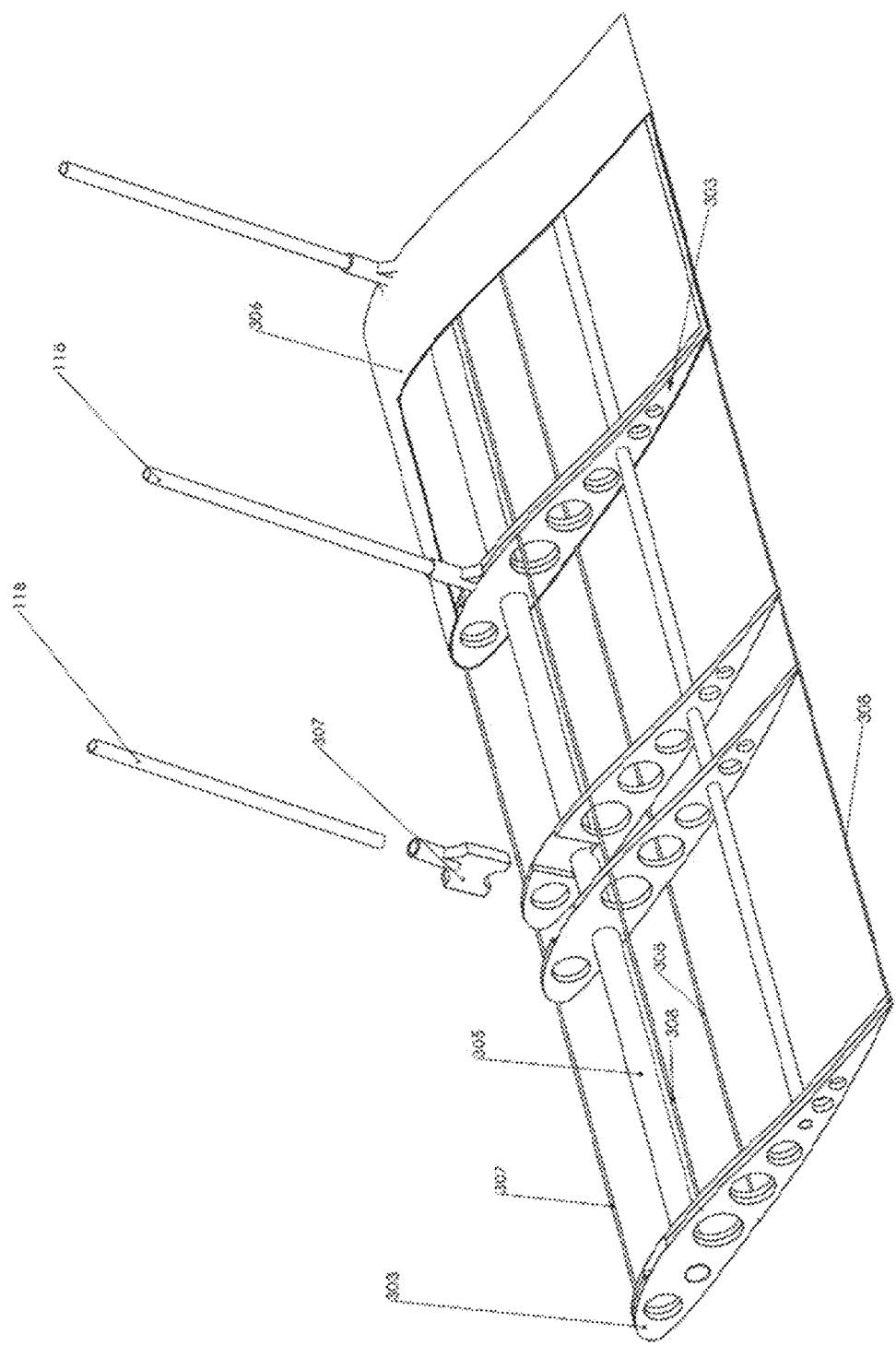
FIG. 17 is an exemplary exploded view showing modularity of the wing sections along with joints of wing frame to the support frame, in accordance with some embodiments.

The surfaces of the upper wing section 102 and the lower wing section 104 may be constructed from carbon fiber panels and attached to the ribs by the mean of gluing. Each of the upper wing section 102 and the lower wing section 104 may be made of independent sections (along the lateral axis) which share longerons as supports and structural elements. The elevons may each contain two longerons with ribs and carbon fiber panels attached by gluing. FIG. 10 shows an exemplary exploded view of the structure of a wing section and/or an elevon in accordance with some embodiments. A wing section includes longerons 304, 305 extending the length of the wing section and interconnecting with one or more ribs 303. The top surface 302 and bottom surface 301 of the wing section and/or elevon may be constructed from carbon fiber panels. FIG. 17 shows exemplary exploded view of the modularity of the wing sections, each wing section consists of two ribs 303 and carbon fiber panel 306. Ribs 303 are attached by means of screw connection to the joint 307. Joint 307 is attached to the stabilizing member 118 of the support frame. The carbon fiber panel 306 may have additional support by means of spars 308. The carbon fiber panels may be sandwich type panels having a varying thickness and highly enhanced strength and stiffness as illustrated in FIG. 13 and as indicated in the tables below.

The VTOL aircraft 100 may include a support frame 110 configured to stabilize the rectangular wing 101 and form a rigid chassis, without forming a wind barrier. The support frame 110 may include cross members 111 configured to cross substantially diagonally across the rectangular wing 101, substantially corner to cross corner in both directions, thereby forming an "X" shape. The support frame 110 may include stabilizing members 118 crossing vertically between the cross members 111. The support frame 110 may be made from aluminum and CFRP tubing with aerodynamic profiles.

In some embodiments, the support frame 110 may be used to support a cabin 114 thereon, possibly substantially centrally, e.g., at the center of the "X" shape of the cross members 111. The cabin 114 may be used to house the pilot and any passengers. The support frame 110 may further be used to support a set of propellers 112. As shown, the VTOL aircraft 100 may include eight propellers 112 spread between the upper wing section 102 and the lower wing section 104, with four propellers spread between the cabin 114 and the right vertical wing section 108, and the other four propellers spread between the cabin 114 and the second wing section 108.

The cross members 111 may connect at one end to the cabin 114. The other ends of the cross members 111 may be fastened to the frames forming the skeletons for the upper wing section 102 and the lower wing section 104. The connection points between the upper wing section 102 and the lower wing section 104 and the support frame 110 may be located at the wing ribs. In some embodiments, there are six ribs in the upper wing section 102 and the lower wing section 104 that are attached to the support frame 110.

The VTOL aircraft 100 also includes a propulsion system to enable take-off and forward flight. The propulsion system preferably includes the eight propellers 112 supported on the support frame 110. The propellers 112 may be two-blade, three-blade, or more propellers with variable pitch adjustment in the range of 17-90 degrees and with electric propulsion motors based on permanent magnets approach—BLDG with advanced phase control—Field oriented Control (FOC) implemented in the speed controllers (ESC). The motors may be capable of delivering 35 KW of constant power and 60 KW of pick power (5 sec). The motor electronic controls and motor housing may be equipped with passive cooling system based on heat-transfer tubes with heat dissipation in the airflow from the rotating propellers. The motors may turn the propellers at full throttle in the range of 5000-7000 RPM, and the propellers will have a tip speed of approximately 0.8 M and up to 0.95 M. The rotation speed of propellers 112 and variable pitch of the propeller may be controlled individually by the flight controller to allow differential thrust in vertical take-off, landing and forward flight modes. The propellers 112 may have a diameter of 34-36 inches. In an embodiment, aspects of the flight controller may be distributed among one or more connected computing devices on the aircraft.

The VTOL aircraft 100 may include batteries to power the propellers 112. The VTOL aircraft 100 may utilize standard off-the-shelf rechargeable Lithium-ion/Polymer batteries. Battery packaging may be based on payloads. Battery capacity may depend on use cases (e.g., payload, range). For a payload of 150 kg and flight time of 40 minutes, battery capacity may be projected to be 450 Ah or 30-40 kWh. Battery charging may be performed via electric car charging stations.

Batteries may be distributed in several places around the VTOL aircraft 100. For example, batteries may be included in the cabin, above the frame support 110 and in the leading edge of the rectangular wing 101. The distribution may be arranged to shift the center of gravity of the VTOL aircraft 100 in front of the aerodynamic center of the airfoils to achieve positive longitudinal flight stability.

Although not shown, the VTOL aircraft 100 may include four wheels coupled to the rectangular wing 101, and generally positioned in typical positions as on a typical automobile. The four wheels may be steered by a steering wheel located in the cabin. The four wheels may be driven by motors (not shown) or by the propellers 112, which may be directed to propel the VTOL aircraft forwards and/or backwards.

Figure 2:
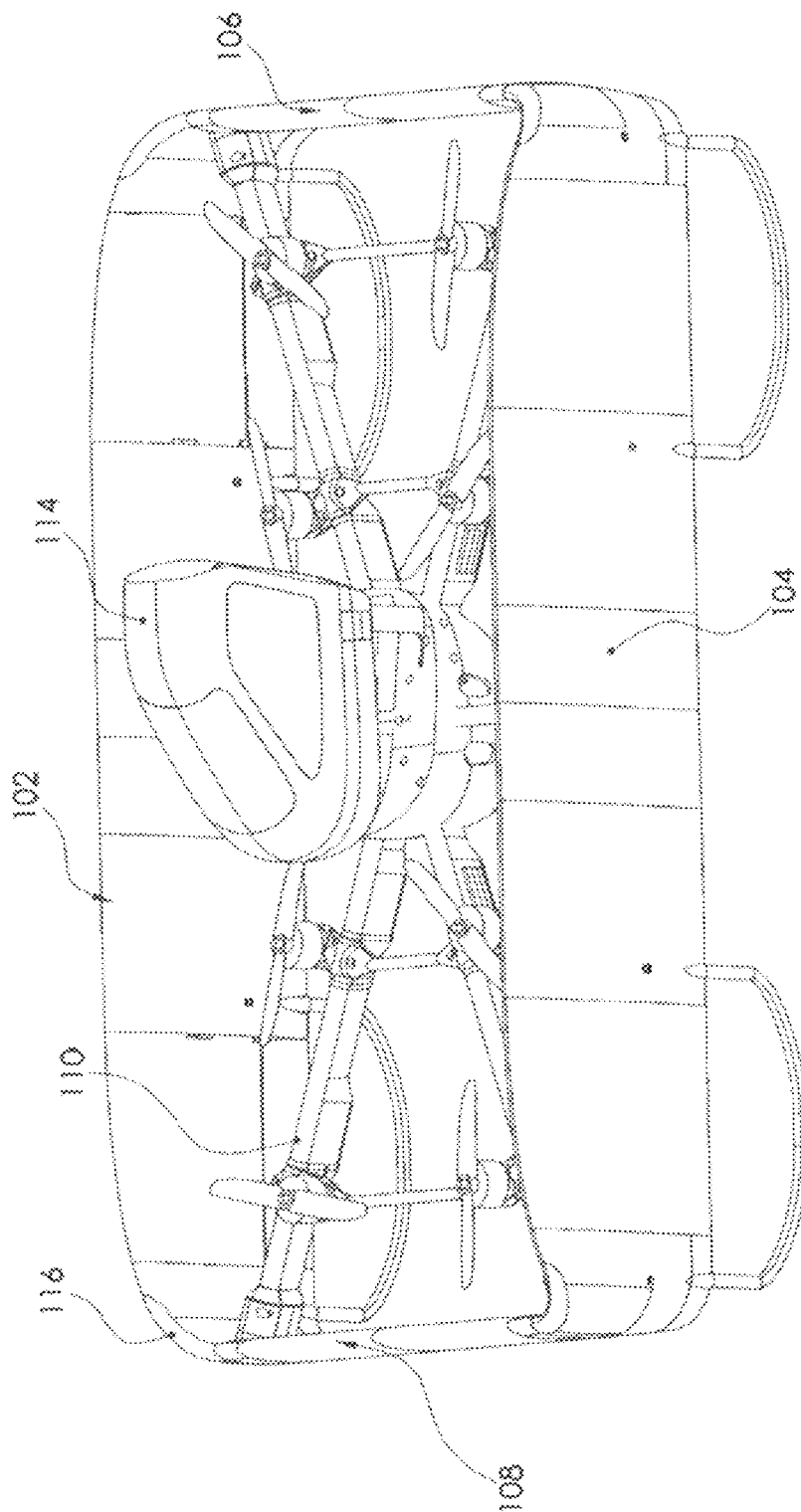
FIG. 2 is a perspective side view of a VTOL aircraft, in accordance with some embodiments.

FIG. 2 is a perspective side view of the VTOL aircraft 100, in accordance with some embodiments.

Figure 3:
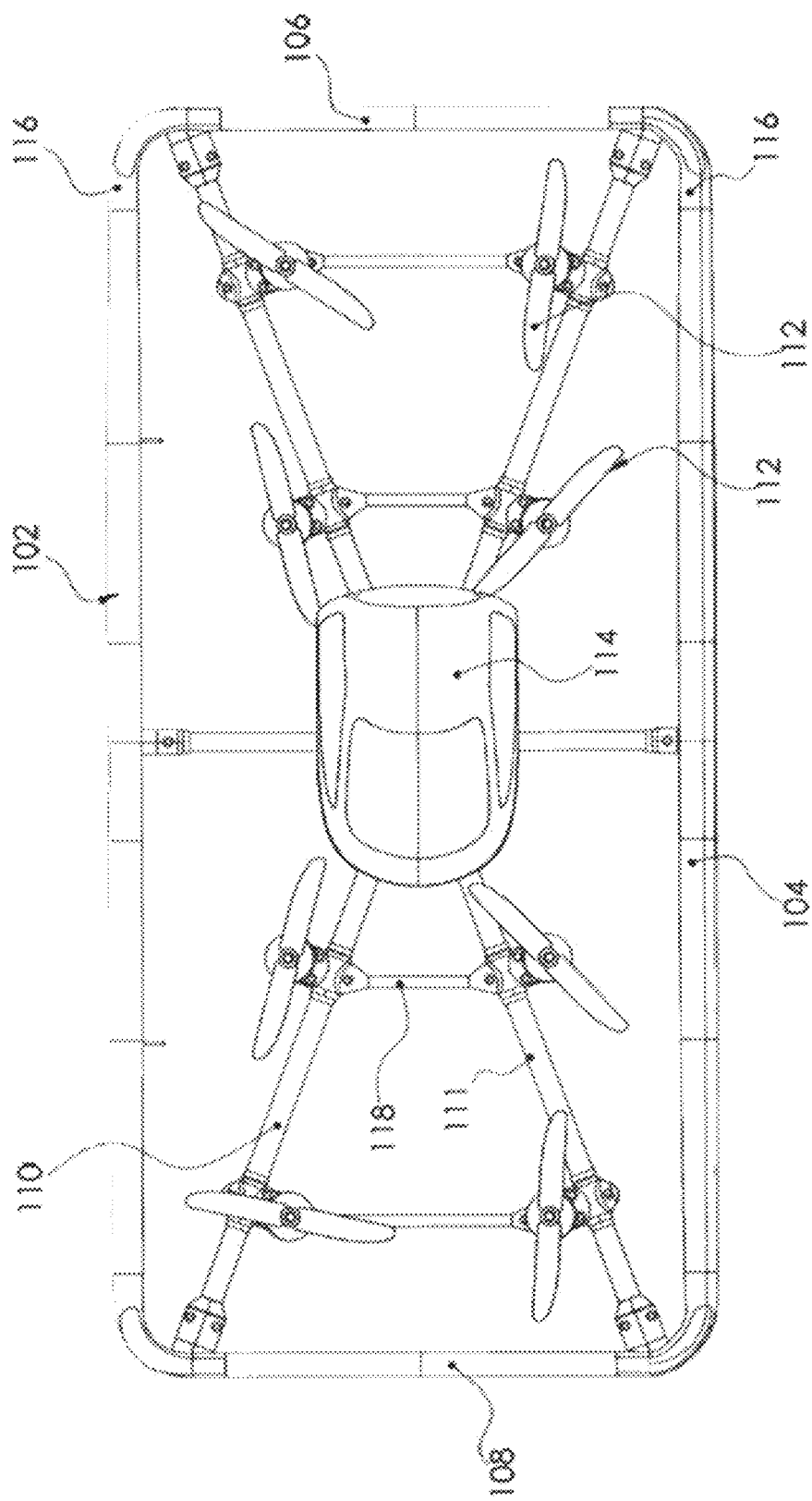
FIG. 3 is a top view of a VTOL aircraft, in accordance with some embodiments.

FIG. 3 is a top view of the VTOL aircraft 100, in accordance with some embodiments.

Figure 4:
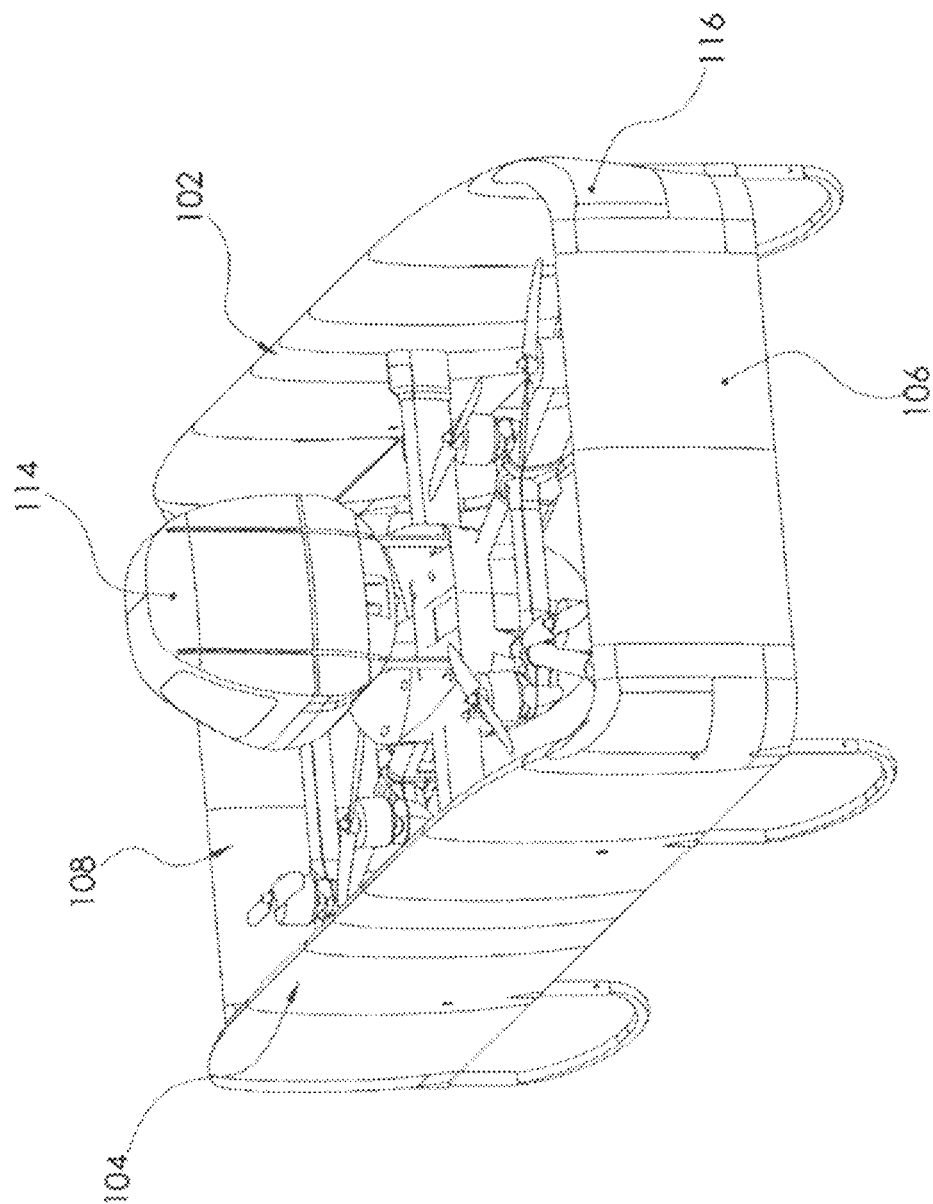
FIG. 4 is a perspective rear view of a VTOL aircraft, in accordance with some embodiments.

FIG. 4 is a perspective rear view of the VTOL aircraft 100, in accordance with some embodiments.

FIG. 5 is a perspective front view of the VTOL aircraft 100 in a forward flight orientation, in accordance with some embodiments. As shown in FIG. 5, the cabin 114 may be configured to rotate from a sideways direction to a forward direction so that the passengers remain seated comfortably relative to gravity.

Figure 6:
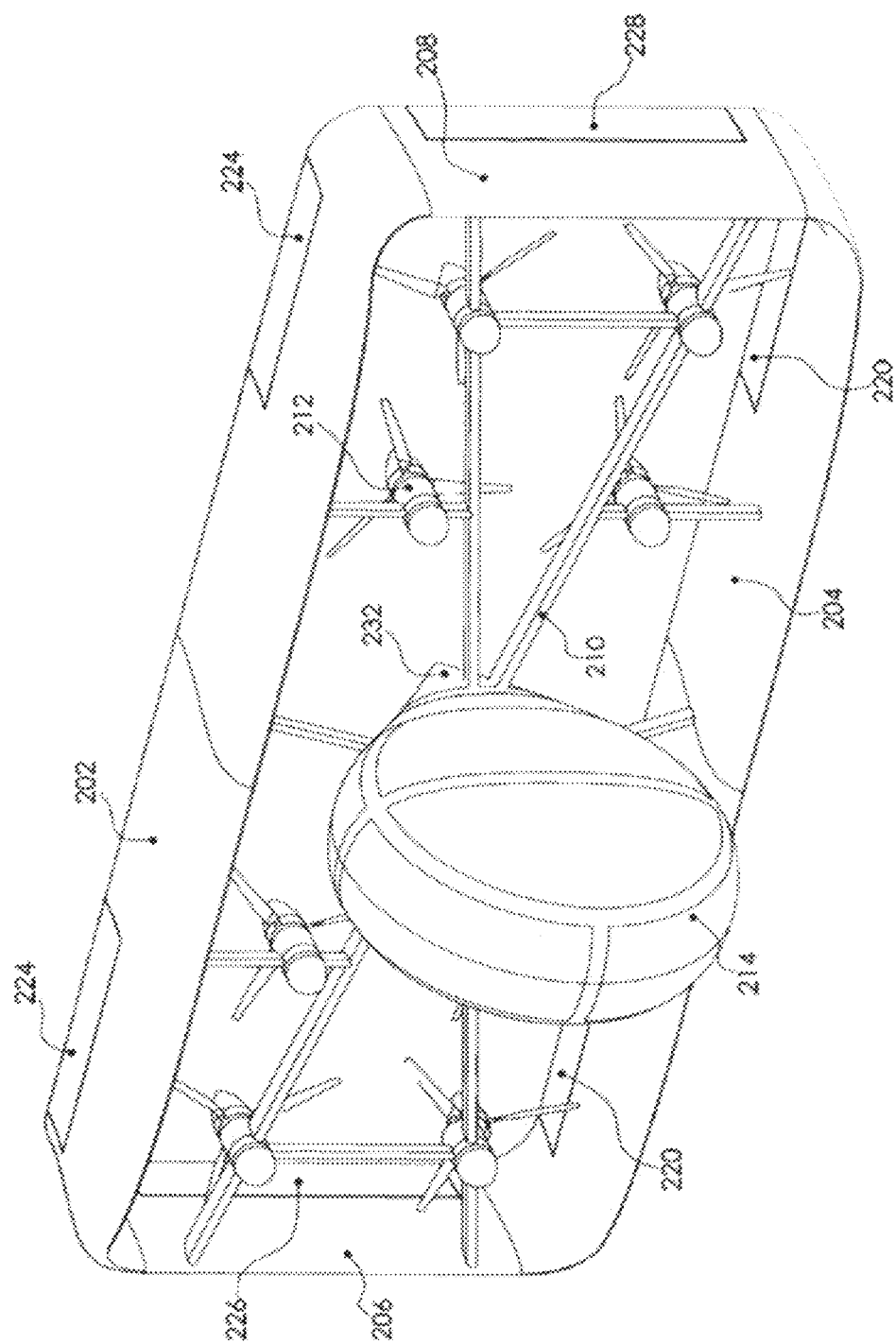
FIG. 6 is a perspective front view of a VTOL aircraft in a forward flight mode, in accordance with some embodiments.

FIG. 6 is a perspective front view of a VTOL aircraft 200, in accordance with some embodiments. The VTOL aircraft 200 is substantially similar to the VTOL aircraft 100 shown and discussed with reference to FIGS. 1-5. The VTOL aircraft 200 shows some additional details included in the VTOL aircraft 100 but not shown in FIGS. 1-5, such as the elevons 220 on the lower wing section 204, the elevons 224 on the upper wing section 202, and the rudders 226 and 228 on the right and left vertical wing sections 206 and 208.

Some differences between the VTOL aircraft 200 relative to the VTOL aircraft 100 include a different cabin 214 relative to the cabin 114, a different support frame 210 pattern relative to support frame 110, and rear-side positioned propellers 212 relative to front-side positioned propellers 112.

Like the VTOL aircraft 100, the VTOL aircraft 200 includes a "rectangular" wing 201. The rectangular wing 201 includes an upper wing section 202 having a right upper wing side and a left upper wing side, a lower wing section 204 having a right lower wing side and a left lower wing side, a right vertical wing section 206 (as a stabilizer) coupled to the right upper wing side and to the right lower wing side, and a left vertical wing section 208 (as a stabilizer) coupled to the left upper wing side and to the left lower wing side. Each of the wing sections is coupled together by a corner section 216. Corner sections 216 may be separate parts or parts integral to the upper wing section 202, lower wing section 204, right vertical wing section 206, or left vertical wing sections 208.

Like the VTOL aircraft 100, the VTOL aircraft 200 may be the size of a standard automobile. For example, the dimensions of an embodiment of the VTOL aircraft 200 may be approximately 5.5 m×2.2 m×2.0 m. An exemplary wing area may be 11 m2.

The VTOL aircraft 200 is configured to initially take off in a vertical direction, and possibly tilted in any direction. The VTOL orientation of the VTOL aircraft 200 is substantially as shown in FIG. 1. After take-off and during flight, the VTOL aircraft 200 is configured to transition to a forward orientation, as shown in FIG. 6. Like the VTOL aircraft 100, the upper wing section 202 is referred to as "upper," because it will become the upper wing when in the forward orientation as shown in FIG. 6. The lower wing section 204 is referred to as "lower," because it will become the lower wing when in the forward orientation. The right and left vertical wing sections 206 and 208 are referred to as "vertical," because they will be vertical when in the forward orientation. The right vertical wing section 206 is referred to as "right" because it is on the right when facing the front of the VTOL aircraft 200 in forward orientation. The left vertical wing section 208 is referred to as "left" because it is on the left when facing the front of the VTOL aircraft 200 in forward orientation.

The upper wing section 202 and lower wing section 204 may form the aerodynamic lifting surfaces of the VTOL aircraft 200. In some embodiments, the upper wing section 202 and the lower wing section 204 each have a cross section in the shape of an airfoil to create lift when in forward flight. The airfoil dimensions of the upper wing section 202 and the lower wing section 204 may be the same or similar, as described below. An example airfoil shape 1100 for the upper wing section 202 and the lower wing section 204 is shown in FIGS. 10-12. As shown in FIGS. 10-12, the upper wing section 202 and the lower wing section 204 use substantially the same airfoil design, in which the camber line curves back up near the trailing edge of the airfoil to add a positive pitching moment. The lower wing section 204 may have a slightly lower angle of attack than the upper wing section 202 to aid in stall recovery. At low speeds, the lower wing section 204 will stall first, moving the center of lift up and causing the angle of attack to fall, increasing air speed and thus exiting a stall. As shown in the tables below, the configuration allows for the center of gravity of the VTOL aircraft 200 to be located in front of the aerodynamic center (which is at about 27% of the root chord from the leading edge) to the point of about 20.7% of the root chord from the leading edge. This configuration also creates positive longitudinal static stability for the VTOL aircraft 200.

The right vertical wing section 206 and the left vertical wing section 208 may comprise two wing portions shorter than the upper wing section 202 and the lower wing section 204. The right vertical wing section 206 and the left vertical wing section 208 may be configured as symmetrical airfoils to provide stabilization of the roll moment. The cross-sectional shape of the right vertical wing section 206 and the left vertical wing section 208 may be substantially identical and may provide lateral stability when in forward flight.

Like the corner sections 116, the corner sections 216 are configured to smoothly transition between the upper wing section 202 and the right vertical wing section 206, the upper wing section 202 and the left vertical wing section 206, the lower wing section 204 and the right vertical wing section 206, and the lower wing sections 204 and the left vertical wing section 208. The corner sections 216 may be configured to transition between the lift forces created by the upper wing section 202 and the lower wing section 204 and the vertical stabilizing forces associated with the airfoil designs of the right vertical wing section 206 and the left vertical wing section 208.

As shown, the corner sections 216 may be connected to the upper wing section 202 and the lower wing section 204 on one end of the corner section 216. The portion of the corner sections 216 adjacent to the upper wing section 202 and the lower wing section 204 transition from the airfoil shape to a tapered wing tip. The transition starts at approximately 50% of the corner section 216 perimeter edge that is parallel to the upper wing section 202 and the lower wing section 204 to create additional wing span and add additional lift and reduce wing tip vortices. This portion of the corner section 216 decreases the wing chord length and transitions the wing tip to the right vertical wing section 206 and the left vertical wing section 208. The tapering of the end of the corner sections 216 adjacent to the upper wing section 202 and the lower wing section 204 shifts the local aerodynamic center of the wing configuration to the aft of the VTOL aircraft 200.

Similarly, the portion of the corner sections 216 adjacent to the right vertical wing section 206 and the left vertical wing section 208 transition from an asymmetrical shape of the upper wing section 202 and the lower wing section 204 to the symmetrical airfoil designs of the right vertical wing section 206 and the left vertical wing section 208.

Generally, each of the upper wing section 202 and the lower wing section 204, the right vertical wing section 206 and the left vertical wing section 208 and the corner sections 216 include internal skeleton frames comprising ribs. The upper wing section 202 and the lower wing section 204 preferably include at least two longerons of round shape with ribs attached by means of gluing/riveting or bolting. Longerons and ribs are preferably made from carbon fiber tubes or customs profiles.

The surfaces of the upper wing section 202 and the lower wing section 204 may be constructed from carbon fiber panels and attached to the ribs by the mean of gluing or riveting. Each of the upper wing section 202 and the lower wing section 204 may be made of independent sections (along the lateral axis) which share longerons as supports and structural elements. The elevons may each contain two longerons with ribs and carbon fiber panels attached by gluing or riveting. FIG. 10 shows an exemplary exploded view of the structure of a wing section and/or an elevon in accordance with some embodiments. A wing section includes longerons 304, 305 extending the length of the wing section and interconnecting with one or more ribs 303. The top surface 302 and bottom surface 301 of the wing section and/or elevon may be constructed from carbon fiber panels. The carbon fiber panels may be sandwich type panels having a varying thickness and highly enhanced strength and stiffness as illustrated in FIG. 13 and as indicated in the tables below.

The VTOL aircraft 200 may include a support frame 210 configured to stabilize the rectangular wing 201 and form a rigid chassis, without forming a wind barrier. Like the support frame 110, the support frame 210 may include cross members 211 configured to cross substantially diagonally across the rectangular wing 201, substantially corner to corner in both directions, thereby forming an "X" shape. The support frame 210 may include stabilizing members 218 crossing vertically between the cross members 211. The support frame 210 may be made from aluminum alloy and CFRP tubing with aerodynamic streamline profiles.

In some embodiments, the support frame 210 may be used to support a cabin 214 thereon, possibly substantially centrally, e.g., at the center of the "X" shape of the cross members 211. The cabin 214 may be used to house the pilot and any passengers. The support frame 210 may further be used to support a set of propellers 212. As shown, the VTOL aircraft 100 may include eight propellers 212 spread between the upper wing section 202 and the lower wing section 204, with four propellers 212 spread between the cabin 214 and the right vertical wing section 206, and the other four propellers 212 spread between the cabin 214 and the second wing section 208 filling the area inside the rectangular wing evenly.

The cross members 211 may connect at one end to the cabin 214. The other ends of the cross members 211 may be fastened to the frames forming the skeletons for the upper wing section 202 and the lower wing section 204. The connection points between the upper wing section 202 and the lower wing section 204 and the support frame 210 may be located at the wing ribs. In some embodiments, there are six ribs in the upper wing section 202 and the lower wing section 204 that are attached to the support frame 210.

Like the VTOL aircraft 100, the VTOL aircraft 200 also includes a propulsion system to enable take-off and forward flight. The propulsion system includes the eight propellers 212 supported on the support frame 210, The propellers 212 may be, two-blade, three-blade or more propellers with variable pitch adjustment in the range of 18-90 degrees and with electric propulsion motors based on permanent magnets approach—BLDC with advanced phase control Field oriented Control (FOC). The motors may be capable of delivering 35 KW of constant power and 60 KW of pick power (5 sec). The motor electronic controls and motor housing may be equipped with passive cooling system based on heat-transfer tubes with heat dissipation in the airflow from the rotating propellers. The motors may turn the propellers at full throttle in the range of 3000-6000 RPM, and the propellers will have a tip speed not exceeding approximately 0.8 M. The rotation speed of propellers 212 and variable pitch of the propeller may be controlled individually by the flight controller to allow differential thrust in vertical take-off, landing and forward flight modes. The propellers 212 may have a diameter of 34-36 inches.

Like the VTOL aircraft 100, the VTOL aircraft 200 may include batteries to power the propellers 212. The VTOL aircraft 200 may utilize standard off-the-shelf rechargeable standard lithium-ion batteries with an optional high current rating buffer lithium-polymer battery for vertical flight or high current rating lithium-ion battery only. Battery packaging may be based on payloads. Battery capacity may depend on use cases (e.g., payload, range). For a payload of 150 kg and flight time of 40 minutes, battery capacity may be projected to be 450 Ah. Battery charging may be performed via electric car charging stations.

Batteries may be distributed in several places around the VTOL aircraft 200. For example, batteries may be included in the cabin, above the frame support 210 and in the leading edge of the rectangular wing 201 or in vertical parts of the rectangular wing. The distribution may' be arranged to shift the center of gravity of the VTOL aircraft 200 in front of the aerodynamic center of the airfoils to improve aerodynamics and flight stability. The position of the battery or part of the battery can be adjusted in flight along the longitudinal axes of the aircraft to fine tune the position of the center of mass to the necessary position.

As illustrated in FIG. 6, the right vertical wing section 206 includes a first rudder 226, and the left vertical wing section 208 include a second rudder 228. The upper wing section 202 has elevons 224, and the lower wing section 204 has elevons 220. The elevons 220 and 224 may be positioned close to the transition where the first and left vertical wing sections 206 and 208 control the wing pitching and rolling moments. Each elevon 220 and 224 may have a chord length of approximately 25% of the wing chord length. The width of the elevons may me be about 1.5 the diameter of the propellers. Elevons 220 and 224 combine the functions of ailerons and elevators in a typical fixed wing aircraft design. Elevons and rudders also may be used in vertical flight for augmenting positional stability along with body tilting to fight with position deviation in windy conditions. Further, the elevons 220 and 224 may be located between first and second and between fifth and sixth ribs attached to the support frame 210.

In forward flight, the VTOL aircraft 200 may be controlled by the elevons 220 and 224 which combine controls of ailerons and elevators. Flap function from elevons 220 and 224 is also possible. Active longitudinal stability may be based on thrust vectoring or differential thrust created by the counter-rotation of, or changing the rotational speed of, propellers 212 and controlling the rudders 226 and 228. Pitch control may be performed by deflecting all elevons 220 and 224 up and down and changing their positive pitching moment as well as by differential thrust between upper and lower row of propellers. Differential thrust can be achieved by changing the rotating speed of the propellers 212 and/or changing propeller pitch. Yaw control may be performed by differential thrust of the outer rows of propellers 212. Propeller thrust may be controlled individually by changing the rotation speed and/or pitch angle. Roll control may be performed by deflecting the left and right pairs of elevons 220 and 224 up and down in opposite directions. The VTOL aircraft may include a built-in inertial management unit to enable the flight controller to control the roll position by reading current values and changing speeds.

Figure 7B:
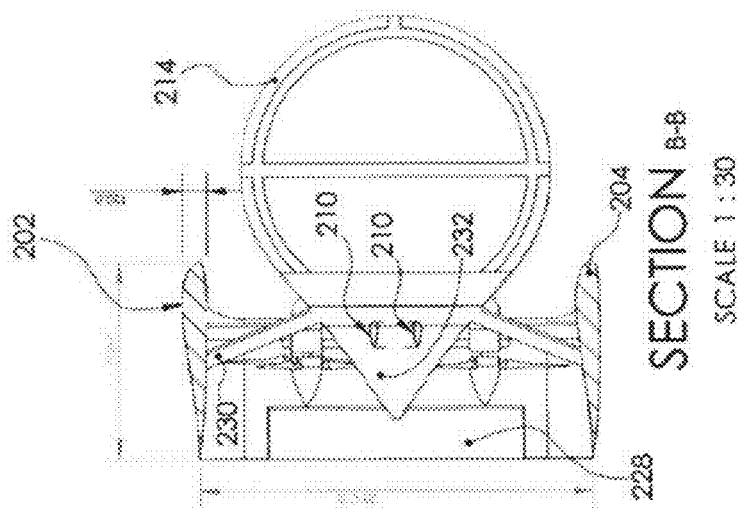
FIG. 7b is a cross-sectional view of a VTOL aircraft taken substantially along line B-B of FIG. 7a, in accordance with some embodiments.
Figure 7A:
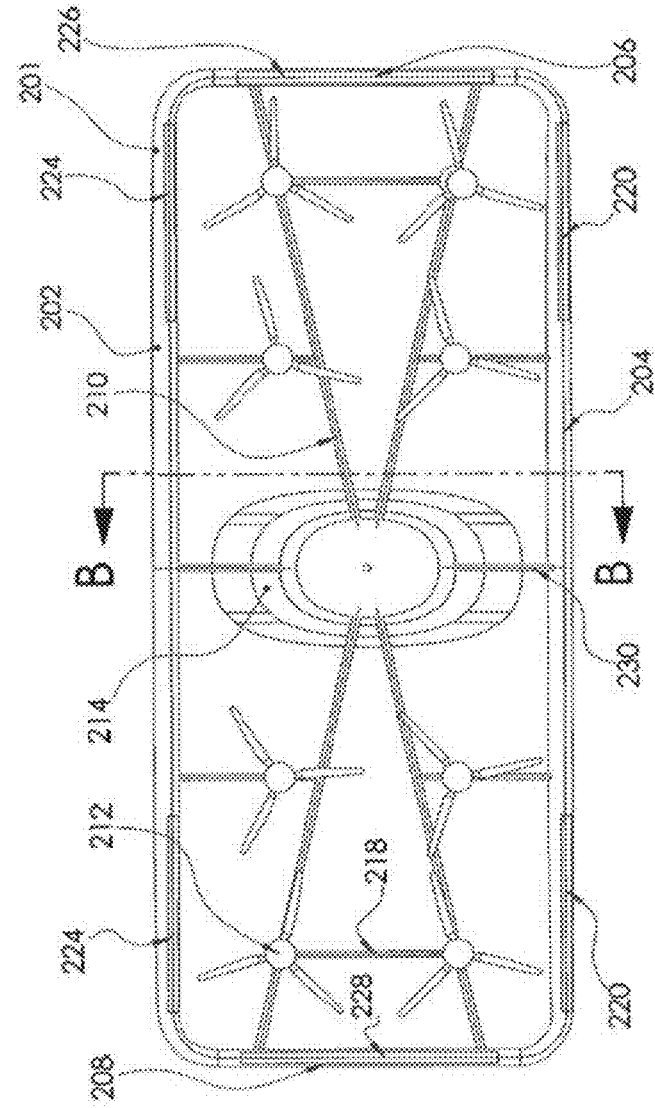
FIG. 7a is a rear view of a VTOL aircraft in a forward flight mode, in accordance with some embodiments.

FIG. 7a is a rear view of the VTOL aircraft 200 in a forward flight mode, in accordance with some embodiments. FIG. 7b is a cross-sectional view of a VTOL aircraft 200 taken substantially along line B-B of FIG. 7a, in accordance with some embodiments. As shown, VTOL aircraft 200 includes a fairing 232.

Figure 8:
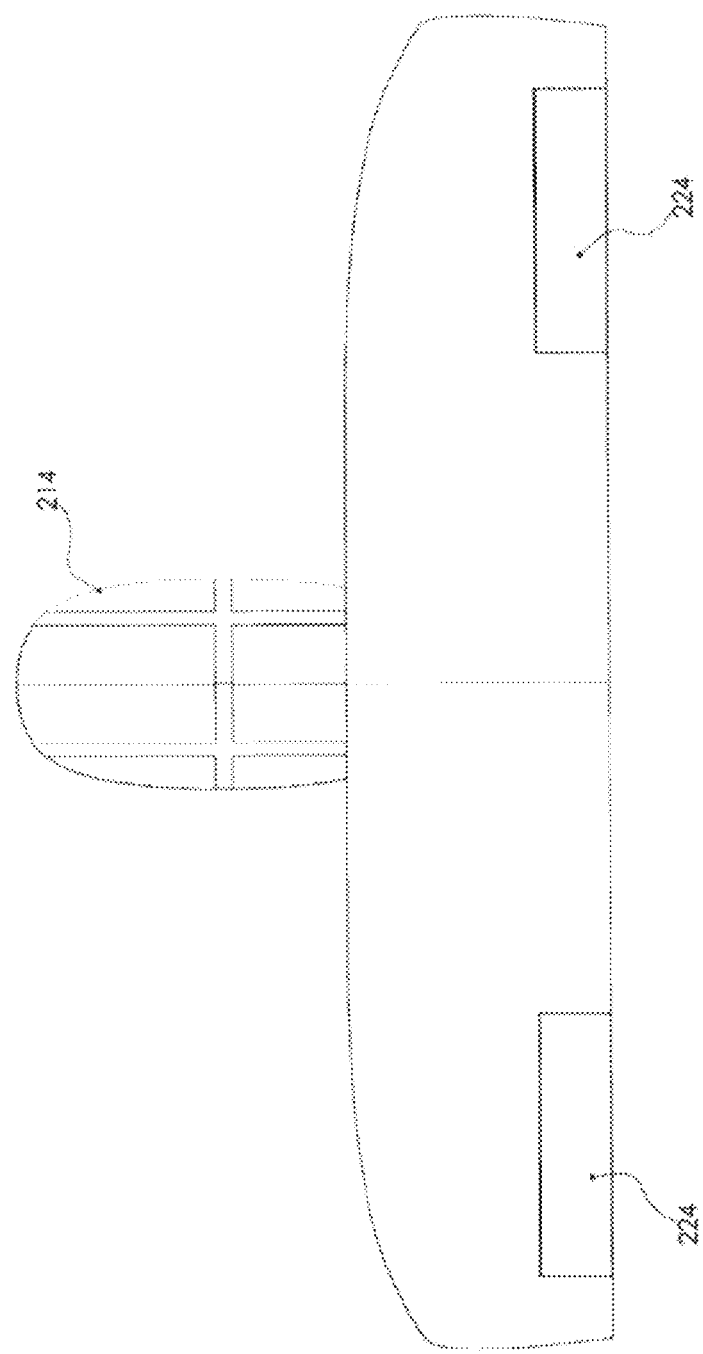
FIG. 8 is a top view of a VTOL, aircraft in a forward flight mode, in accordance with some embodiments.

FIG. 8 is a top view of a VTOL aircraft 200 in a forward flight mode, in accordance with some embodiments. As illustrated in FIG. 8, the continuous shape of the rectangular wing 101 and 201 fully encases all propellers 112 and 212 to protect the surroundings from the propellers 112 and 212 and the propellers 112 and 212 from the outside objects during take-off and landing.

Figure 9:
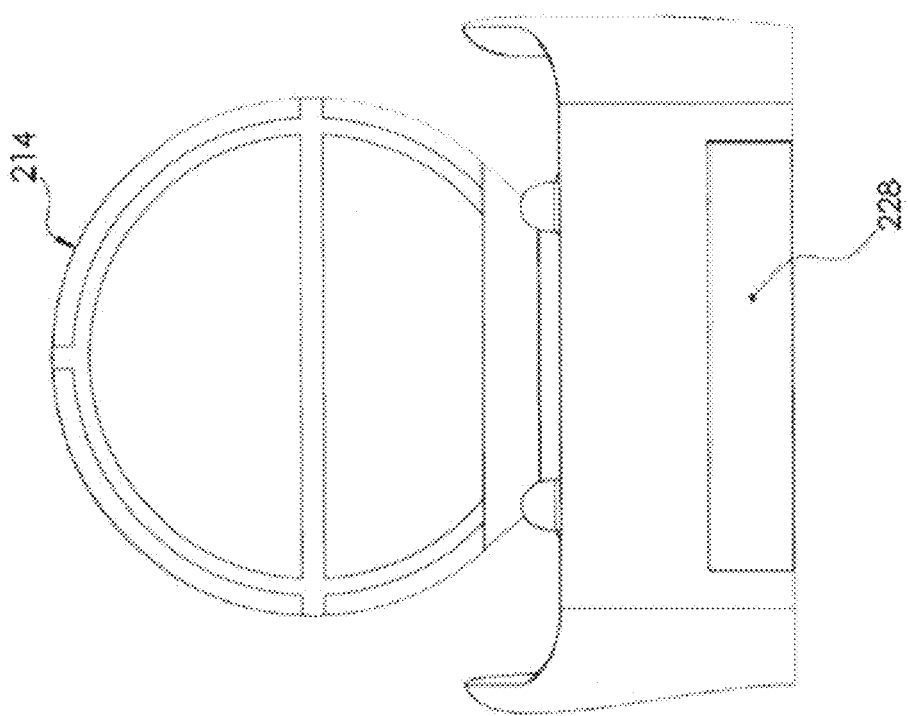
FIG. 9 is a side view of a VTOL aircraft, in accordance with some embodiments.

FIG. 9 is a side view of a VTOL aircraft 200, in accordance with some embodiments.

FIG. 10 is an exemplary exploded view of a wing section and/or elevon, in accordance with some embodiments.

FIG. 11 is a cross-sectional view of a wing section, e.g., the upper wing section 102 and 202 and the lower wing section 104 and 204, in accordance with some embodiments.

FIG. 12 is a computer model illustrating the shape and center of gravity of the rectangular wing 101 and 201, in accordance with some embodiments. The computer model shows the following specifications:

| 2-ModelA MH78-12% 8 deg AoA v2 | |
|---|---|
| Wing Span | 6780.560 mm |
| xyProj. Span | 4999.987 mm |
| Wing Area | 6.055 m² |
| xyProj. Area | 4.783 m² |
| Plane Mass | 480.000 kg |
| Wing Load | 100.347 kg/m² |
| Root Chord | 1000.000 mm |
| MAC | 909.767 mm |
| TipTwist | 0.000° |
| Aspect Ratio | 7.593 |
| Taper Ratio | 1.408 |
| Root-Tip Sweep | 3.671° |
| XNP = d(XCp · Cl)/dCl | 273.730 mm |
| Mesh Elements | 660 |
| V | 23.00 m/s |
| Alpha | 24.000° |
| Beta | 0.000° |
| CL | 1.519 |
| CD | 0.178 |
| Efficiency | 0.599 |
| CL/CD | 8.522 |
| Cm | −0.068 |
| Cl | 0.000 |
| Cn | −0.000 |
| X_CP | 253.567 mm |
| X_CG | 206.550 mm |

FIG. 13 is a chart illustrating the relative stiffness and weight of sandwich panels compared to solid panels, in accordance with some embodiments.

Figure 14:
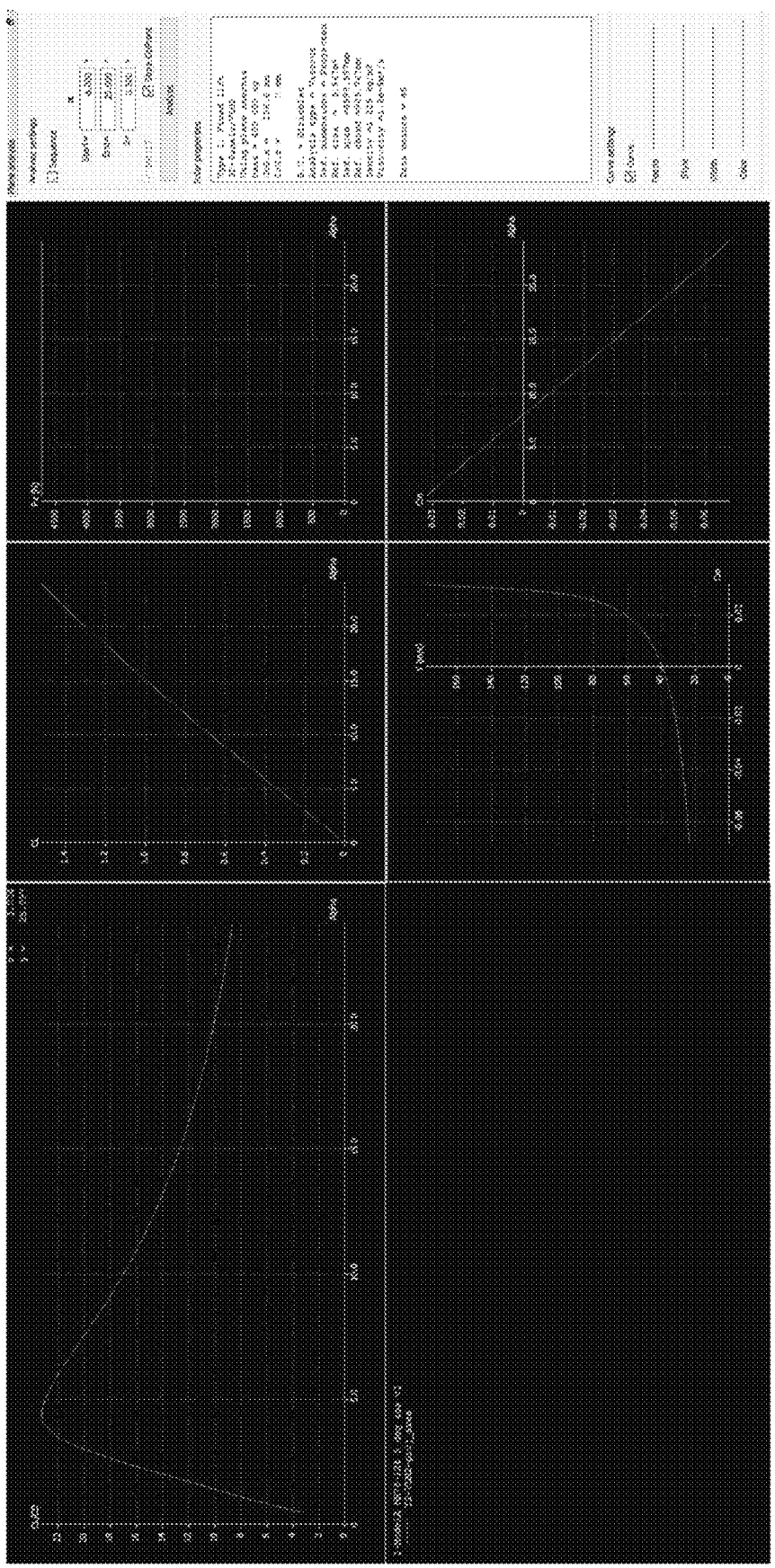
FIG. 14 is a set of graphs showing airfoil polars, in accordance with some embodiments.

FIG. 14 is a set of graphs showing airfoil polars, in accordance with some embodiments. The airfoil polars include the following specifications:

| Plane analysis | |
|---|---|
| Analysis settings: Sequence/Store OpPoint | |
| α | |
| Start | −8.000° |
| End | 25.000° |
| Δ | 0.500° |
| Polar properties | |
| Type 2: Fixed lift | |
| 3D-Panels/VLM2 | |
| Using plane inertia | |
| Mass | 480.00 kg |
| CoG.x | 206.6 mm |
| CoG.z | 0 mm |
| B.C. | Dirichlet |
| Analysis Type | Viscous |
| Ref. Dimensions | Projected |
| Ref. Area | 9.567 m² |
| Ref. Span | 4999.987 mm |
| Ref. Chord | 909.767 mm |
| Density | 1.225 kg/m3 |

-continued

| | |
|---|---|
| Viscosity | 1.5e-5 m²/s |
| Data Points | 48 |

Figure 15:
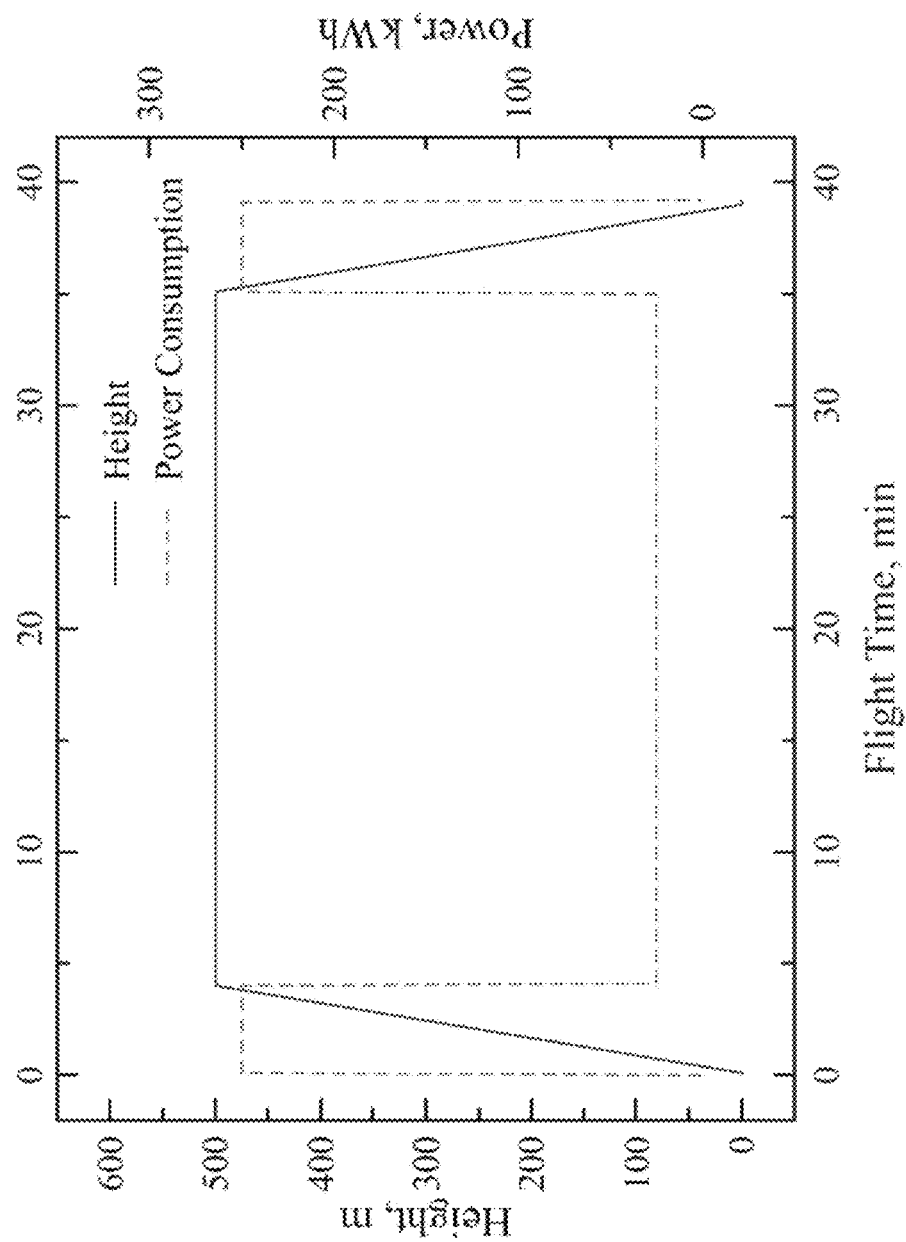
FIG. 15 is a graph showing a flight cyclogram in conjunction with height and energy consumption, in accordance with some embodiments.

FIG. 15 is a graph showing a flight cyclogram in conjunction with height and energy consumption, in accordance with some embodiments.

Figure 16:
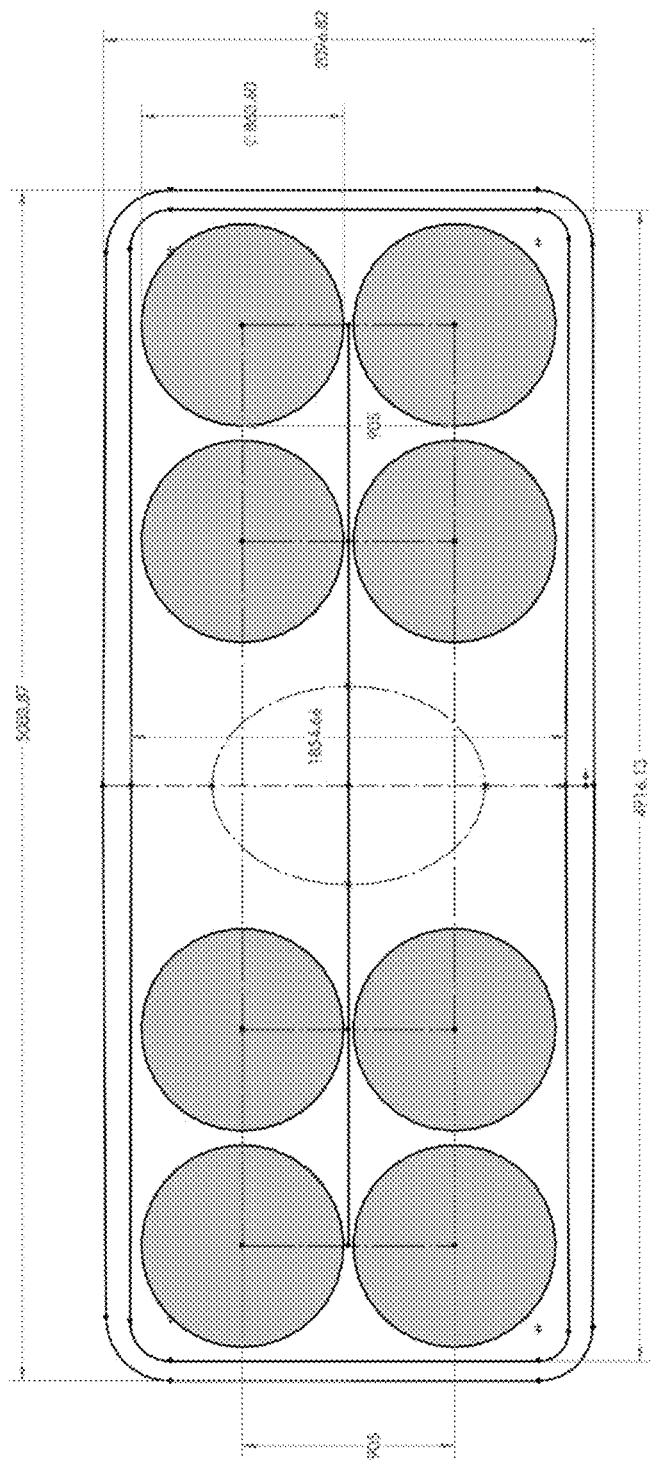
FIG. 16 is a diagram showing configuration details of a VTOL aircraft, in accordance with some embodiments.

FIG. 16 is a diagram showing configuration details of a VTOL aircraft, in accordance with some embodiments.

FIG. 17 is an exemplary exploded view showing modularity of the wing sections along with joints of wing frame to the support frame, in accordance with some embodiments.

In some embodiments, the VTOL aircraft 100 and 200 may be extended to an automobile functionality.

Table 1 below shows general characteristics of the VTOL aircraft 200, heavier, longer range version—Model A, in accordance with some embodiments. These parameters are merely examples, and can vary.

| Example characteristics | Value |
|---|---|
| Capacity: | One - two passenger |
| Length, m | 5.09 |
| Width, m | 2.12 |
| Height, m | 2.2 |
| Empty weight, kg | 400 |
| Nominal payload weight, kg | 80 |
| Nominal gross weight, kg | 480 |
| Maximum payload weight, kg | 120 |
| Cruise speed, m/s | 50.14 |
| Stall speed, m/s | 0 |
| Never exceed speed m/s | 75.2 |
| Endurance in cruise, min | 57 |
| Range, km: | 171 |
| Service ceiling, km: | 0 |
| Rate of climb, m/s: | 4 |
| Transition time from vertical to horizontal flight mode, sec | 5-8 |
| Power plant: | 8 BLDC motors |
| Motors: | |
| Motor max burst power, kW | 110 |
| Motor max continuous power. kW | 32 |
| Max thrust to weight ratio | 3 |
| Battery capacity, kWh | 30 |
| Hover total power consumption, kW | 211 |
| Cruise total power consumption, kW | 26 |
| Battery: | |
| Total capacity, kWh | 30 |
| Number of Lithium-Polymer cells in the battery | 72 |
| No Load rated voltage, V | 274 |
| Max folly charged no load voltage, V | 295 |
| ESC (Electronic speed controller): | |
| Max voltage, V | 800 (for rated voltage 274 V) |
| Max burst current, A | 600 |
| Max output RMS voltage, V | 209 |
| Type of control | Field oriented control, sinusoidal waveform |
| Propellers: | 5-bladed, Carbon fiber, Variable pitch |
| Propeller diameter, m | 0.864 |
| Propeller pitch | Variable from 0 to infinity |
| Propeller pitch at hovering, inches | 14 |
| Number of rotors | 8 |
| Wing: | |
| Wing aspect ratio | 5 |
| Wing loading, kg/m² | 51 |
| Wing area, m² | 9.48 |
| Wing root chord length, m | 1 |
| Vertical stabilizer chord length, m | 0.71 |
| Lift to Drag ratio | 9.82 |

-continued

| Example characteristics | Value |
|---|---|
| Wing Reynolds number at cruise speed | 3529395 |
| Cruise wing angle of attack, degrees | 8 |

Table 2 below shows example weight characteristics of the VTOL aircraft 200, for the heavier, longer range Model A version, in accordance with some embodiments. These parameters are merely examples, and can vary.

| Component | Weight, kg |
|---|---|
| Wing | 37.8 |
| Tubes | 12 |
| Motors | 47.2 |
| Frame | 20 |
| Propellers | 2.4 |
| fasteners | 4 |
| Cabin | 35 |
| Cabin mechanism | 14 |
| Landing gears | 20 |
| Elevon mechanisms | 2 |
| Battery | 175 |
| ESC | 10.4 |
| Wires | 20 |
| Total Weight | 400 |

Table 3 below shows general characteristics of the VTOL, aircraft 200, for a light, short range embodiment—Model Zero, in accordance with some embodiments. These parameters are merely examples, and can be different based on the use case and aircraft version.

| Example characteristics | Value |
|---|---|
| Capacity: | one passengers |
| Length, m | 5.09 |
| Width, m | 2.12 |
| Height, m | 2.2 |
| Empty weight, kg | 250 |
| Nominal payload weight, kg | 80 |
| Nominal gross weight, kg | 330 |
| Maximum payload weight, kg | 120 |
| Cruise speed, m/s | 32.1 |
| Stall speed, m/s | 0 |
| Never exceed speed, m/s | 64.2 |
| Endurance in cruise, min | 3.9 |
| Range, fixed pitch, km | 8 |
| Service ceiling, km | 3.7 |
| Max Rate of climb, m/s | 4 |
| Power plant: | 8 BLDC motors 45 kW each |
| Max thrust to weight ratio | 3 |
| Battery capacity, kWh | 11.4 |
| Hover power consumption, kW | 200 |
| Cruise power consumption Fixed pitch, kW | 50 |
| Cruise power consumption Variable pitch, FW optimized, kW | 18 |
| Propellers | 3-bladed, Carbon fiber, fixed pitch |
| Wing aspect ratio | 5 |
| Wing loading, kg/m² | 35 |
| Wing area, m² | 9.48 |
| Wing root chord length, m | 1 |
| Vertical stabilizer chord length, m | 0.71 |
| Lift to Drag ratio | 9.82 |
| Propeller diameter, m | 0.864 |
| Propeller pitch, m | 0.574 |
| Wing Reynolds number at cruise speed | 2259455 |

Table 4 below shows weight characteristics for the VTOL aircraft 200, for a light, short range version—Model Zero, in accordance with some embodiments. These parameters are merely examples, and can be different based on the use case and aircraft version.

| Component | Weight, kg |
|---|---|
| Wing | 35 |
| Tubes | 12.12 |
| Motors | 47.2 |
| Frame | 20 |
| Propellers | 2.4 |
| fasteners | 3 |
| Simplified cabin | 30 |
| Cabin mechanism | 10 |
| Landing gears | 15 |
| Elevon mechanisms | 2 |

-continued

| Component | Weight, kg |
|---|---|
| Battery | 60 |
| ESC | 9.6 |
| Wires, battery close to motor placement | 4 |
| Total Weight | 250 |

Table 5 below shows two additional versions of the aircraft for one and two seater configurations for the VTOL, aircraft 200 (Model A), in accordance with some embodiments. These parameters are merely examples, and can be different based on the use case and aircraft version.

| Example Parameter | Value (for one sitter) | Value (for two sitter) | Notes |
|---|---|---|---|
| Weight Parameters | | | |
| Person (s)/cargo | 100 kg | 200 kg | |
| Without person | 300 kg | 300 kg | |
| With person (s) | 400 kg | 500 kg | |
| Batteries weight | 190 kg | 190 kg | |
| Flight Parameters | | | |
| Vertical flight time | 1.2 min | 1.2 min | |
| Horizontal (forward) flight time | 58 min | 46 min | |
| Cruise Speed | 85 mph | 85 mph | |
| Flight Distance | 82 miles | 65 mps | derivative from flight time and cruise speed |
| Flight Ceiling in MC mode | 320 m | 320 m | can be more but flight time in forward flight (FW) will be reduced |
| Rate of climb in vertical flight | 4 m/s | 4 m/s | MC mode (multicopter mode) |
| Power Train Parameters | | | |
| Power (electrical) in vertical flight | 230 kW | 325 kWh | |
| Power (electrical) in horizontal flight | 25.5 kW | 32.5 kWh | |
| Batteries capacity | 32.5 KWh | 32.5 kWh | |
| Aerodynamic parameters | | | |
| Wing Area | 9.5 m2 | 9.5 m2 | |
| "Stall" speed | 52 mph | 55 mph | MC (multicopter mode) and FW (forward flight) blending before 55 mph |

Table 6 below shows parameters of two different version of the VTOL, aircraft 200 (option 1 and option 2) with different KV of the motors, in accordance with some embodiments. These parameters are merely examples, and can be different based on the use case and aircraft version.

| Example Parameter | Option 1 (50 KV) | Option 2 (80 KV) | Derivative Value |
|---|---|---|---|
| Weight Parameters | | | |
| Person (s)/cargo | 70 kg | 70 kg | |
| Without person | 300 kg | 300 kg | |
| With person (s) | 370 kg | 370 kg | |
| Batteries weight | n/a | n/a | |
| Propellers | | | |
| Diameter/Pitch | 34/14 | 34/14 | |
| Tip speed, 100% Throttle | 0.91M | 0.95M | |
| Tip speed, 80% Throttle | 0.73M | 0.76 | |

-continued

| Example Parameter | Option 1 (50 KV) | Option 2 (80 KV) | Derivative Value | |
|---|---|---|---|---|
| Motor | | | | |
| KV | 50 | 80 | | |
| Power, KW | 25-30 | 25-30 | | |
| RPM, 100% Throttle | 6845 | 7100 | | |
| Voltage, V | 137 | 89 | | |
| Current, 100% Throttle | 164 | 279 | | |
| Flight params - Vertical | | | | |
| Thrust 100% Throttle, kg | 76 | 80 | 608 | kg |
| Thrust 70% Throttle, kg | 48 | 52 | 384 | kg |
| Vertical flight time | 4 min | 4 min | | |
| Flight params - Horizontal | | | | |
| Horizontal (forward) flight time | 15 min | 15 min | | |
| Cruise Speed | 80 mph | 80 mph | | |
| Flight Distance | | | | |
| PowerTrain Parameters | | | | |
| Power (electrical) in vertical flight, 80% Throttle motor | 17 kW | 17.6 kW | | |
| Power (electrical) in vertical flight, 100% Throttle, motor | 25-30 kW | 26 kW | | |
| Power (electrical) in vertical flight | 178 kW | 186 kW | | |
| Power (electrical) in horizontal flight | 67 kW | 67 kW | | |
| Batteries capacity | | | | |

Table 7 below shows additional characteristics of the VTOL aircraft 200, in vertical flight, in accordance with some embodiments. Different empty weights are shown as some versions of the aircraft may have different empty weights and maximum payloads. These parameters are merely examples, and can vary.

Table 8 below shows the power lines characteristics estimations of the VTOL aircraft 200 in case of a central battery placement for 35% hover case with 4 inner motors fail, in accordance with some embodiments. The estimations are given for various wire sizes. These parameters are merely examples, and can be different based on the use case and aircraft version.

| Example characteristics | 3 | Model A | 2 | 1 | Model Zero |
|---|---|---|---|---|---|
| Aircraft empty weight (with batteries), kg | 450 | 400 | 350 | 300 | 250 |
| Propeller FOM (figure of merit), % (TBD) | 55.8 | 55.8 | 55.8 | 55.8 | 55.8 |
| Passenger weight, kg | 80 | 80 | 80 | 80 | 80 |
| All-up weight, kg | 530 | 480 | 430 | 380 | 330 |
| Propeller diameter, mm | 863.6 | 863.6 | 863.6 | 863.6 | 863.6 |
| Total Propeller area, A, m$^2$ | 4.69 | 4.69 | 4.69 | 4.69 | 4.69 |
| Disc Loading $L_d$, kg/m$^2$ | 113.10 | 102.43 | 91.76 | 81.09 | 70.42 |
| Disc Loading $L_d$ lbs/sq. ft | 23.17 | 20.98 | 18.79 | 16.61 | 14.42 |
| Load Capacity $C_l$, g/W | 3.76 | 3.95 | 4.17 | 4.44 | 4.76 |
| Load Capacity $C_l$, lbs/kW | 8.29 | 8.71 | 9.20 | 9.79 | 10.50 |
| Load Capacity on 4 motors, g/W | 2.66 | 2.79 | 2.95 | 3.14 | 3.37 |
| Inter-propeller/frame/wing influence coefficient, $K_{pw}$ (TBD) | 1 | 1 | 1 | 1 | 1 |
| Total power in hover $P_h$, kW | 141.0 | 121.5 | 103.0 | 85.6 | 69.3 |
| Total power on 4 motor (outer or inner motors fail), kW | 234.6 | 202.2 | 171.4 | 142.4 | 115.3 |
| Max motor power in 4-motors mode, in 70% hover, kW | 83.8 | 72.2 | 61.2 | 50.9 | 41.2 |
| Motor max power for 35% hover Pm35, kW | 50.4 | 43.4 | 36.8 | 30.6 | 24.7 |
| Motor max power for 40% hover Pm40, kW | 44.1 | 38.0 | 32.2 | 26.8 | 21.6 |
| Motor max power for 50% hover Pm50, kW | 35.3 | 30.4 | 25.8 | 21.4 | 17.3 |
| Battery Voltage (24 s), V | 96 | 96 | 96 | 96 | 96 |
| Motor/ESC max current in 4-motors mode, in 70% hover, A | 873 | 752 | 638 | 530 | 429 |
| Motor/ESC max current for 35% hover $I_{m35}$, A | 525 | 452 | 383 | 318 | 258 |
| Motor/ESC max current for 40% hover $I_{m40}$, A | 459 | 396 | 335 | 279 | 226 |
| Motor/ESC max current for 50% hover $I_{m50}$, A | 367 | 316 | 268 | 223 | 180 |
| Rotors hover thrust to maximum thrust in max fail condition, % | 70 | 70 | 70 | 70 | 70 |
| Motor/ESC nominal current for 35% hover, A | 367 | 316 | 268 | 223 | 180 |
| Motor/ESC nominal current for 40% hover, A | 321 | 277 | 235 | 195 | 158 |
| Motor/ESC nominal current for 50% hover, A | 257 | 222 | 188 | 156 | 126 |

| | Conductor AWG size chosen | | | | | | | | | |
|---|---|---|---|---|---|---|---|---|---|---|
| | 0000 (4/0) | 000 (3/0) | 00 (2/0) | 0 (1/0) | 1 | 2 | 3 | 4 | 5 | 6 |
| Conductor area, mm² | 107 | 85 | 67.4 | 53.5 | 42.4 | 33.6 | 26.7 | 21.2 | 16.8 | 13.3 |
| Conductor approximate working temperature, no motors fail, °C. | 35 | 40 | 45.0 | 50.0 | 60.0 | 70.0 | 82.5 | 97.5 | 121.3 | 145.0 |
| Conductor approximate working temperature, 4 motors fail, °C. | 136 | 167 | 191 | 210 | | | | | | |
| Conductor resistance mOhm/m | 0.161 | 0.203 | 0.2557 | 0.3224 | 0.4066 | 0.513 | 0.6465 | 0.815 | 1.028 | 1.296 |
| Resistance increase at working temperature relative to 20 deg, % | 5.90 | 7.86 | 9.83 | 11.79 | 15.72 | 19.65 | 24.56 | 30.46 | 39.79 | 49.13 |
| Total inner motors wire length for the central battery scheme, m | | | | | 20 | | | | | |
| Total outer motors wire length for the central battery scheme, m | | | | | 28 | | | | | |
| Resistance at working temperature, mOhm/m | 0.170 | 0.219 | 0.281 | 0.360 | 0.471 | 0.613 | 0.805 | 1.063 | 1.437 | 1.933 |
| Total power dissipation at working tempenirure, W | 107 | 138 | 177 | 227 | 296 | 386 | 507 | 670 | 905 | 1218 |
| Wire power loss, % | 0.19 | 0.24 | 0.31 | 0.39 | 0.51 | 0.67 | 0.88 | 1.16 | 1.57 | 2.11 |
| Wire weight per meter. without insulation, kg | 0.959 | 0.762 | 0.604 | 0.479 | 0.380 | 0.301 | 0.239 | 0.190 | 0.151 | 0.119 |
| Wire weight per meter, with insulation, kg/km | 1,135.1 | 911.1 | 741.91 | 597.98 | 494.11 | 372.44 | | 249.3 | | 214.29 |
| Total wire weight, without insulation, kg | 46.0 | 36.6 | 29.0 | 23.0 | 18.2 | 14.5 | 11.5 | 9.1 | 7.2 | 5.7 |
| Total wire weight, with insulation, kg | 54.5 | 43.7 | 35.6 | 28.7 | 23.7 | 17.9 | | 12.0 | | 10.3 |

Table 9 below shows the dependence of the aircraft cruise speed to its all-up weight. The predictions are done by using VLM (Vortex Lattice Method) calculation analysis, Different aircraft versions may have different weights, some of the version names are shown in the last column. These parameters are merely examples, and can vary.

| Vehicle empty weight, kg | All-up weight, kg | Angle of attack, degrees | Cruise speed, m/s | Cruise speed, mph | Version name |
|---|---|---|---|---|---|
| 400 | 480 | 8 | 38.75 | 86.67 | Model A |
| 300 | 380 | 8 | 34.5 | 77.17 | |
| 250 | 330 | 8 | 32.08 | 71.76 | Model Zero |
| 200 | 280 | 8 | 29.55 | 66.10 | |
| 150 | 230 | 8 | 26.79 | 59.93 | |
| 125 | 205 | 8 | 25.33 | 56.66 | Ultralight version |

Table 10 below shows optimal values for propeller pitch and motor KV for a particular flight mode of the VTOL aircraft 200, in accordance with some embodiments. These parameters are merely examples, and can be different based on the use case and aircraft version.

| Description | Air Speed | Propeller Pitch, inches | Motor KV | Motor power, KW |
|---|---|---|---|---|
| Motor KV optimal for MC for 34 × 14 prop and 45 KW motor | | 14 | 104.9 | 45 |
| Propeller pitch optimal for MC for 34 inch prop, 80 KV | | 22.664 | 80.0 | 45 |
| Propeller pitch optimal for FW for 34 inch prop, 80 KV | 71 mph | 34.7702 | 80.0 | 45 |

Table 11 below shows propeller and motor characteristics of the VTOL aircraft 200, in accordance with some embodiments. These parameters are merely examples, and can vary.

| Propeller configuration: blades, Diameter (inches) × Pitch (inches) | Motor KV (speed to voltage ratio), rpm/V | Propeller maximum rotational speed, rpm | Propeller rotational speed at Mach number 1, rpm | Mach number at propeller tip | Air-raft all-Lithium up-weight, kg | Battery Motor Polymer cells | maximum power, kW | Aircraft version name |
|---|---|---|---|---|---|---|---|---|
| 3 bladed 34 × 22.6 | 77 | 6697 | 7585 | 0.88 | 330 | 28 | 50 | Model Zero |
| 2 bladed 36 × 24 | 76 | 6685 | 7164 | 0.93 | 330 | 28 | 50 | Model Zero |
| 2 bladed 34 × 22.6 | 85 | 7424 | 7585 | 0.98 | 330 | 28 | 50 | Model Zeto |
| 2 bladed 35 × 23.3 | 80 | 7424 | 7369 | 1.01 | 330 | 28 | 50 | Model Zero |
| 2 bladed 32 × 22 | 96 | 8240 | 8060 | 1.02 | 330 | 28 | 50 | Model Zero |
| 3 bladed 34 × 22.6 | 90 | 6515 | 7585 | 0.86 | 330 | 24 | 50 | Model Zero |
| 2 bladed 32 × 22 | 113 | 8052 | 8060 | 1.00 | 330 | 24 | 50 | Model A |
| 5 bladed, 34 × 22.6 | 31 | 7454 | 7585 | 0.98 | 480 | 72 | 50 | Model A |
| 2 bladed 34 × 22.6 | 73 | 6743 | 7585 | 0.89 | 330 | 24 | 35 | Model Zero |
| 3 bladed 34 × 22.6 | 63 | 5896 | 7585 | 0.78 | 330 | 24 | 35 | Model Zero |

Table 12 below shows weight estimations and other characteristics of the two versions of internal structure of the wing of the VTOL aircraft 200, in accordance with some embodiments. These parameters are merely examples, and can be different based on the use case and aircraft version.

| Parameter | Solid foam core version | Honeycomb sandwich version |
|---|---|---|
| Wing surface area, m² | 25.2 | 25.2 |
| Wing volume, m³ | 0.833 | 0.833 |
| Honeycomb, density, kg/m² | | 29.0 |
| Honeycomb, thickness, mm | | 3.0 |
| Honeycomb weight, for the whole wing surface, kg | | 2.2 |
| Foam density, lbs per square foot | 1.0 | |
| Foam density, kg/m³ | 16.0 | |
| Foam total weight, kg | 13.3 | |
| Honeycomb to foam weight advantage, kg | | 11.1 |
| Wing perimeter, m | 16.0 | 16.0 |
| Carbon fiber fabric layers | 3 | 3 |
| Total fiber length, m | 48.0 | 48.0 |
| Carbon Fiber weight, kg | 28.85 | 28.85 |
| Total wing weight, kg | 42.2 | 31.1 |

Table 13 below shows characteristics of the wing of the VTOL aircraft 200, predicted by a CFD (Computational fluid dynamics) simulation, in accordance with some embodiments. These parameters are merely examples, and can be different based on the use case and aircraft version.

| Angle of attack, degrees | Air speed, m/s | Lift, N | Drag, N | Pitching Moment, Nm | Lift to Drag ratio |
|---|---|---|---|---|---|
| 0.5 | 158.549 | 6173 | 1965.5 | −5071.36 | 3.1 |
| 1 | 103.313 | 4490.3 | 860.08 | −1477.45 | 5.2 |
| 2 | 70.458 | 4394.32 | 454.456 | 42.821 | 9.7 |
| 3 | 56.886 | 4074.02 | 330.302 | 326.084 | 12.3 |
| 4 | 49.008 | 4052.22 | 284.132 | 534.552 | 14.3 |
| 5 | 43.7112 | 3906.9 | 253.034 | 574.41 | 15.4 |
| 6 | 39.843 | 3953.72 | 252.06 | 678.452 | 15.7 |
| 7 | 36.861 | 3894.06 | 258.152 | 714.108 | 15.1 |
| 8 | 34.372 | 3831.42 | 264.586 | 712.576 | 14.5 |
| 9 | 32.508 | 3923.56 | 285.13 | 782.608 | 13.8 |
| 10 | 30.856 | 3908.36 | 298.592 | 808.152 | 13.1 |
| 11 | 29.443 | 3871.16 | 314.532 | 803.878 | 12.3 |
| 12 | 28.218 | 3804.08 | 333.952 | 809.858 | 11.4 |
| 13 | 27.145 | 4097.16 | 374.86 | 892.964 | 10.9 |
| 14 | 26.195 | 3513.26 | 359.836 | 808.848 | 9.8 |
| 15 | 25.347 | 3464.96 | 394.576 | 881.108 | 8.8 |
| 16 | 24.585 | 3250.42 | 448.388 | 775.114 | 7.2 |
| 17 | 23.897 | 2808.38 | 532.706 | 925.056 | 5.3 |
| 18 | 23.272 | 2852.92 | 561.34 | 884.302 | 5.1 |
| 19 | 22.702 | 2558.48 | 566.57 | 828.994 | 4.5 |
| 20 | 22.179 | 2589 | 610.916 | 911.258 | 4.2 |
| 24 | 20.468 | 2055.46 | 663.384 | 732.602 | 3.1 |

Figure 18:
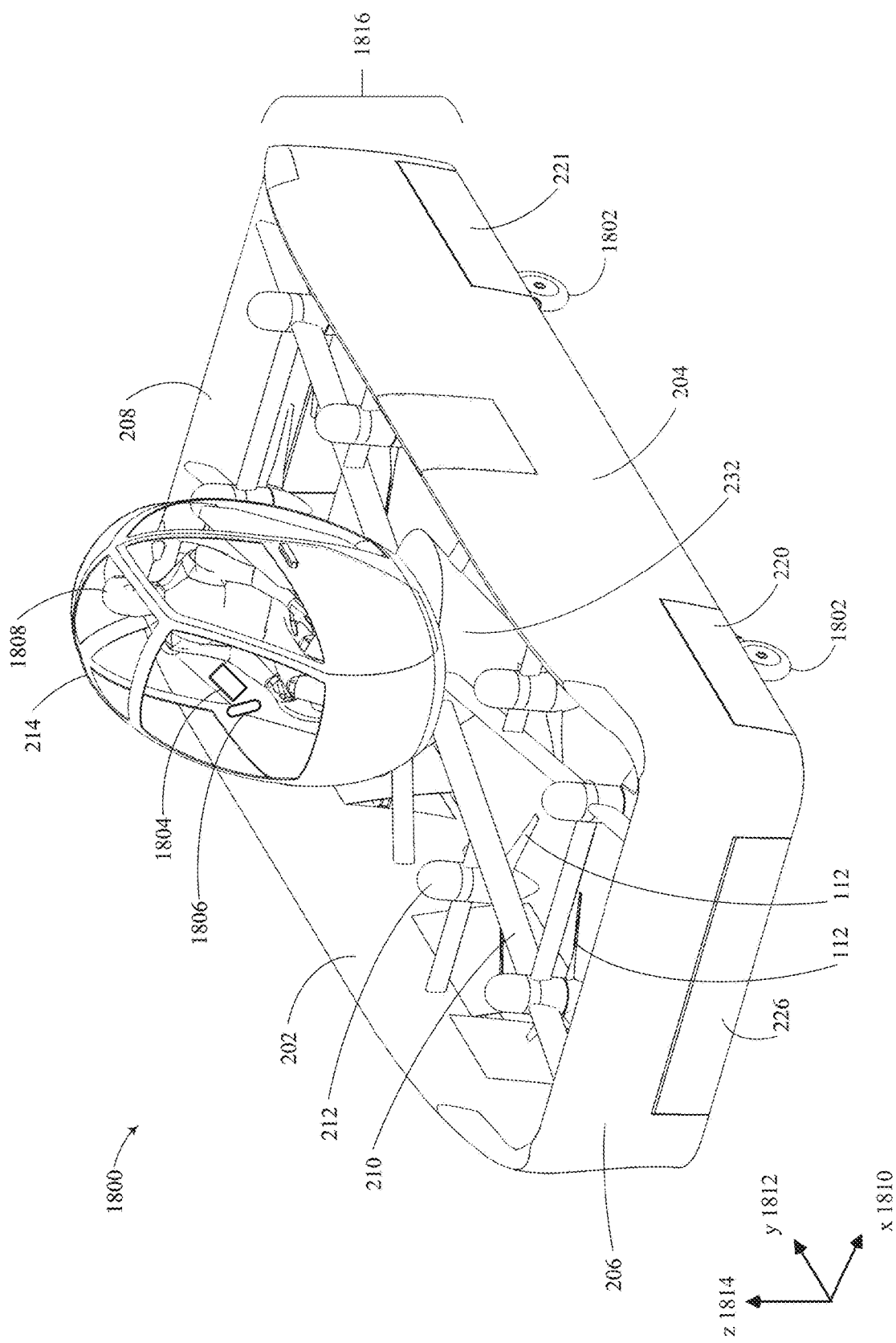
FIG. 18 is a perspective view of an aircraft according to an embodiment in a first configuration.

FIG. 18 is a perspective view of an aircraft 1800 according to an embodiment. In FIG. 18, cabin 214 is equipped with a master control unit (MCU) 1804 and a control stick 1806. In automated modes (both driving and flying), MCU 1804 has software and a user interface and is in control of aircraft 1800 with input from an operator 1808 and sensors (see FIG. 31 and description), e.g., accelerometers, gyroscopes, altimeter, speedometer, airspeed indicator, and a global-positioning system, all of which may be mounted within cabin 214 or on aircraft 1800 external from cabin 214. In manual modes (both driving and flying), operator 1808 may control aircraft 1800 using control stick 1806, e.g., to steer wheels 1802, which may be driven by hub-mounted brushless motors (not shown). A coordinate reference system is shown to facilitate description of aircraft 1800 and the various modes of travel, which includes a lateral axis 1810, a longitudinal axis 1812, and a vertical axis 1814. Axes 1810, 1812 define a horizontal plane, with wing sections 202, 204 being elongate along y-axis 1812, and with axis 1814 indicating height or altitude. In this reference system, y-axis 1812 will remain parallel to the elongate dimension of wing sections 202, 204.

Aircraft 1800, as described earlier, may include frame 210, which in the embodiment is an X-shape frame, allowing 2 motors per frame beam between cabin 214 and vertical wing section 206 or 208. Frame 210 may be constructed from, e.g., composite materials (carbon fiber reinforced polymer), aviation grade aluminum alloy 7075, and other lightweight materials. Titanium may be used in critical and heavily loaded parts and joints. Frame beams may themselves have an airfoil shape to minimize parasitic drag. For convenience, the elements other than cabin 214 will be referred to as a box-wing 1816 (i.e., fairing 232, frame 210, propellers 212, wing sections 202, 204, 206, 208, and wheels 1802).

In the embodiment, frame 210 provides rigidity and support for structural elements of aircraft 1800, such that the relative dimensions between elements, e.g., motors and sensors such as accelerometers and gyroscopes, are fairly constant and sensor measurements reflect movements of aircraft 1800 as a solid body. In frame 210, frame joins may be designed to suppress vibrations that may compromise sensor measurements. In an embodiment, frame joints design has built-in redundancy such that, in case of failure, the redundancy still allows aircraft 1800 to land safely.

In the embodiment, cabin 214 (which may also carry cargo) is an aerodynamic shape that minimizes parasitic aerodynamic drag. Cabin 214 is connected to frame 210 by means of servomotors or fixed mounts and faring 232 is provided to further minimize parasitic drag in forward flight. In the embodiment, aircraft 1800 is designed to carry one full size person. In other embodiments, the aircraft may be modified to carry additional passengers, or cargo (in embodiments of special service aircraft). In embodiments, the operator (pilot) position is maintained in the seated, semi-reclined position when aircraft 1800 is in any of its several modes and transitioning between those modes. In other words, seat 1904 is rotated with respect to frame 210 and wing sections 202, 204 so that seat 1904 does not rotate about y-axis 1812 (see, e.g., FIG. 23.) In the embodiment, cabin 214 may be rotated about both z-axis 1814 and y-axis 1812 using, e.g., servo motors, pneumatic actuators, or hydraulic actuators. In an embodiment, cabin 214 may rotate about z-axis 1814 with respect to frame 210 and seat 1904 may rotate within cabin 214 about y-axis 1812 with cabin 214 remaining otherwise fixed relative to y-axis 1812. In some embodiments, the center of gravity of the cabin and the passenger may coincide with, or be very close to, the center of gravity of the aircraft to help reduce the influence of the weight of the passenger on the stability of the aircraft.

In various embodiments, aircraft 1800 may be operated in a number of modes: a driving mode (DR), a multicopter mode (MC), a forward flight mode (FW), and a transition mode (TR) between MC mode and FW mode. TR mode also works in reverse to transition from FW mode to MC mode, which is required to land the aircraft. By having the capability to switch between DR mode and FW mode, aircraft 1800 provides the option of flight when it becomes difficult to drive, and, conversely, the option of driving when it become impossible or irrational to fly.

Figure 19:
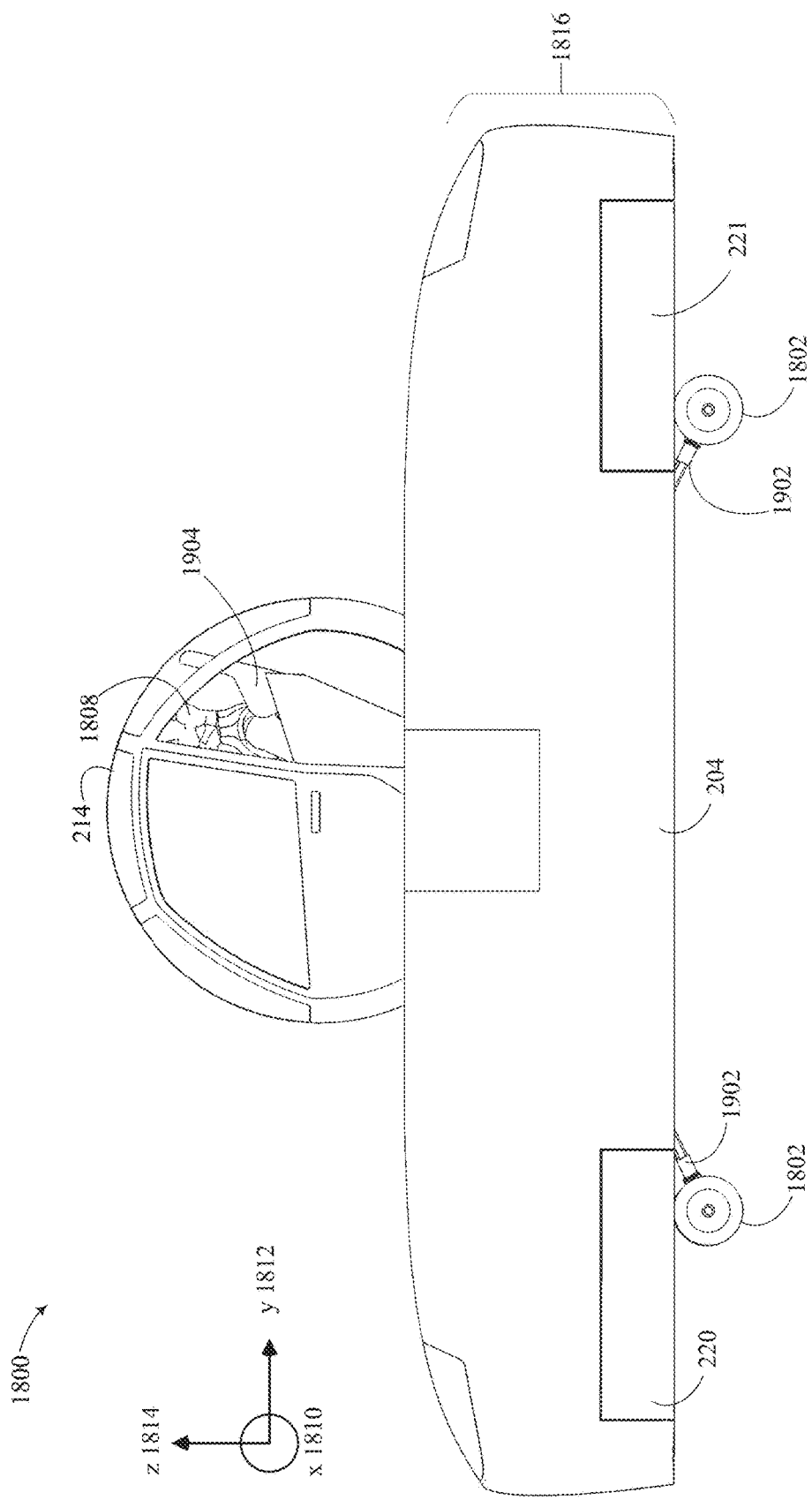
FIG. 19 is a right-side view of the aircraft according to the embodiment of FIG. 18.
Figure 20:
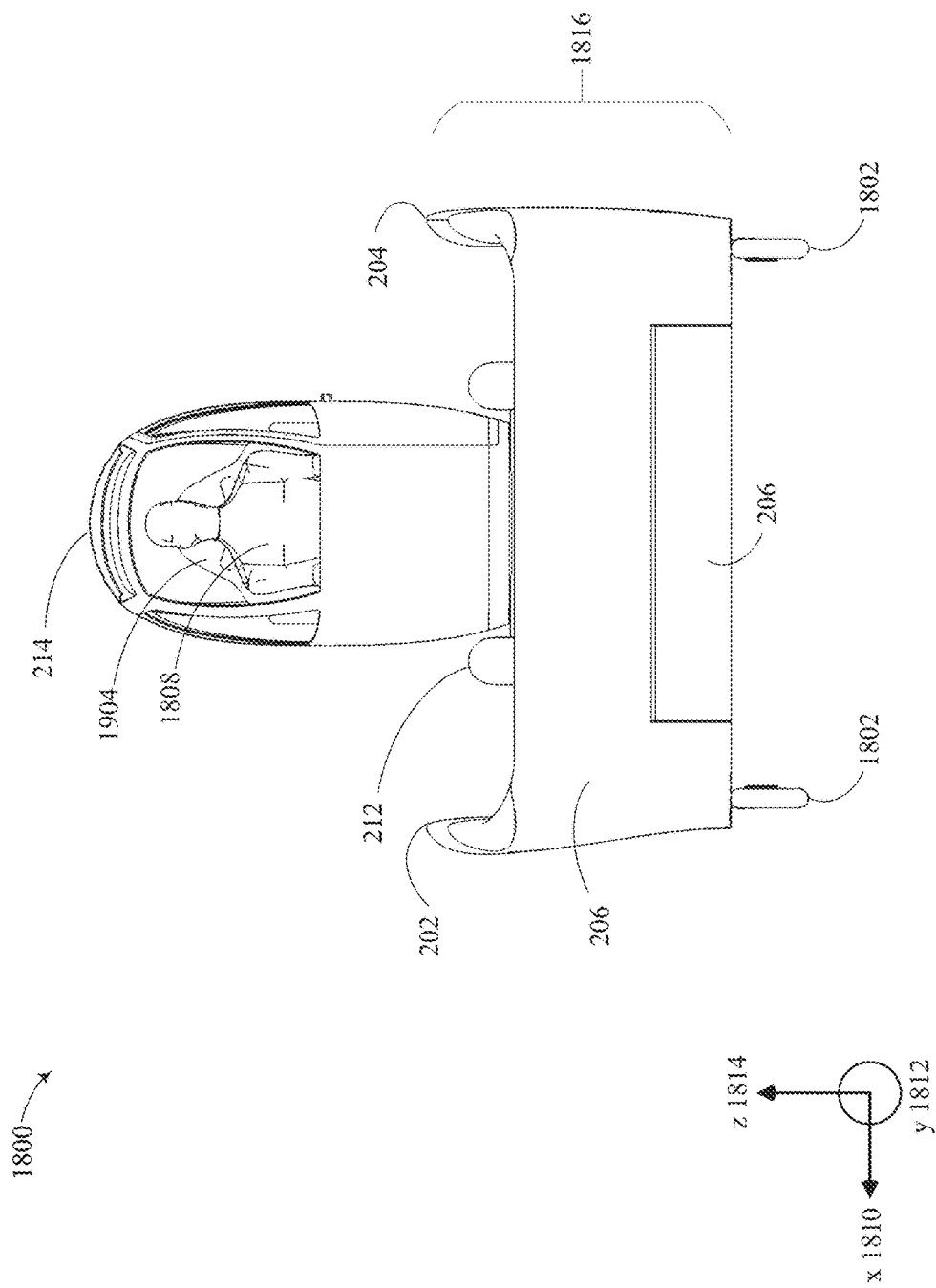
FIG. 20 is a front view of the aircraft according to the embodiment of FIG. 18.
Figure 21:
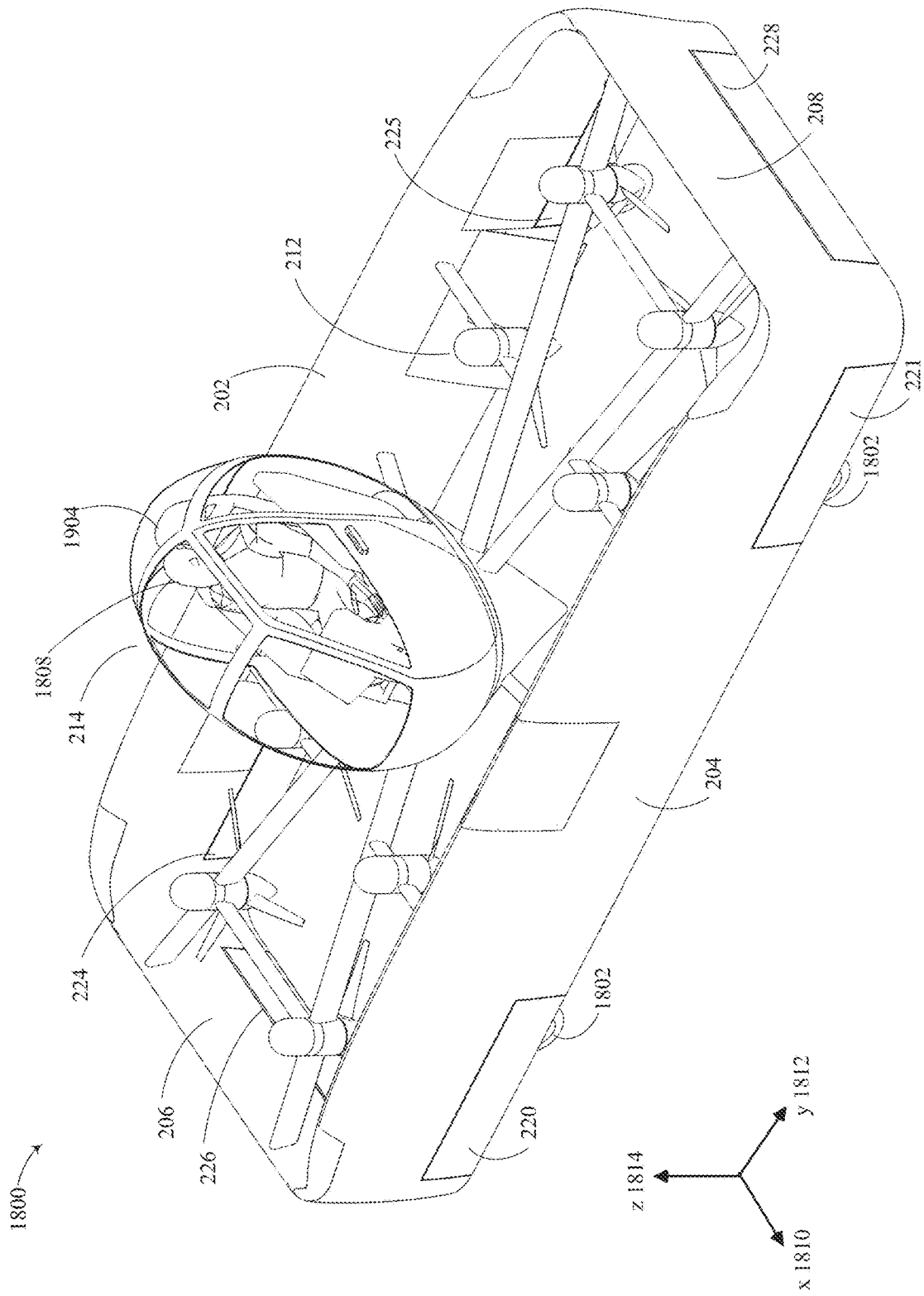

FIGS. 18-20 are perspective, right-side, and front views, respectively, of aircraft 1800 in DR mode. In DR mode, in a first method of operation of aircraft 1800, at least one of wheels 1802 is equipped with an electric hub motor or driven by an electric motor that provides forward and backward motive force. Speed control of the motor may be provided by an ESC (electronic speed controller) which itself is guided by operator controls 1806 or autonomously based pre-uploaded algorithms in MCU 1804. For example, the ESC may be located at the motor hub, above the motor, or at some central location. Steering of aircraft 1800 is achieved by rotating the front or back pairs of wheels 1802 (or both front and back) using, e.g., high speed servomotors or by changing the angle of wheel retraction strut 1902 with respect to the aircraft 1800 centerline. Braking may be achieved using regenerative braking from same motor or motors used for driving using the motor as an electrical generator, which provide resistance to forward or backward movement. In advance of MC mode, aircraft is completely stopped and propellers 212 are brought up to spin at a minimal RPM an RPM providing a total thrust that is less than the weight of aircraft 1800.

FIGS. 21-25 are perspective, right-side, and front views, respectively, of aircraft 1800 in MC mode. In the first embodiment of the method, in MC mode, vertical flight is achieved using thrust produced by propellers 212. Wheels 1802 have been retracted in FIG. 25. Propellers 212 may be connected to their associated motors either by being directly connected to the motor shaft, or being connected through a gear box. As with wheels 1802, propeller motors are each controlled by an ESC (not shown) that is itself is controlled autonomously by MCU 1804 or by an operator through control stick 1806, or a combination of the two. Thrust is provided by applying torque from motor to the associated propeller and controlled by as associated ESC providing more or less current to the motor. In the embodiment, the pictured number of motor/propeller units is 8, however, in other embodiments other numbers may be used, e.g., 3 motor/propeller units may be positions about cabin 214 within box-wing 1816 such that cabin 214 is at the center of a triangle with each motor/propeller unit being at a vertex of the triangle. In embodiments, aircraft 1800 may hover in MC mode so long as the motor/propeller units are sized to provide a total thrust that is greater than or equal to the apparatus's weight. In MC mode, flight is controlled by changing the thrust produced by each motor/propeller unit to change the combined thrust vector with respect to CG 2306. For example, to go forward, thrust from the front motors is decreased and thrust from the rear motors is increased, resulting in a forward tilt of the apparatus and a corresponding forward component added to the thrust vector. Stability of the apparatus is provided in the same manner by changing the thrust provided by each motor/propeller unit. For example, in case of apparatus 1800 tilting or rotating, the thrust of one or more of the motor/propeller units is adjusted to compensate for the tilt or rotation. This compensation may be controlled by, e.g., MCU 1804 or operator 1808 using control stick 1806, or a combination of both.

As shown in the figures, cabin 214 is centered among eight motor/propeller units. However, in other embodiments, the number and type of the thrust units may be different. For example, cabin 214 may be centered between as few as three thrust units. Generally, embodiments should be equipped with propulsion sources that are symmetrically spaced about the CG of the aircraft for flight in MC mode. For FW mode, there is more freedom to position the thrust sources with regard to the center of gravity.

Figure 26:
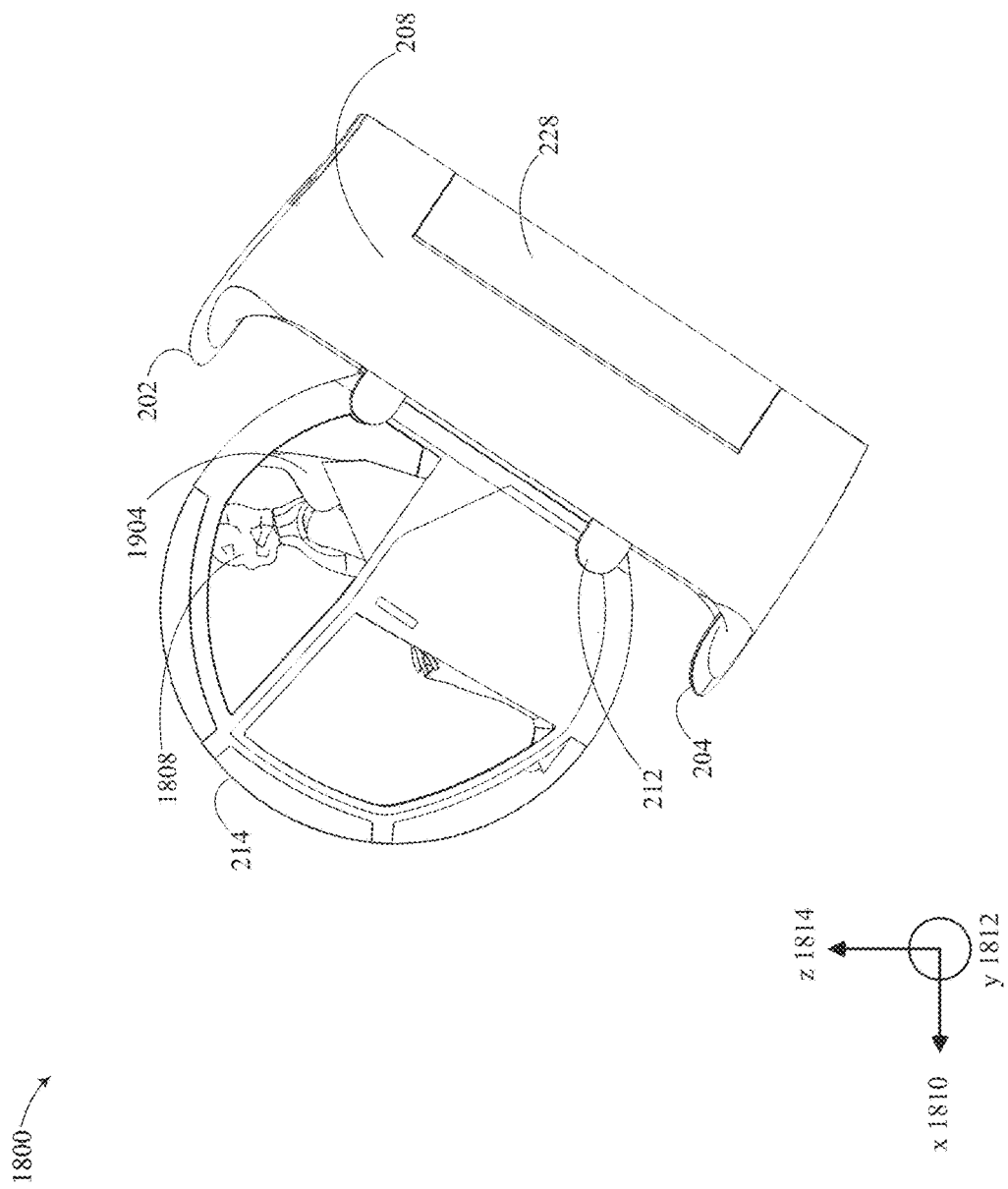
FIG. 26 is a right-side view of the aircraft according to the embodiment of FIG. 18 in the second configuration.
Figure 27:
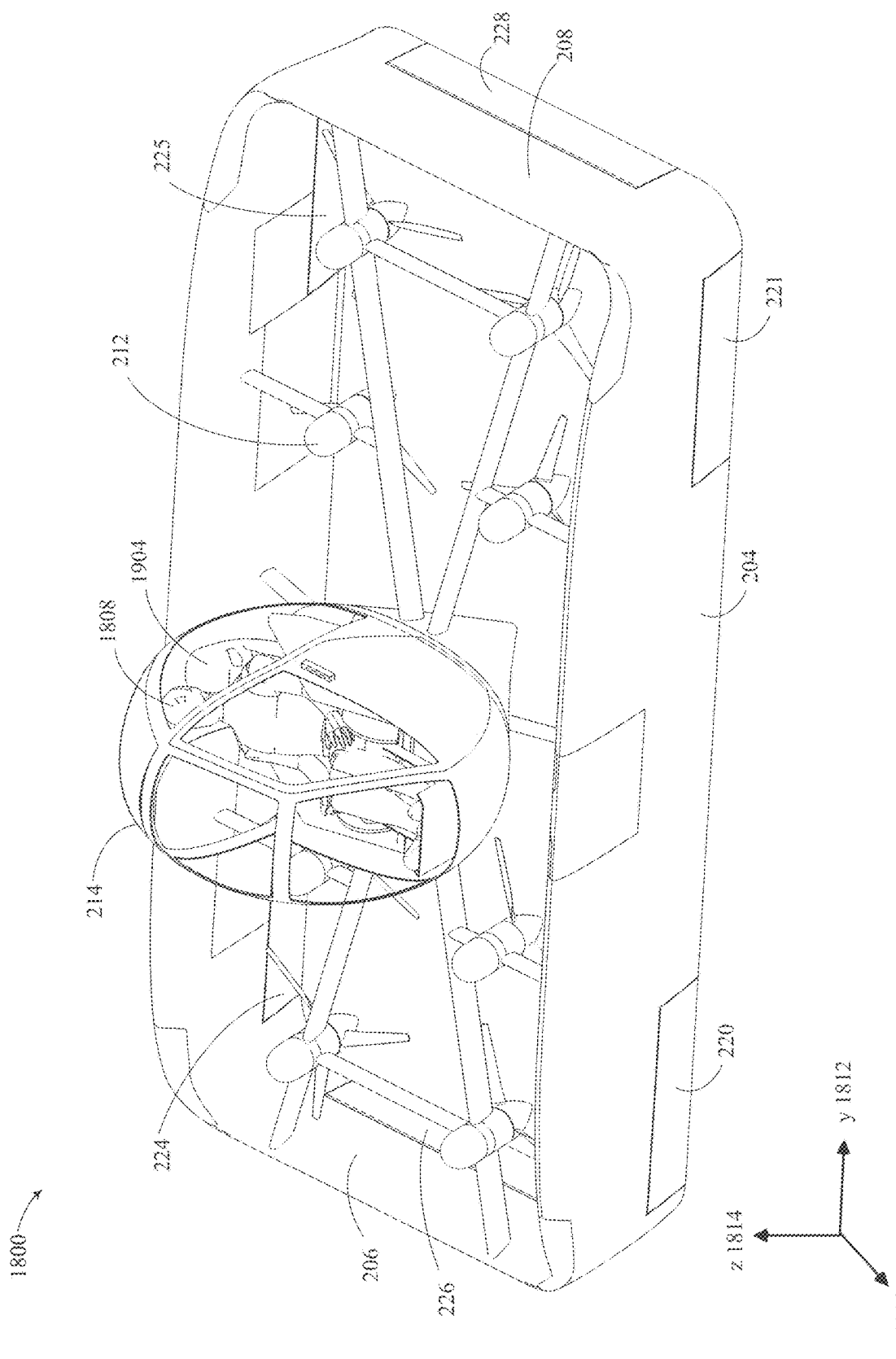
FIG. 27 is a perspective view of the aircraft according to the embodiment of FIG. 18 in the second configuration.
Figure 28:
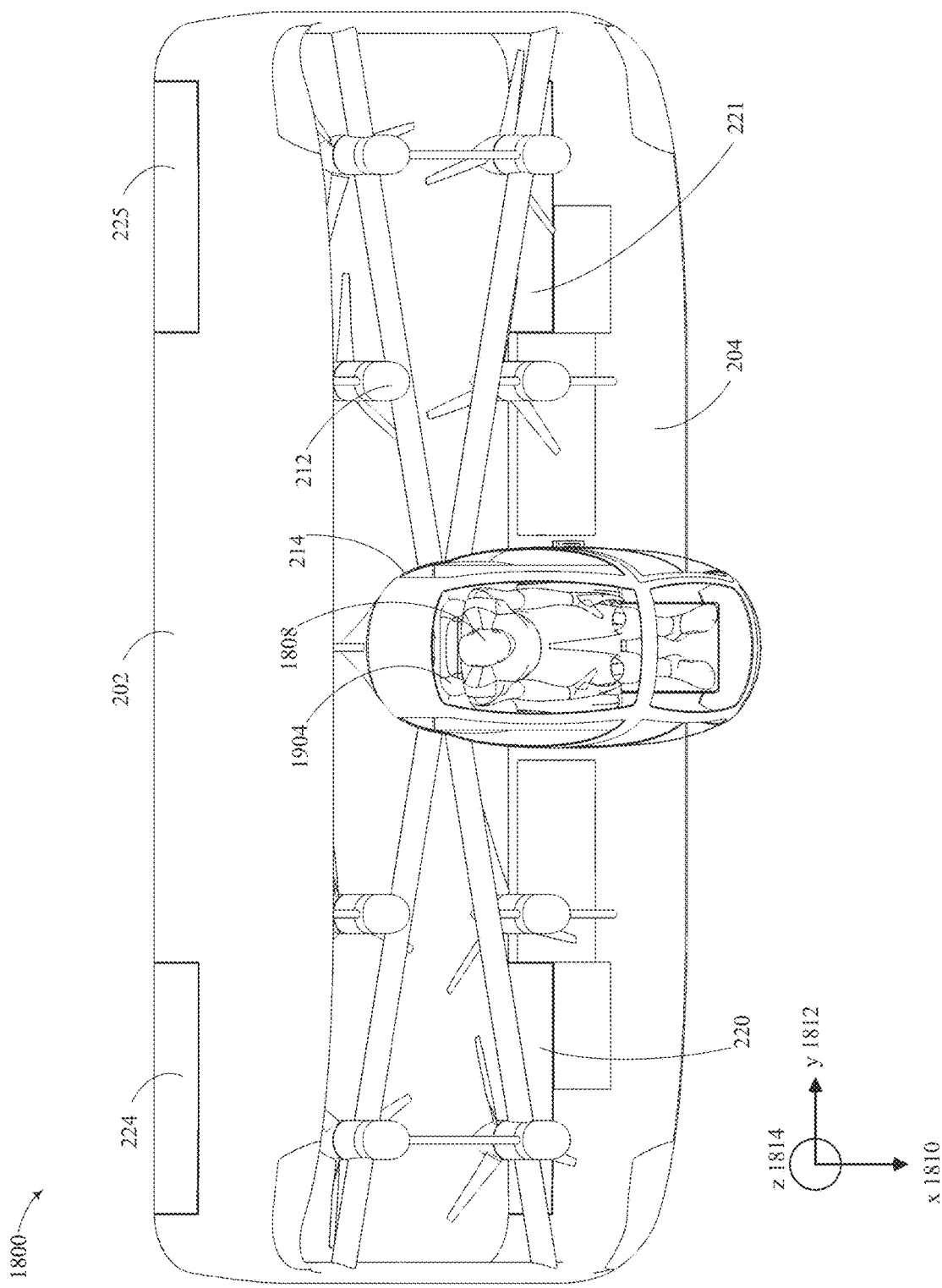
FIG. 28 is a top view of an aircraft according to the embodiment of FIG. 18 in the second configuration.

FIGS. 26-28 are right-side, perspective, and top views, respectively, of aircraft 1800 in TR mode. In the first embodiment of the method, in TR mode, apparatus 1800 has attained a safe height, e.g., 50-100 meters and, in FIG. 26, begun to the rotation of box wing 1816 from the orientation of DR and MC modes in which the wing surfaces are vertically oriented and non-lift providing to the orientation of FW mode in which the wing surfaces are horizontally oriented to provide lift. Box wing 1816 is rotated about y-axis 1812 forward toward x-axis 1810. In FIG. 26, box wing 1816 is tilted at approximately a 45 degree angle. Initially, as box wing 1816 begins to rotate, there is little forward motion and control is primarily achieved using MC control modes. As box wing 1816 rotates, the change in the thrust vector adds a horizontal component and aircraft 1800 begins accelerating forward. In an embodiment, the thrust of the motors is increased in TR mode to up to 70-80%, which will be adjusted by the flight controller to maintain the desired altitude. As forward speed increases FW control modes (control using elevons 220-225 and rudders 226, 228) are increasingly effective and implemented. After reaching a certain forward speed and a certain angle (dictated by the lift to drag ratio of the airfoils) lift generated by wing sections 202, 204 begins to dominate drag and FW control (described in more detail below) is adopted in full. The change from MC mode control to FW mode control is not immediate. Rather, FW mode control is phased in (or "blended in") and MC mode control phased out as forward speed increases. In the embodiment, TR mode ends when aircraft 1800 has rotated and the both wing sections 202, 204 has reached an angle of attack of 5-8 degrees. That is, if upper wing section 202 has a greater angle of attack than lower wing section 204, lower wing section 204 will reach the 5-8 degree range sooner than upper wing section 202, and TR mode would end when upper wing section 202 has also reached an angle of attack within the 5-8 degree range. In embodiments, the speed at which TR mode ends is dependent upon wing properties, such as the CL/CD ratio ((ratio of the coefficient of lift to the coefficient of drag), and the speed at which the combined wing sections provide enough lift given the loaded, operational weight of the aircraft.

Figure 29:
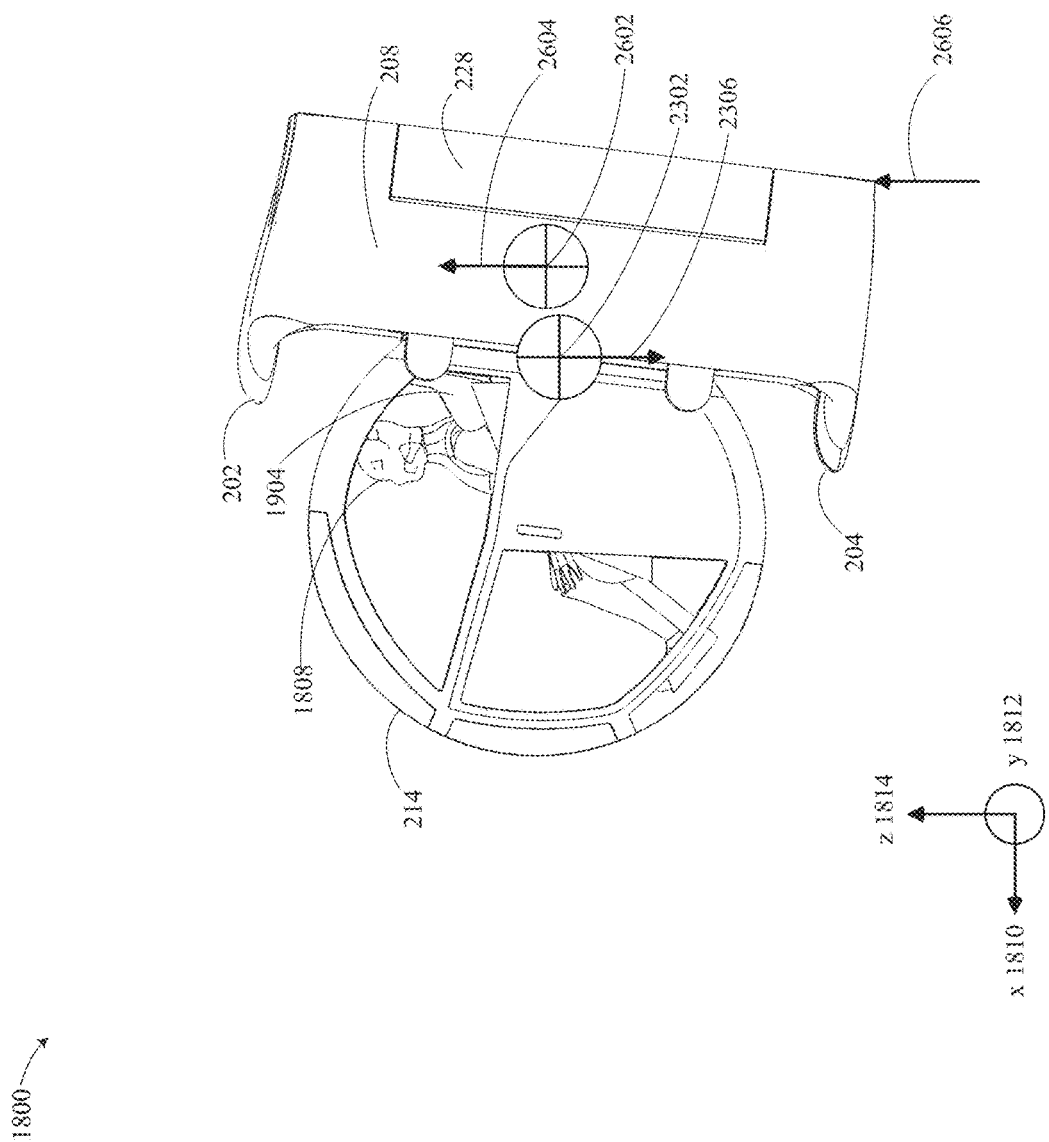
FIG. 29 is a right-side view of an aircraft according to the embodiment of FIG. 18 in the second configuration.

FIG. 29 is a right-side view of aircraft 1800 in FW mode. In FW mode, in the first embodiment, aircraft 1800 is operated more like a standard airplane. That is, in order to maintain forward flight and produce enough lift, aircraft 1800 must maintain a speed that provides an adequate airflow over wing surfaces 202, 204. In FW mode, thrust may be provided by the same motor/propeller units 212 that were used in MC mode. In an embodiment, thrust in FW mode may also be provided by one or more dedicated motor/propeller units. In FW mode, altitude and direction changes may be achieved using elevons 220-225. Altitude is gained by increasing the angle of attach of wing surfaces 202, 204, i.e., the trailing edges of elevons 220-225 are raised up. Conversely, altitude is lost by decreasing the angle of attach of wing surfaces 202, 204, i.e., the trailing edges of elevons 220-225 are lowered. Changing the direction of flight to the left is achieved by angling right elevons 220, 22.4 down and left elevons 221, 225 up, which causes a counter-clockwise rotation (as seen by the operator) of aircraft 1800 and a simultaneous change in the angle of attach of wing sections 202, 204. In embodiments, differential and vector control of motor thrust may also be employed. In FW mode, passive longitudinal and lateral stability is achieved by equilibrium moments acting on the wings and vertical stabilizers. The vertical stabilizers also provide yaw, or directional stability. Stability will also be augmented using elevons 220-225 and rudder 226, 228 to compensate for oscillations and to improve flight characteristics of the aircraft. Control authority can be also duplicated or augmented or both by thrust vectoring of the propellers.

In a second embodiment of a method of operation of aircraft 1800, in DR mode (i.e., FIGS. 18-20), aircraft 1800 may be driven as a car and propelled by hub-mounted brushless motors (not shown) on wheels 1802. In the second embodiment, in DR mode; cabin 214 faces the direction of forward travel along the ground, i.e., the negative y-axis 1812 and the leading edges of wing sections 202, 204 are vertically oriented in the direction of z-axis 1814. In the embodiment, steering is by wire with an actuator controlling the rotation of the two front, or all four wheels, though differential steering may also be provided. In an embodiment, braking may be regenerative. Furthermore, in some embodiments, aircraft 1800 may be driven manually by operator 1808; or may be self-driven by MCU 1804. Thus, for operator 1808, the experience of driving aircraft 1800 will be the same or similar to that of a regular electric car.

In the second embodiment of DR mode, each wheel 1800 may be driven by a hub-mounted motor. In some embodiments; aircraft 1800 may be equipped with only four hub motors, each rated 1-7 kW, which would provide a projected speed of up to 80 mph. In other embodiments, the number of wheels may vary; as may the number and location of the driving motor or motors, e.g., there may be three wheels 1800 and only two having a hub-mounted motor.

Figure 22:
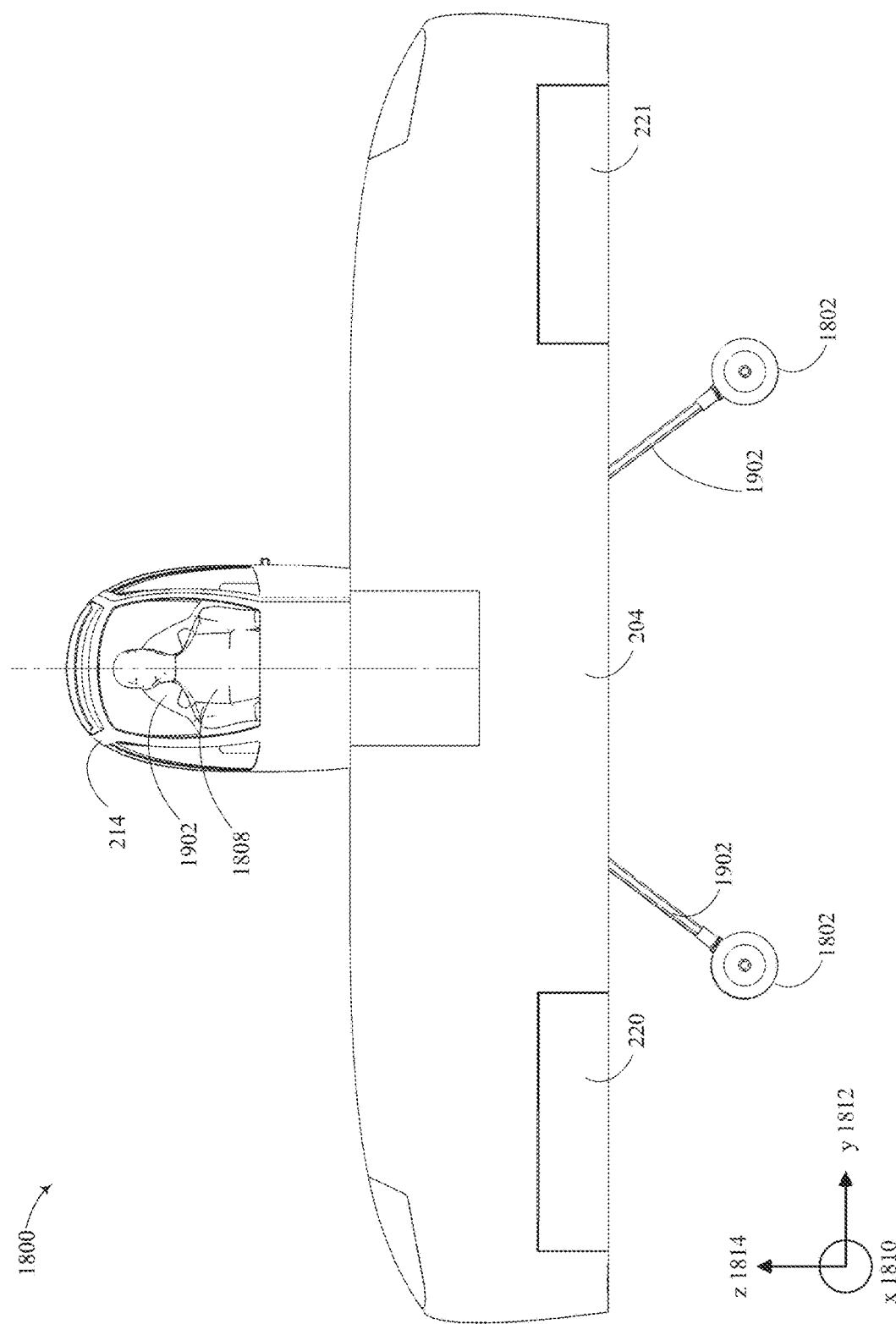
FIG. 22 is a right-side view of an aircraft according to the embodiment of FIG. 18 in the second configuration.

In the second embodiment of DR mode, aircraft 1800 may adjust its height above the ground; e.g., before take-off and while driving, using wheel retraction struts 1902 (FIG. 19 and FIG. 22). Wheel retraction struts 1902 serve three goals: 1) lower the height of aircraft 1800 while loading and unloading the operator and any passenger; 2) raise the height of aircraft 1800 to a pre take-off height—this would define the maximum extension of struts 1902; and 3) retract wheels 1802 inside aircraft 1800 body (i.e., wheel housings 1803 and strut housing 1903) to improve aerodynamics during FW mode.

In the second embodiment of a method of operation of aircraft 1800, in MC mode (e.g., FIGS. 21-25), cabin 214 is pivoted about z-axis 1814 and aligned with fairing 232. In the second embodiment of MC mode, aircraft 1800 may be lifted and controlled by thrust, e.g., differential thrust from propellers 212 (with control assisted in some embodiments using flight surfaces such as elevons 220-225 and rudders 226, 228 to deflect airflow during liftoff and adjust stability and position of aircraft 1800) to achieve forward and reverse flight along x-axis 1810 and lateral flight along y-axis 1812. However, in the second embodiment of MC mode, wing sections 202, 204 remain oriented such that their leading edges are vertically oriented in the direction of z-axis 1814. Thus, the second embodiment of MC mode is a vertically-oriented regime of flight similar to that of a drone. In the second embodiment of MC mode, wheels retraction strut 1902 may be retracted to secure each wheel 1802 in a wheel housing 1803 (FIG. 24) and secure strut 1902 into a strut housing 1903 (FIG. 24) during flight.

In the second embodiment of the method of operation, aircraft 1800 uses motor-driven propellers 212 as propulsion in all phases of flight (MC mode, TR mode, and FW mode), though not every propeller is used in every mode. In the second embodiment of the method of operation, aircraft 1800 is equipped with eight motors, each motor powering a propeller. This number of motors may be optimal for the vertical take-off and landing (MC mode) power consumption requirements and the stabilization of aircraft 1800. For example, each motor may be a brushless DC type electric motor with state of art technologies, such as, rare earth magnets, Hallbach magnets configuration, low resistant/high temperature wiring, etc. Heart dissipation may be provided using heat tubes and airflow as the working fluid. In an embodiment, each flight motor provides about 35 kW of continuous power and twice that (70-80 kW) at peak power for up to 5 sec. In an embodiment, to keep the motor and propeller configuration within a relative "car" size for roadworthiness, each motor may be used with a coaxial drive mechanism so that each motor may drive two coaxial and counter-rotating propellers, for a total of 16 propellers. Similarly, two coaxial motors may be used to drive a single propeller, for a total of 16 motors. The motors can also be arranged in a flat configuration, for a total of 16 of them, located in a honeycomb patter on the same plane. In embodiments, propellers 212 may have 2 or 3 variable-pitch blades, with the pitch varying between 18-35 degrees and including the possibility of feathering. In embodiments, the propeller airfoils may be, for example, regular forward flight airfoils or slow fly airfoils, and may include tips that are optimized to reduce noise levels. In an embodiment, a subset of propellers 212 may be optimized for different modes, e.g., 4 may be optimized for MC mode and 4 optimized for FW mode. Dedicated propeller for the forward flight in addition to eight MC propellers is another way to combine different requirement to MC and FW flights In an embodiment, in addition to the eight propellers, another propeller and motor combination (not shown) may be included that is dedicated for FW mode. In an embodiment, of the 8 propellers shown in FIG. 18, 4 may be dedicated to forward flight and the other 4 sized to provide lift for MC and TR modes. In an embodiment, one or more motor/propeller combinations 212 may be replaced with turbine engines as the sources of lift and propulsive force.

Regarding differential thrust control in the second embodiment of MC mode, movement and position control may be achieved in MC mode using differential thrust control in which MCU 1804 individually controls the thrust of each propeller using the associated ESC with input from sensors, e.g., sensors 3105, 3110, 3120 (FIG. 31), and guidance from operator 1808. Pitch and roll movements in MC mode are achieved by MCU 1804 using left-right, front-back symmetric increases or decreases of respective motor power output. Similarly, yaw control is achieved by diagonally symmetric increases or decreases of respective motor power output. In an embodiment, differential thrust may be achieved by changing the rotating speeds of one or more propellers 212. In an embodiment, differential thrust may be achieved by changing the pitch of one or more propellers 212, e.g., via an electrical mechanism with an actuator going through a hollow shaft of an electric motor powering one of propellers 212.

Figure 23:
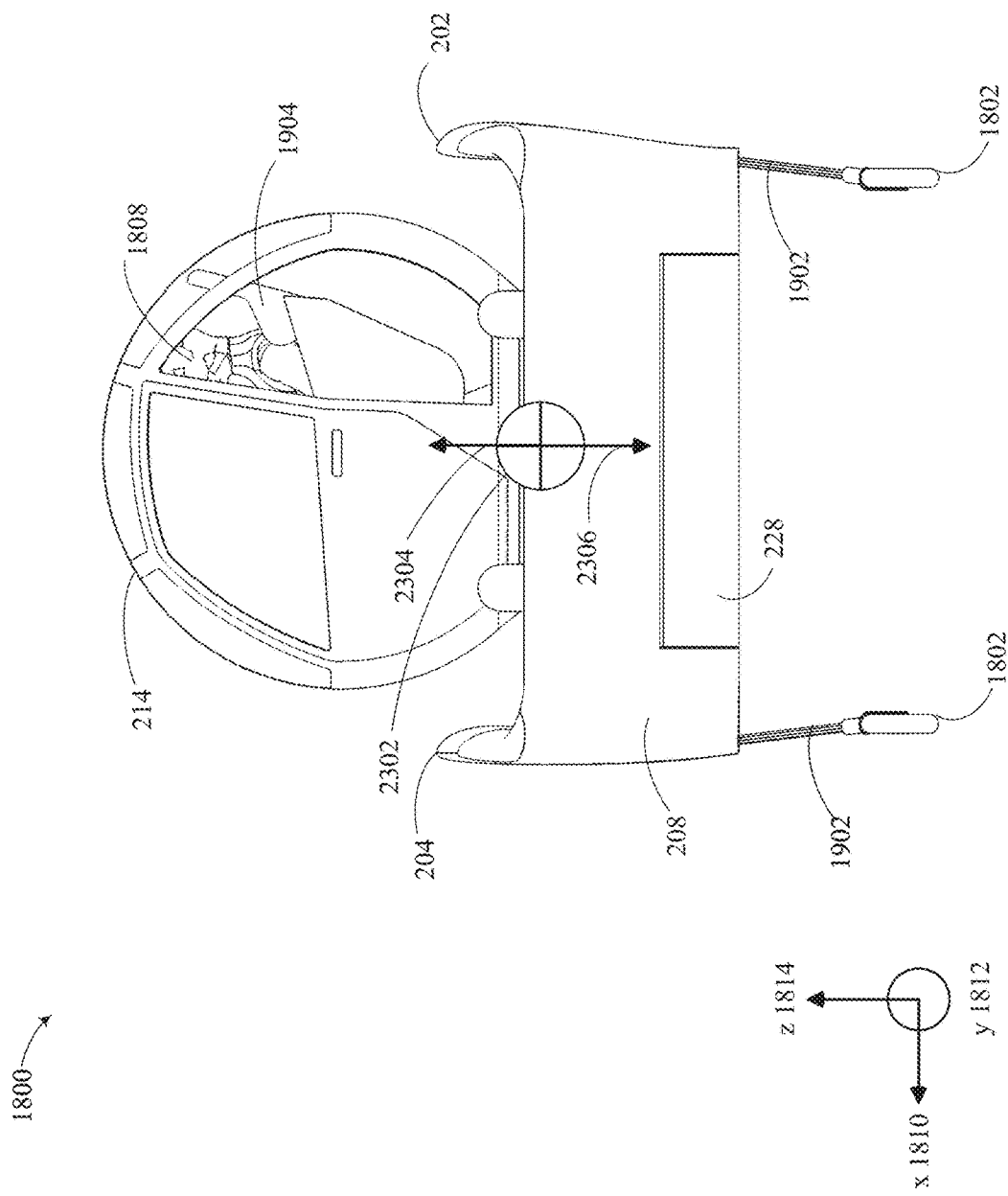
FIG. 23 is a rear view of an aircraft according to the embodiment of FIG. 18 in the second configuration.
Figure 24:
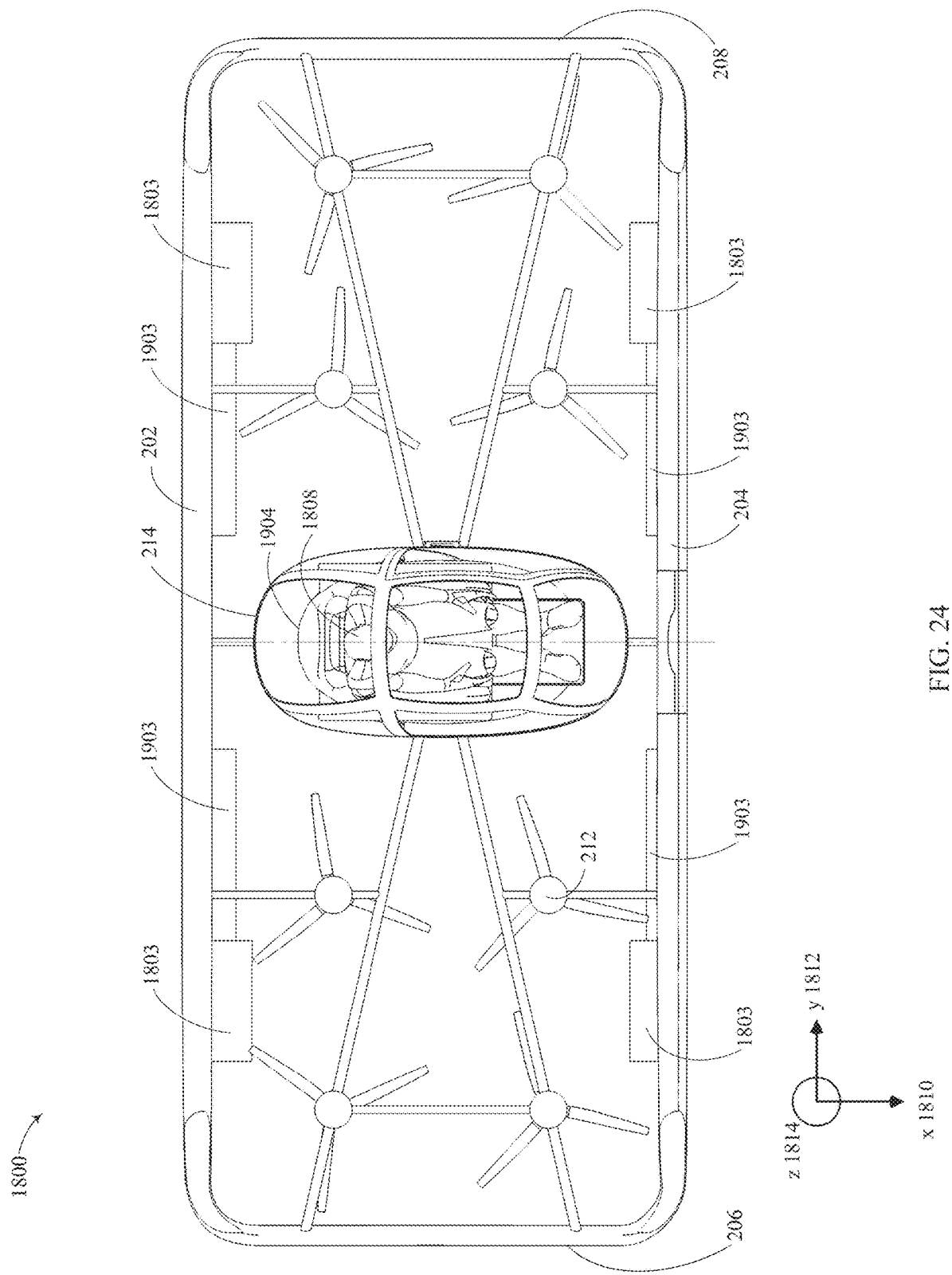
FIG. 24 is a top view of an aircraft according to the embodiment of FIG. 18 in the second configuration.
Figure 25:
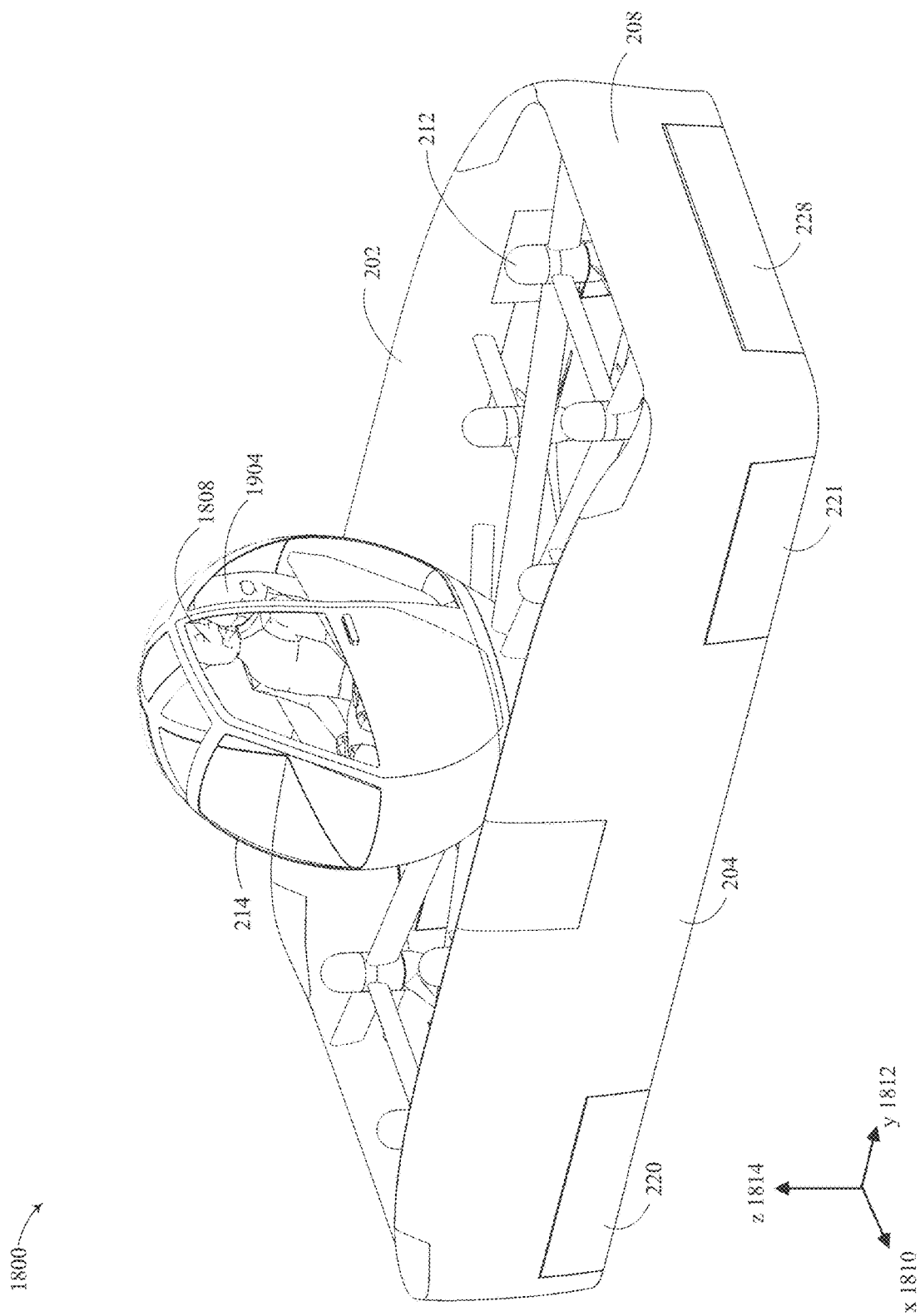
FIG. 25 is a perspective view of the aircraft according to the embodiment of FIG. 18 in the second configuration.

In embodiments, the duration of the second embodiment of MC mode (after takeoff and before entering TR mode) is projected to be approximately one and a half minutes. In MC mode, aircraft 1800 is projected to be able to ascend at 4 m/s and have a ceiling of 1200 ft. Regular power consumption is projected to be 30 kW per engine during hovering and without external forces such as wind, changing vehicle center of gravity, turbulence or other fluctuations. In some embodiments, for improved maneuverability near the ground and as an additional longitudinal and lateral stability systems, the aircraft may be equipped with a thrust vector changing system in which each propeller 212 is equipped with a pivot mechanism (not shown) that may be individually controlled by MCU 1804 to re-direct the thrust vector the propeller. The pivot mechanism may pivot the propeller with respect to the motor, or pivot the motor with respect to the frame. Though such a thrust-vectoring system may come with a weight penalty, is provides an increase in maneuverability. In an embodiment, as a lighter-weight solution for stability control in MC mode, elevons 220-225 and rudders 226, 228 may be used as airflow deflectors assisting the thrust-based stabilization systems. In FIG. 23, CG 2302 of aircraft 1800 is the combined centers-of-gravity of cabin 214 and box wing 1816 and lift vector 2304 (from the thrust of propellers 212 when properly balanced) acts through CG 2302 against aircraft weight 2306.

In the second embodiment of a method of operation of aircraft 1800, during TR mode (e.g., FIGS. 26-28), aircraft 1800 transitions from MC mode to FW mode. Before entering the second embodiment of TR mode, cabin 214 is pivoted about z-axis 814 to face the direction of x-axis 812. During the second embodiment of TR mode, aircraft 1800 is flown in the x-axis 1810 direction at increasing speed and upper wing section 202 and lower wing section 204 are rotated about y-axis 1812 to go from being vertically oriented (and not lift producing) to being horizontally oriented (and producing lift according to the airspeed of aircraft 1800). In the second embodiment of TR mode, as wing sections 202, 204 are rotated, aircraft 1800 is accelerated quickly in the direction of x-axis 1810 in order to gain the airspeed necessary for wing sections 202, 204 to generate lift. In the embodiment, the duration of the second embodiment of TR mode is approximately 10 seconds with an acceleration of 4 m/s, which is comparable to the acceleration of a normal automobile. Also in the embodiment, the power consumption for the second embodiment of TR mode is 45 kW per motor for each of eight motors.

Thus, in the second embodiment of TR mode, lift is initially generated solely by propellers 212 and then gradually shifts to being generated by wing sections 202, 204 as aircraft 1800 picks up airspeed in the x-axis 1810 direction and enters FW mode. During the second embodiment of TR mode the lift and control of aircraft 1800 is achieved by a blending of the systems and methods used in MC mode and the systems and methods used in FW mode, with MC-mode control dominating in the initial phase of TR mode and FW-mode control being phased in (or "blended" in) as the forward speed of aircraft 1800 increases until FW mode is attained. Also during the second embodiment of TR mode, as wing sections 202, 204 are rotated about y-axis 1812, cabin 214 is pivoted with respect to wing sections 202, 204 in the opposite direction to maintain the upright position of operator 1808 (where the "upright" position is essentially the same seated position shown in MC and FW modes). In the embodiment, TR mode uses all motor/propellers 212 until e component of TR control is phased out and FW mode is entered.

In a normal flight, the second embodiment of TR mode is entered twice, first on takeoff when transitioning between MC and FW mode, and second on landing when transitioning between FW and MC modes. During a back-TR mode, the rotations of wing sections 202, 204 and cabin 214 are opposite those of a takeoff-TR mode. Similarly, in a landing-TR mode, the blended control of a takeoff-TR mode is reversed—FW control is phased out and MC control is phased in as the airspeed of aircraft 1800 decreases. During the back-TR mode the thrust of the propeller will be greatly reduced to compensated for increased lift generated by increased angle of attack of the wing. The thrust will be adjusted in real time by the flight controller to maintain desired altitude goal, which may be dynamically changing according to the flight schedule, Thus. TR mode transition between MC and FW may occur in both forward and reverse directions, and, in both forward and reverse directions, may be initiated by the pilot or be instituted automatically based on, for example, a measured flight speed and flight mode.

In TR mode, the control of the aircraft changes from control specific to MC mode to control specific to FW mode. While the transition is described above as a blending of MC and FW control modes, in embodiments, the transition may be achieved in one of several additional ways. In a first additional control transition, the aircraft may retain full MC control with zero FW control until transition fully occurs at which point full FW control is implemented. In a second additional way of control transition, the aircraft blends MC and FW control during the transition by linearly fading out MC control and simultaneously fading in FW control as forward airspeed of the aircraft increases. This second way of control transition is a variation of the blending described in more detail above with respect to FIGS. 26-28. In a third additional way of control transition, the aircraft may be controlled during MC mode, TR mode, and FW mode by utilizing direct force control based on an incremental non-linear dynamic inversion (INDI) approach. The INDI method, which originates from the nonlinear dynamic inversion (NDI), solves the incremental form of equations of motion and generates a control law substantially reducing the dependence on aerodynamic model and other vehicle.

In an embodiment, a full attitude control (FAC) scheme may be implemented instead of the blended transition from TR to FW modes described above. For FAC control, wind tunnel measurements are taken of the aircraft to get an understanding of the control allocation and to model the static forces and moments acting on the aircraft. Based on the derived model, a novel controller that operates in the 3-dimensional rotation group (also designated as "SO(3)") handles the dynamics of the vehicle at any attitude configuration (including TR, and FW) is created. The FAC controller allows the autonomous transition of the aircraft without discontinuities of switching (e.g., from MC to FW mode), as well as the overall control of flight. An advantage of FAC control is that it can handle any possible attitude configuration of the system independently from the previous states. FAC control includes error function correction that works independently from the aircraft heading and therefore enables a hierarchical control approach, whereas the blending in TR mode between MC and FW controls relies upon switching between the two modes (even if controlled).

Apparatus weight has a big impact on how the apparatus responds to control input. The aircraft weight may vary depending on the weight of the passenger and any cargo. For certain aspects of flight that are automated, one of the ways of controlling the aircraft response is by using PID (proportional, differentiation, integrational) control. Adaptive PID control may be used when the weight of the aircraft varies. With adaptive PID control, sets of values for ND control are determined for different aircraft weights. Then a particular set of PID values is chosen for PID control based on a determined aircraft operational weight. A rational and user-friendly determination of aircraft operational weight may be obtained during a preflight check with the aircraft determining its operation weight using embedded sensors (e.g., embedded in struts 1902).

In the second embodiment of a method of operation of aircraft 1800, in FW mode (e.g., FIG. 29), aircraft 1800 is driven forward along x-axis 1810 by propellers 212 with lift generated by the airfoils of upper wing section 202 and lower wing section 204. Thus, in the second embodiment of FW mode, with wing sections 202, 204 horizontal and their leading edges facing the direction of travel, the airfoils of aircraft 1800 form a closed "box" wing (in DR mode, with the wings vertically oriented, this "box" serves as the car "body"). In the second embodiment of FW mode, in an embodiment, the projected speed of aircraft 1800 is 40 m/s with a possible top speed of 100 m/s. Since lift is provided by wing sections 202, 204, in FW mode the number of motor/propeller units 212 in use may be reduced to 2 to 4. For example, in FW mode, aircraft 1800 may use four motor/propeller units each providing 6 kW of power. The aerodynamics and other characteristics of the upper, lower, and vertical wing sections 102, 104, 202, 204, 106, 108, 204, 208 have been discussed earlier. During the second embodiment of FW mode, control of aircraft 1800 is achieved mainly by using control surfaces, elevons 220-225 and rudders 226, 228. However, in some embodiments, additional control and stability during the second embodiment of FW mode may be achieved using differential thrust control, as discussed regarding MC mode. In FIG. 29, CG 2302 of aircraft 1800 is the combined centers-of-gravity of cabin 214 and box wing 1816. A center of lift 2602 from the combined lifts of wing sections 202; 204 is somewhat offset horizontally from CG 2302, creating a moment about CG 2302. This moment may be countered by an upward lift 2606 from one of trailing edge wing elevons 220-225, or differential thrust from propellers 212 (such that lower propellers are powered to create relatively more thrust than upper propellers). In the second embodiment; cabin 214 may, be gimballed such that during FW mode a pilot seat inside the cabin flight cabin 214 is maintained in a vertical orientation even when box wing 1816 is banked left or right, or aircraft 1800 is climbing or diving.

Further regarding both the first and second methods of operating aircraft 1800; there may be two operational control modes: 1) a fully autonomous control mode that requires minimal operator input, such as operator 1808 indicating only a final destination on an interactive screen of MCU 1804; and 2) a semi-manual control mode that is available during driving in which an autopilot within MCU 1804 assists operator 1808, who controls the majority of driving controls, i.e. direction, acceleration, braking. For the semi-manual mode, for a better operator experience, driving controls may mimic those of a conventional car. In embodiments, control stick 1806 may be replaced by a steering wheel (e.g., perhaps a relatively short and square wheel). In embodiments, steering may be accomplished using "steering-by-wire" in order to be compatible with flight controls. Similarly, acceleration and braking pedals may be provided that mimic those of a conventional car. In embodiments, while in DR mode, systems that related to MC and FW modes may be kept in a standby mode in which propellers, motors, and control surface servos are locked in a standby position. The standby mode may avoid unexpected motion while driving and thus be safer and reduce damage. In an embodiment, wheels 1802 may remain unlocked in MC mode to accommodate possible minor aircraft shifting during takeoff.

Further regarding both the first and second methods of operating aircraft 1800, operator 1808 and cargo may be loaded in DR mode with cabin 214 facing in the negative y-axis 1812 direction, with rotation between cabin positions being about z-axis 1814 using, e.g., a geared electric motor, or linear actuator, or rotary actuator to cause cabin 214 to rotate with respect to fairing 232.

Further regarding both the first and second methods of operating aircraft 1800, the following flight preparation occurs in advance of MC mode: 1) aircraft 1800 is brought to a full stop for safety (however, aircraft 1800 is capable of entering MC mode from DR mode while maintaining a forward ground speed); 2) Manual and MCU controls are changed to MC mode, which includes the disabling of manual steering; 3) cabin 214 is rotated 90 degrees about z-axis 1814 to face the direction of FW mode (however, in embodiments, this rotation may be performed during MC mode); 4) cabin seat gimballing about y-axis 1812 is enabled (in embodiments, cabin seat gimballing about the vertical axis is also enabled; and in embodiments, passenger seat gimballing about y-axis 1812 may be enabled); and 5) cabin doors are locked and safety belts are tightened. In embodiments, flight preparation includes MCU 1804 retrieving weight distribution data from sensors in, e.g., retraction struts 1902, and computing a total weight and a weight distribution and adapting, in advance of MC mode, the control of aircraft 1800 to account for the weight and weight distribution with respect to CG 2302. This may include changing a forward speed or wing attack angle or both at which TR mode is completely, ended. In embodiments, cabin rotation may be initiated by an operator command and executed automatically in order to prevent liftoff without a properly oriented cabin. Similarly, the other steps of flight preparation may be automated to prevent liftoff without a properly-configured aircraft.

Further regarding both the first and second methods of operating aircraft 1800; in MC mode, during liftoff; motor/propeller units 212 create an area of high pressure under aircraft 1800 that leads to a reduced ability of aircraft 1800 to stabilize itself. The instability may be especially noticeable where the propellers are shrouded and the escape path between box wing 1816 and the ground is limited. To minimize the instability caused by such a high pressure area during liftoff, aircraft 1800 may be pre-lifted above the ground by extending retraction struts 1902 (see FIG. 22.) The extension (and retraction) of retraction struts 1902 may be achieved, e.g., using electric or pneumatic linear actuators. Wheels 1802 may be retracted in MC mode after aircraft 1800 has reached an altitude where, if an unexpected landing must be made, wheels 1802 may be re-extended in time for the landing. Wheels 1802 are preferably completely retracted and stored before FW mode.

Further regarding both the first and second methods of operating aircraft 1800, and with regard to FIG. 22, after flight preparation for MC mode, MCU 1804 in autopilot initiates liftoff without passenger input. Liftoff starts with the spinning up of propellers to 10% of throttle value and a final safety check (in an embodiment, MCU 1804 executing in autopilot may review sensor data, e.g., lidar and windspeed data, for potential environmental hazards). Then MCU 1804 in autopilot may increase the throttle to 50%-70% (the exact value depends on operator, passenger, and cargo weight) at which point aircraft 1800 may begin to lift off. During this procedure, MCU 1804 in autopilot is controlling but operator 1808 has the option to abort. After liftoff, aircraft 1800 in MC mode continues to gain altitude until a designated height is attained.

Further regarding both the first and second methods of operating aircraft 1800, and with regard to FIG. 27 (22-2), after the designated height is attained, aircraft 1800 enters TR mode. In TR mode, box wing 1816 is rotated about y-axis 1812 using differential thrust, i.e., by, increasing the thrust of motor/propeller units 212 on the rear-facing side of aircraft 1800 and decreasing the thrust of motor/propeller units 212 on the forward-facing side of aircraft 1800. With this rotation, aircraft 1800 begins to gain horizontal speed as a result of the increased horizontal component of the thrust vector. This increase in speed is necessary to create the airflow over wing sections 202, 204 to provide lift during FW mode. MCU 1804 in autopilot performs the differential thrust control in TR mode. In the early phases of TR mode, aircraft 1800 remains controlled by MCU 1804 in autopilot changing engine thrust to control pitch, roll, and yaw. As TR mode progresses, FW control is phased in and MC mode is phased out. In other words, where MCU 1804 in autopilot initially used almost 100% differential thrust control, as TR mode progresses, MCU 1804 in autopilot phases in control using elevens and rudders until, when aircraft 1800 has rotated approximately 90 degrees (see FIG. 29), MCU 1804 in autopilot is using almost control surfaces control and passive self-stability of the wing geometry. With 90 degrees of box wing 1916 rotation and wing section 202, 204 at a proper angle of attach, and with adequate forward velocity (usually in the range of 85-90 mph), TR mode is complete. Throughout the progression, the rotation of cabin 214 is controlled by MCU 1804 in autopilot to maintain operator 1808 in the seated, upright position, as determined by MCU 1804 using date from sensors, e.g., gyroscopes or accelerometers.

In embodiments, even when MCU 1804 is using primarily differential thrust control, MCU 1804 may also employ elevon control to assist as a secondary or redundant system. Similarly, where MCU 1804 is using primarily elevon and rudder control, MCU 1804 may also employ differential thrust control to assist as a secondary or redundant system.

In embodiments, aircraft 1800 must attain a safe height before entering TR mode, where "safe height" is determined by the ability of aircraft 1800 to land safely using autorotation, gliding, or an emergency ballistic parachute.

Further regarding both the first and second methods of operating aircraft 1800, and with regard to FIG. 29, after TR mode, aircraft 1800 enters FW mode. A difference between TR mode and FW mode is that, during FW mode, lift is provided by the flow of air over wing sections 202, 204 and not by thrust from propellers 212. In FW mode, with lift being generated by wing sections 202, 204, less power is needed from propellers 212. Thus, in some embodiments, fewer propellers 212 need to provide power. For example, embodiments include configurations where 2 or 4 propellers are powered, as well as configurations with one or more motor/propeller units dedicated for FW mode.

Further regarding both the first and second methods of operating aircraft 1800, and with regard to FIG. 29, the position and configuration of cabin 214 and any cargo significantly affect the flight characteristics of aircraft 1800. Preferably, cabin 214 or a cargo position is located in the Center of the Gravity (CG) or close to it. When cabin 214 is located in the CG of the apparatus it means that passenger or cargo weight changes will have a reduced impact on the CG of the apparatus. In embodiments, CG 2302 is located in the point of 27% of MAC (mean aerodynamic chord) of wing sections 202, 204. Deviation of CG position may result in stability or control problems. Shifting CG 2302 forward may provide more stability, but may also compromise maneuverability—reduce the efficiency of elevons. Shifting CG 2302 aft may compromise stability (pitch) about y-axis 1812. In embodiments, wing sections 202, 204 are equipped with self-stabilizing airfoils. However, elevon trimming may be required to provide fine tuning.

In embodiments, while MCU 1804 in autopilot maintains the stability control of aircraft 1800 in FW mode such that operator 1808 inputs only direction or final destination through an interactive map (part of WU 1804), aircraft 1800 includes a semi-automated mode in which operator 1808 operates aircraft 1800 as an airplane and MCU 1804 in autopilot corrects position and maintains stability in support of operators inputs. Furthermore, embodiments may include a pure manual control mode in which operator 1808 is in complete control of aircraft 1800.

FIG. 30 illustrates a method 3000 comprising, in step 3002, attaining altitude, by an apparatus including a first propulsion source, at least one wing elongate along a first axis, and a seat configured to support a pilot, the altitude attained using only lift provided by thrust from the first propulsion source. When attaining altitude, every at least one wing is oriented vertically, and the seat is facing a first direction. Also, the apparatus further includes: a frame connected to the first propulsion source and the at least one wing and rotatably connected to the seat such that the seat, while facing the first direction, may rotate with respect to the first axis, the frame, and the at least one wing; and a control system. In the apparatus, each at least one wing does not generate vertical lift when oriented vertically; and the first propulsion source is configured such that, with every at least one wing oriented vertically, the first propulsion source is operable to maintain apparatus altitude and stability. In step 3004, thrust from the first propulsion source is controlled to rotate the at least one wing and frame about the first axis so that the at least one wing acquires a horizontal velocity in the first direction and generates vertical lift sufficient for the apparatus to transition, from maintaining altitude using only lift from the first propulsion source, to maintaining altitude using only lift generated by the at least one wing. And in step 3006, the seat is counter-rotated with respect to the first axis and the frame to counter the rotation of the at least one wing and frame and maintain the seat facing the first direction.

Figure 31:
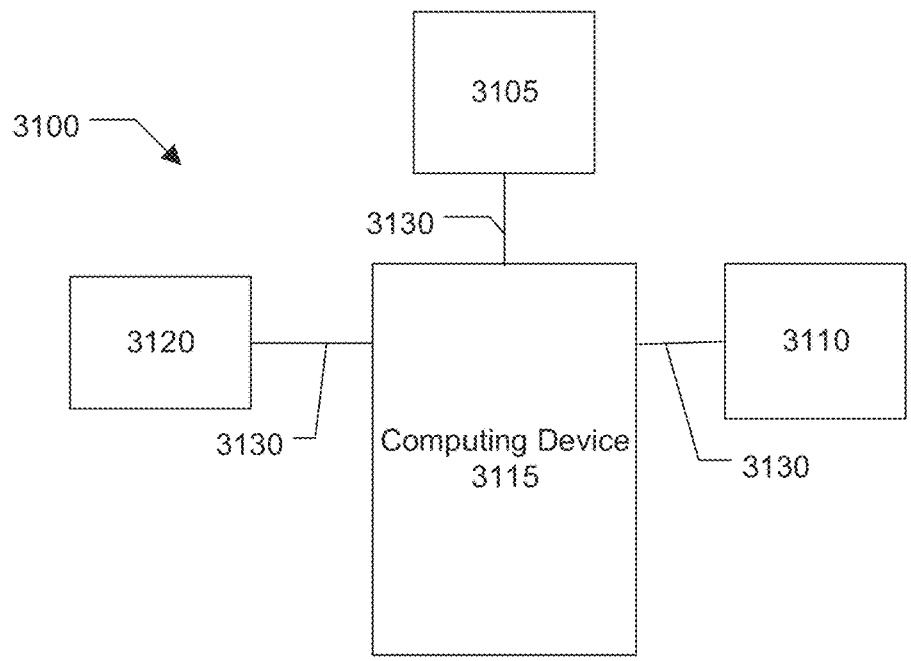
FIG. 31 is a simplified, exemplary block diagram of an embodiment of a system for implementing methods control of an aircraft according to the various embodiments.

FIG. 31 is a simplified, exemplary block diagram of an embodiment of a system 3100 for implementing the embodiments of MCU 1804 control and autopilot systems disclosed herein. System 3100 may include a number of sensors for determining aircraft-related data, e.g., an accelerometer 3105 (e.g., as described within this disclosure), a gyroscope 3110, and an altimeter 3120 (e.g., as described within this disclosure). Sensors 3105, 3110, and 3120 are in communication with a computing device 3115. Additional sensors, such as a speedometer, an airspeed indicator, and a GPS unit may also be in communication with computing device 3115. The sensors may supply data to computing device 3115 via communication links 3130. System 3100 may be linked to the various controlled elements of aircraft 1800, e.g., ESC units, actuators, retraction struts, propeller pitch controls, via communication links 3130.

Computing device 3115 may include a user interface and software, which may implement the steps of the methods disclosed within. Computing device 3115 may receive data from sensors 3105, 3110, and 3120, via communication links 3130, which may be hardwired links, optical links, satellite or other wireless communications links, wave propagation links, or any other mechanisms for communication of information. Various communication protocols may be used to facilitate communication between the various components shown in FIG. 31. Distributed system 3100 in FIG. 31 is merely illustrative of an embodiment and does not limit the scope of the systems and methods as recited in the claims. In an embodiment, the elements of system 3100 are incorporated into a single device. One of ordinary skill in the art would recognize other variations, modifications, and alternatives. For example, more than one computing device 3115 may be employed. As another example, sensors 3105, 3110, and 3120 may be coupled to computing device 3115 via a communication network (not shown) or via some other server system.

Computing device 3115 may be responsible for receiving data from sensors 3105, 3110, and 3120, performing processing required to implement the steps of the methods, and for interfacing with operator 1808. In some embodiments, computing device 3115 may receive processed data from sensors 3105, 3110, and 3120. In some embodiments, the processing required is performed by computing device 3115. In such embodiments, computing device 3115 runs an application for receiving aircraft data and operator input, performing the steps of the methods, and interacting with operator 1808. In other embodiments, computing device 3115 may be in communication with a server, which performs the required processing, with computing device 3115 being an intermediary in communications between the user and the processing server.

System 3100 enables operator 1808 to access and query information developed by the disclosed methods and provide input. Some example computing devices 3115 include desktop computers, portable electronic devices (e.g., mobile communication devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS®, Android® OS, Google Chrome® OS, Symbian OS®, Windows Mobile® OS, Windows Phone, BlackBerry® OS, Embedded. Linux, Tizen, Sailfish, webOS, Palm OS® or Palm Web OS®; or wearable devices such as smart watches, smart fitness or medical bands, and smart glasses.

Figure 32:
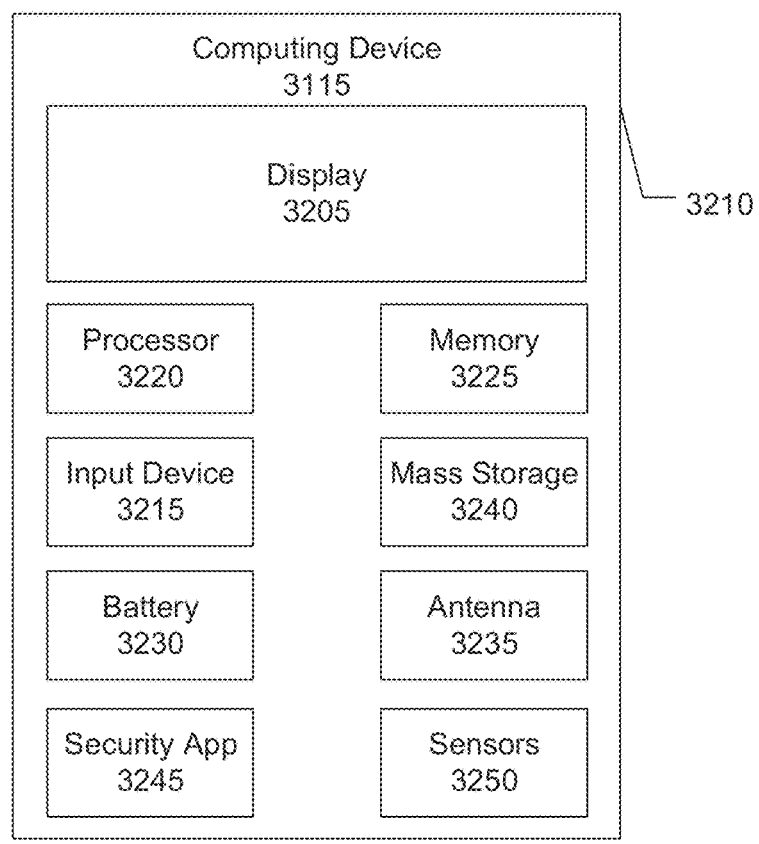
FIG. 32 is an exemplary block diagram of a computing device from the system of FIG. 31.

FIG. 32 is an exemplary block diagram of a computing device 3115 from the system of FIG. 31. In an embodiment, operator 1808 interfaces with the system through computing device 3115, which also receives data and performs the computational steps of the embodiments. Computing device 3115 may include a display, screen, or monitor 3205, housing 3210, input device 3215, sensors 3250, and a security application 3245. Housing 3210 houses familiar computer components, some of which are not shown, such as a processor 3220, memory 3225, battery 3230, speaker, transceiver, antenna 3235, microphone, ports, jacks, connectors, camera, input/output (110) controller, display adapter, network interface, mass storage devices 3240, and the like. In an embodiment, sensors 3250 may include sensors 3105, 3110, and 3120 incorporated into computing device 3115.

Input device 3215 may also include a touchscreen (e.g., resistive, surface acoustic wave, capacitive sensing, infrared, optical imaging, dispersive signal, or acoustic pulse recognition), keyboard (e.g., electronic keyboard or physical keyboard), buttons, switches, stylus, or combinations of these.

Mass storage devices 3240 may include flash and other nonvolatile solid-state storage or solid-state drive (SSD), such as a flash drive, flash memory, or USB flash drive. Other examples of mass storage include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), battery-backed-up volatile memory, tape storage, reader, and other similar media, and combinations of these.

System 3100 may also be used with computer systems having configurations that are different from computing device 3115, e.g., with additional or fewer subsystems. For example, a computer system could include more than one processor (i.e., a multiprocessor system, which may permit parallel processing of information) or a system may include a cache memory. The computing device 3115 shown in FIG. 32 is but an example of a computer system suitable for use. Other configurations of subsystems suitable for use will be readily apparent to one of ordinary skill in the art. In other specific implementations, computing device 3115 is a tablet computer, a laptop, or a netbook. In another specific implementation, computing device 3115 is a non-portable computing device such as a desktop computer or workstation.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples and are not meant to be limiting in any way. Other steps and functions may be contemplated without departing from this disclosure or the scope of an embodiment.

We claim:

1. A method comprising:
    attaining altitude, by an apparatus including a first propulsion source, at least one wing elongate along a first axis, and a seat configured to support a pilot, the altitude attained using only lift provided by thrust from the first propulsion source, every at least one wing oriented vertically, and the seat facing a first direction, the apparatus further including:
        a frame connected to the first propulsion source and the at least one wing and rotatably connected to the seat such that the seat, while facing the first direction, may rotate with respect to the first axis, the frame, and the at least one wing; and
        a control system, wherein:
            each at least one wing does not generate vertical lift when oriented vertically; and
            the first propulsion source is configured such that, with every at least one wing oriented vertically, the first propulsion source is operable to maintain apparatus altitude and stability;
    controlling thrust from the first propulsion source to rotate the at least one wing and frame about the first axis such that the at least one wing acquires a horizontal velocity in the first direction and generates vertical lift sufficient for the apparatus to transition, from maintaining altitude using only lift from the first propulsion source; to maintaining altitude using only lift generated by the at least one wing;
    counter-rotating the seat with respect to the first axis and the frame to counter the rotation of the at least one wing and frame and maintain the seat facing the first direction;
    wherein the apparatus has a driving configuration in which the seat is rotated about a second axis to face a second direction parallel to the first axis, the apparatus further including a plurality of wheels upon which the apparatus may by driven in the second direction, at least one of the plurality of wheels capable of providing a driving force;
    the method further comprising, while in the driving configuration:
    controlling, using the control system, the plurality of wheels to drive the apparatus in the second direction;
    wherein, the at least one wing includes a first wing and a second wing, with a first stabilizer connected between first ends of the first and second wings and a second stabilizer connected between second ends of the first and second wings, the first and second stabilizer not generating lift when the first and second wings are oriented vertically; and
    the seat is housed within a cabin connected to the frame between the first and second wings and the first and second stabilizers, the cabin rotatable about, the connection to the frame to cause the seat to face the first or the second direction, the cabin when facing the first direction being rotatable with respect to the first axis and the frame to counter the rotation of the at least one wing and frame and maintain the seat facing the first direction.

2. The method of claim 1, wherein controlling, using the control system, the plurality of wheels to drive the apparatus in a second direction includes an automated system using the control system to control the plurality of wheels.

3. The method of claim 1, further comprising:
    rotating the seat to face the second direction before the controlling, using the control system, the plurality of wheels to drive the apparatus in the second direction.

4. The method of claim 1, further comprising:
    rotating the seat to face the first direction before the attaining altitude.

5. The method of claim 1, wherein the first propulsion source includes at least three separate propulsion sources configured about a center of gravity of the apparatus such that:
    with the first and second wings oriented vertically, the at least three propulsion sources are operable to maintain apparatus altitude and stability; and
    the at least three propulsion sources are connected to the frame and within a perimeter defined by the first and second wings and first and second stabilizers.

6. The method of claim 1, wherein:
    the at least one wing includes two elevons, and
    at least one stabilizer with a stabilizer flap is connected to the frame, the method further comprising:
    controlling apparatus stability, when the at least one wing is oriented vertically, by controlling only the thrust of the first propulsion source; and
    controlling apparatus stability, when maintaining altitude using only lift generated by the at least one wing, by controlling the elevons and the stabilizer flap.

7. The method of claim 6 further comprising:
    controlling apparatus stability, when maintaining altitude using only lift generated by the at least one wing, by controlling the elevons, the stabilizer flap, and thrust from the first propulsion source.

8. The method of claim 7, wherein controlling thrust from the first propulsion source includes changing a thrust vector of the first propulsion source.

9. The method of claim 1 further comprising:
    controlling apparatus stability, when maintaining altitude using only lift generated by the at least one wing, by controlling a thrust vector of the first propulsion source.

10. The method of claim 1, wherein the first propulsion source include at least three separate propulsion sources configured about a center of gravity of the apparatus such that, with every at least one wing oriented vertically, the at least three propulsion sources are operable to maintain apparatus altitude and stability.

11. The method of claim 1, wherein the apparatus includes a second propulsion source dedicated to horizontal flight, the method further comprising:

when maintaining altitude using only lift generated by the at least one wing, using the second propulsion source.

12. A system comprising:
an apparatus including:
   at least one wing elongate along a first axis, each at least one wing not generating vertical lift when oriented vertically;
   a first propulsion source configured such that, with every at least one wing oriented vertically, the first propulsion source is operable to maintain apparatus altitude and stability;
   a seat configured to support a pilot,
   a frame connected to the first propulsion source and the at least one wing and rotatable connected to the seat such that the seat, while facing a first direction, may rotate with respect to the first axis, the frame, and the at least one wing;
   a control system including at least one processor and memory with instructions, which when executed by the at least one processor, cause the control system to:
      cause; when every at least one wing is oriented vertically, the apparatus to attain altitude using only lift provided by thrust from the first propulsion source;
   control thrust from the first propulsion source to rotate the at least one wing and frame about the first axis so that the at least one wing acquires a horizontal velocity in the first direction and generates vertical lift sufficient for the apparatus to transition, from maintaining altitude using only lift from the first propulsion source, to maintaining altitude using only lift generated by the at least one wing;
   counter-rotate the seat with respect to the first axis and the frame to counter the rotation of the at least one wing and frame and maintain the seat facing the first direction;
wherein the apparatus has a driving configuration in which the seat is rotated about a second axis to face a second direction parallel to the first axis the apparatus further including:
   a plurality of wheels upon which the apparatus may by driven in the second direction, at least one of the plurality of wheels capable of providing a driving force;
the instructions further causing the control system, with the apparatus in the driving configuration, to:
control the plurality of wheels to drive the apparatus in the second direction; and
wherein:
the at least one wing includes a first wing and a second wing, with a first stabilizer connected between first ends of the first and second wings and a second stabilizer connected between second ends of the first and second winos, the first and second stabilizer not generating lift when the first and second wings are oriented vertically; and
the seat is housed within a cabin connected to the frame between the first and second wings and the first and second stabilizers, the cabin rotatable about the connection to the frame to cause the seat to face the first or the second direction, the cabin when facing the first direction being rotatable with respect to the first axis and the frame to counter the rotation of the at least one wing and frame and maintain the seat facing the first direction.

13. The system of claim 12, wherein the first propulsion source includes at least three separate propulsion sources connected to the frame and within a perimeter defined by the first and second wings and first and second stabilizers, the at least three propulsion source configured about a center of gravity of the apparatus such that, with the first and second wings oriented vertically, the at least three propulsion sources are controllable by the control system to maintain apparatus altitude and stability.

14. The system of claim 12, wherein:
the at least one wing includes two elevons, and
at least one stabilizer with a stabilizer flap is connected to the frame, and the instructions further causing the control system to:
control apparatus stability; when the at least one wing is oriented vertically, by controlling only the thrust of the first propulsion source; and
control apparatus stability; when maintaining altitude using only lift generated by the at least one wing, by controlling the elevons and the stabilizer flap.

* * * * *